(12) United States Patent
Inoue et al.

(10) Patent No.: US 8,107,347 B2
(45) Date of Patent: Jan. 31, 2012

(54) OPTICAL DISK APPARATUS, OPTICAL PICKUP, PREFORMATTED SIGNAL GENERATION METHOD AND PROGRAM

(75) Inventors: Tetsuya Inoue, Kanagawa (JP); Fumiaki Nakano, Tokyo (JP)

(73) Assignee: Sony Corporation (JP)

( * ) Notice: Subject to any disclaimer, the term of this patent is extended or adjusted under 35 U.S.C. 154(b) by 105 days.

(21) Appl. No.: 12/657,260

(22) Filed: Jan. 15, 2010

(65) Prior Publication Data

US 2010/0182889 A1    Jul. 22, 2010

(30) Foreign Application Priority Data

Jan. 21, 2009  (JP) ................ P2009-011213

(51) Int. Cl.
*G11B 7/00* (2006.01)

(52) U.S. Cl. ......... 369/112.15; 369/112.12; 369/112.11; 369/112.03

(58) Field of Classification Search ............. 369/112.03, 369/112.11, 112.12, 112.15
See application file for complete search history.

(56) References Cited

U.S. PATENT DOCUMENTS

| | | | |
|---|---|---|---|
| 5,339,302 A | 8/1994 | Takahashi et al. | |
| 5,459,706 A | 10/1995 | Ogawa et al. | |
| 7,280,449 B2 | 10/2007 | Nishi et al. | |
| 2005/0226108 A1 | 10/2005 | Ichimura | |
| 2007/0164241 A1* | 7/2007 | Nakano et al. | 250/559.36 |
| 2008/0084797 A1* | 4/2008 | Sano et al. | 369/44.23 |
| 2008/0094948 A1* | 4/2008 | Kamisada et al. | 369/44.11 |

FOREIGN PATENT DOCUMENTS

| | | |
|---|---|---|
| JP | 05-128564 A | 5/1993 |
| JP | 06-290462 A | 10/1994 |
| JP | 2004-273024 A | 9/2004 |
| JP | 2005-293637 A | 10/2005 |
| JP | 2007-213754 A | 8/2007 |
| JP | 2008135155 A | 6/2008 |
| JP | 2008287851 A | 11/2008 |
| JP | 2008305459 A | 12/2008 |
| WO | 2008053548 A1 | 5/2008 |

OTHER PUBLICATIONS

Office Action from Japanese Application No. 2009-011213, dated Nov. 9, 2010.

* cited by examiner

*Primary Examiner* — LaTanya Bibbins
(74) *Attorney, Agent, or Firm* — Lerner, David, Littenberg, Krumholz & Mentlik, LLP

(57) ABSTRACT

There is provided an optical disk apparatus causing a hologram device to diffract a reflected light beam and causes each of reflected light beams of primary light in a longitudinal direction to generate received light signals by receiving the reflected light beams through receiving regions of a receiving unit before a preformatted signal being generated by a signal processing unit based on the received light signals. Therefore, the preformatted signal that excludes an influence of a stray light pattern by an interlayer stray light beam from a plurality of recording layers can be generated.

12 Claims, 44 Drawing Sheets

LONGITUDINAL DIRECTION (TRACK RUNNING DIRECTION)

INNER CIRCUMFERENTIAL SIDE ↔ OUTER CIRCUMFERENTIAL SIDE

TRANSVERSE DIRECTION

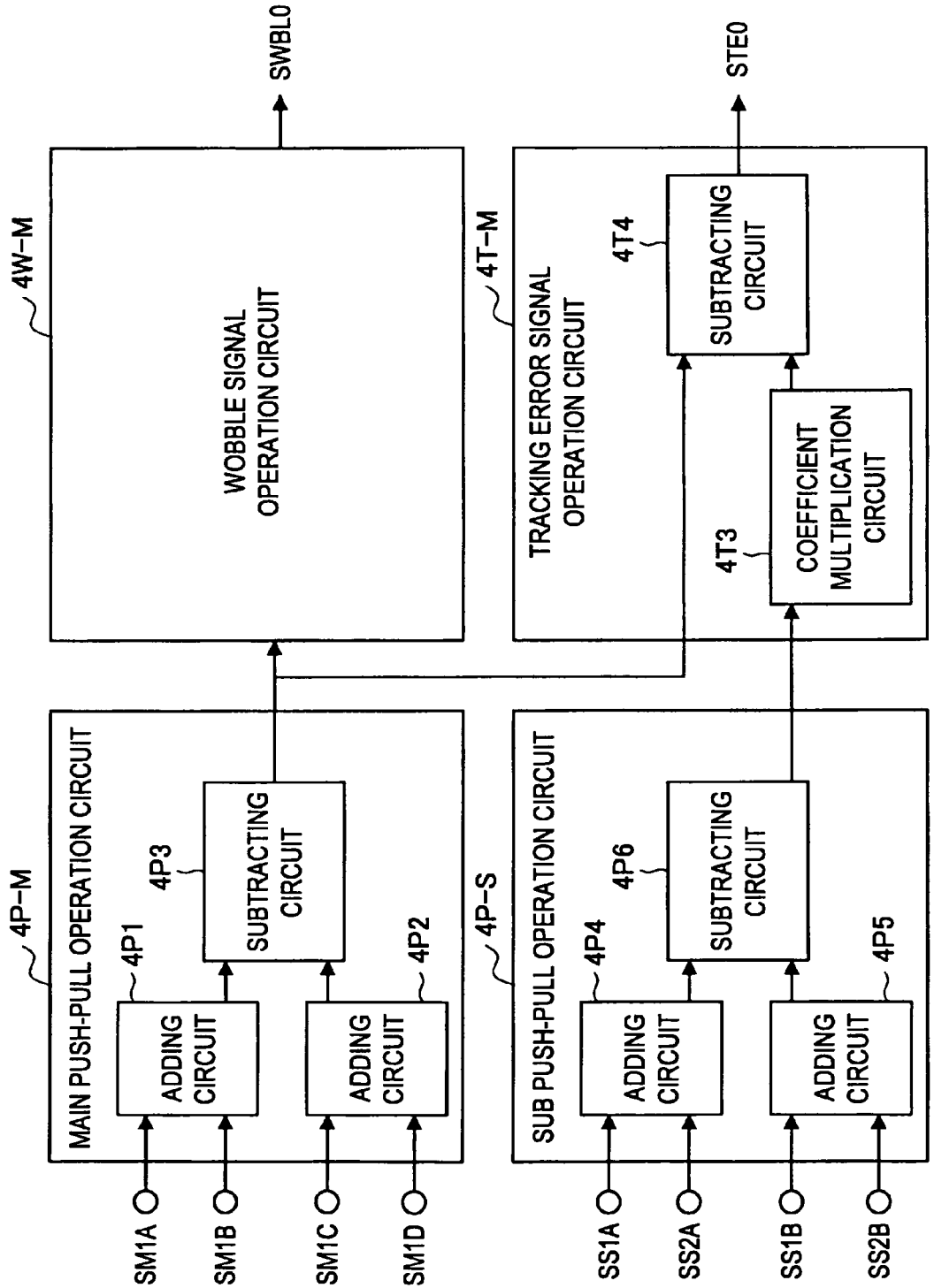

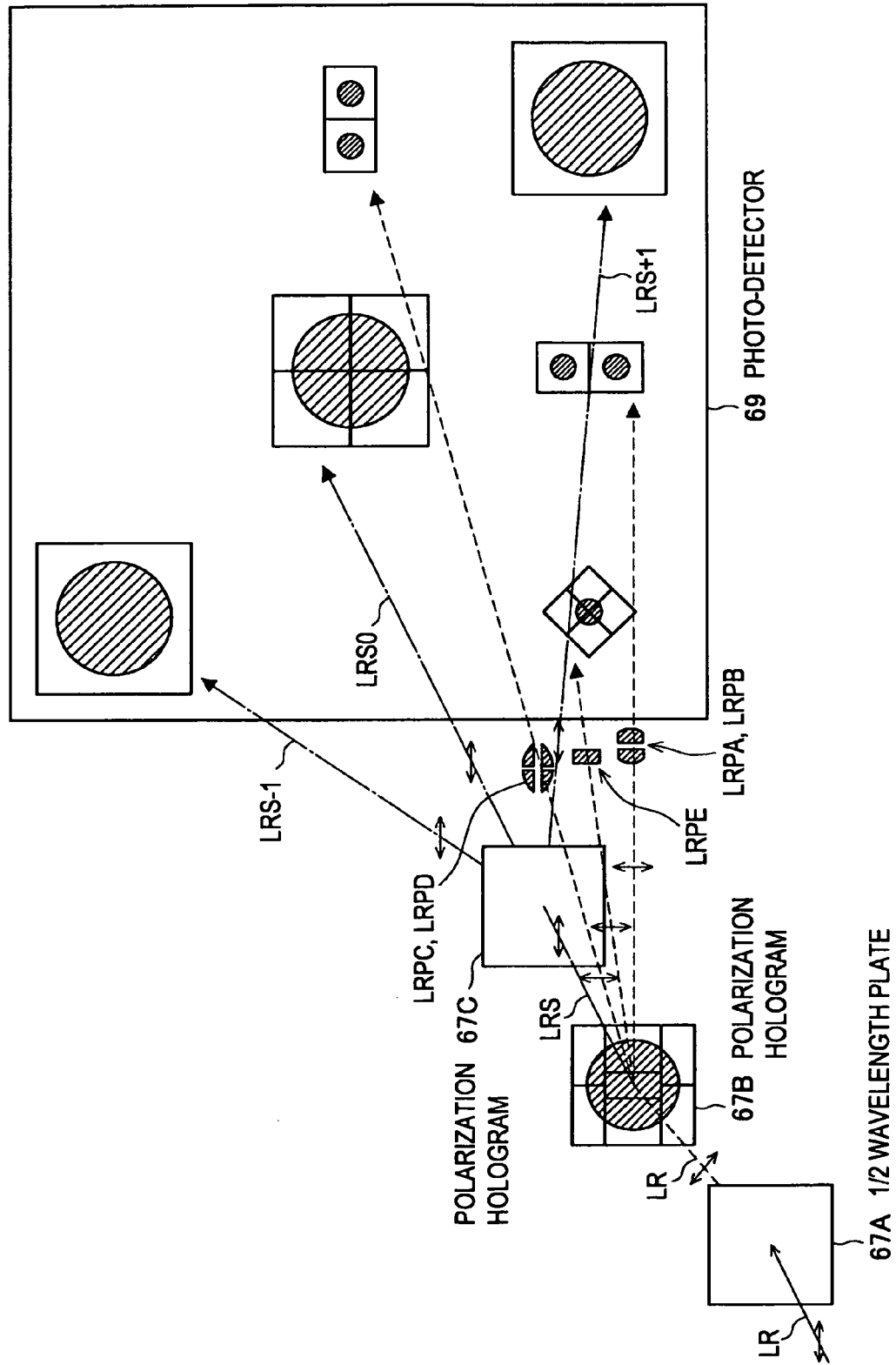

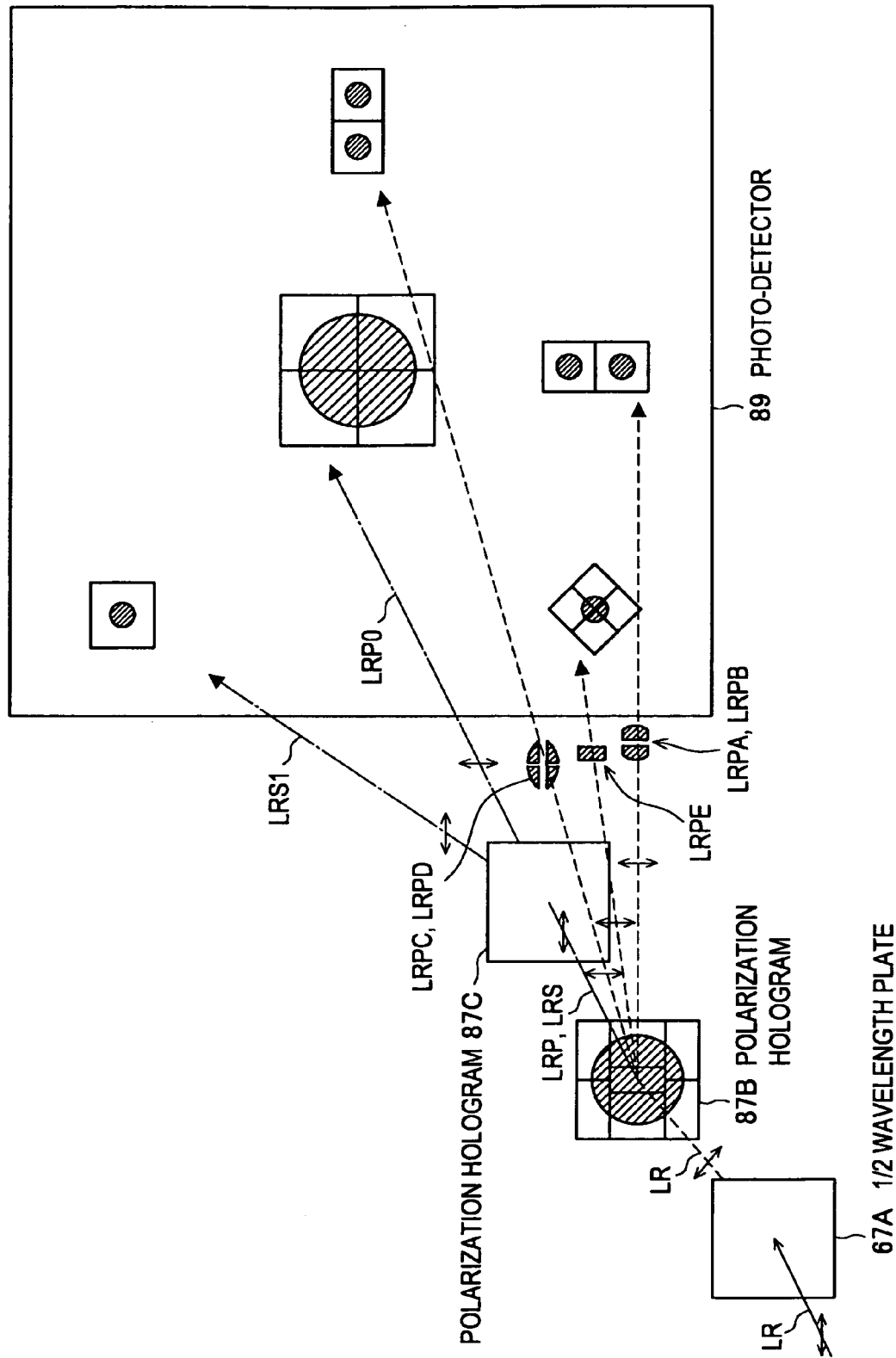

161

162

OPTICAL DISK APPARATUS, OPTICAL PICKUP, PREFORMATTED SIGNAL GENERATION METHOD AND PROGRAM

CROSS-REFERENCE TO RELATED APPLICATION

The present application claims priority from Japanese Patent Application No. JP 2009-011213 filed in the Japanese Patent Office on Jan. 21, 2009, the entire content of which is incorporated herein by reference.

BACKGROUND OF THE INVENTION

1. Field of the Invention

The present invention relates to an optical disk apparatus, an optical pickup, a preformatted signal generation method, and a program and is suitably applied to, for example, an optical disk apparatus compatible with an optical disk having a plurality of recording layers.

2. Description of the Related Art

Optical disk apparatuses developed at a rapid pace in recent years reproduce information by irradiating an optical disk such as a CD (Compact Disc), DVD (Digital Versatile Disc), and Blu-ray Disc (registered trademark, hereinafter referred to as the BD) with a light beam and reading a reflected light thereof.

On this optical disk, information to be recorded is recorded on tracks formed in a spiral fashion or concentrically after being encoded and modulated as pits or the like.

Thus, an optical disk apparatus condenses a light beam by an objective lens and, when information is reproduced from an optical disk, focuses the light beam on tracks formed in a spiral fashion or concentrically in a recording layer of the optical disk.

At this point, the optical disk apparatus receives a reflected light by providing, for example, a receiving region in a predetermined shape in a photo-detector. Then, based on a reception result thereof, the optical disk apparatus calculates a "focus error signal" and a "tracking error signal" representing shift amounts between the track that should be irradiated with the light beam (hereinafter, referred to as the "target track") and the focus of the light beam in a focus direction and a tracking direction respectively.

Subsequently, the optical disk apparatus adjusts the focus of the light beam to the target track by moving the objective lens in the focus direction based on the focus error signal and also moving the objective lens in the tracking direction based on the tracking error signal.

Various methods such as the push-pull method and three-beam method are known as calculation methods of such a tracking error signal and further, a method called the one-beam push-pull method is also proposed (see, for example, Japanese Patent Application Laid-Open No. 2007-213754 (FIG. 15)).

On the other hand, when the optical disk apparatus records information on an optical disk or reproduces information from the optical disk, the optical disk apparatus acquires information about which position of an optical disk the target track on which the light beam is focused corresponds to (hereinafter, referred to as "address information"). Together with address information or instead of address information, "time information" representing an absolute time indicating an end position of recorded portions or a start position of non-recorded portions or a recording clock may be acquired. Information embedded in an optical disk in advance like the address information and time information is also called "preformatted information".

Such address information or the like is recorded on an optical disk as preformats using grooves formed along tracks or "lands" between grooves formed also along tracks. For example, the "Land Pre-Pit (LPP) method" and "high-frequency wobble groove method (ADIP: Address In Pre-groove)" can be cited as addition methods of address information or the like.

When the LPP is used, pits are intermittently generated on a land and then, address information or the like is generated from a "pre-pit signal" obtained from such pits. When the ADIP is used, on the other hand, high frequencies are used as "wobble" frequencies formed by causing a groove to meander and address information or the like is generated from the phase of a "wobble signal" obtained from the wobble. In addition, an optical disk on which a signal such as a watermark is superimposed as address information or the like by a sequence of wobble added information pits is practically used.

Such a wobble signal or pre-pit signal is a signal preset on a recording track regardless of a recordable optical disk or read-only optical disk and is also called a "preformatted signal". A light receiving element (photo-detector) to detect the preformatted signal is also used to detect a reproduced RF signal at the same time and, for a light receiving element divided into four parts, is frequently used also to detect a focus error signal or the like (see Japanese Patent Application Laid-Open Nos. 1993-128564 and 1994-290462).

SUMMARY OF THE INVENTION

Some optical disks have a two-layer recording layer and reflect a light beam by each recording layer with a predetermined reflectivity.

An optical disk apparatus controls components thereof in such a way that a light beam is focused on a desired recording layer of an optical disk having a plurality of recording layers and then, detects a reflected light thereof.

However, the optical disk reflects a light beam with typically a predetermined reflectivity in each recording layer due to physical properties regardless of which recording layer is a desired recording layer.

Thus, in the optical disk apparatus, a receiving region of the photo-detector may be irradiated with a light beam reflected by a recording layer different from the desired recording layer (so-called "interlayer stray light"). At this point, the optical disk apparatus may not be able to exercise tracking control due to an error of a tracking error signal caused by the interlayer stray light. Moreover, the optical disk apparatus may cause complex modulation on a reflected light because the interlayer stray light may interfere with the reflected light from the desired recording layer or further, an interlayer distance of the optical disk may change or an optical path length may change after the optical disk being inclined. Such modulation will be superimposed on a wobble signal or pre-pit signal as a noise component, preventing correct reading of address information or the like.

At this point, irradiation conditions of the interlayer stray light are different in the optical disk apparatus depending on which recording layer is set as a desired recording layer.

Thus, in an optical disk apparatus as shown in Japanese Patent Application Laid-Open No. 2007-213754 (FIG. 15), for example, arrangement patterns of the receiving region and division patterns when a reflected light is divided for each region are taken into consideration. Accordingly, regardless of which recording layer is a desired recording layer, the optical disk apparatus is devised so that the interlayer stray light is not shone or an error is not caused in a preformatted signal or tracking error signal even if the interlayer stray light is shone.

Incidentally, providing, for example, four or six recording layers in an optical disk can be considered to increase the recording capacity. Also in this case, the optical disk will reflect a light beam with typically a predetermined reflectivity in each recording layer regardless of which recording layer is a desired recording layer.

At this point, regardless of which recording layer is a desired recording layer, interlayer stray light from other recording layers is typically generated in the optical disk apparatus. Moreover, the interlayer distance between the desired recording layer and another recording layer of the optical disk is different depending on which recording layer is set as a desired recording layer. At this point, the interlayer stray light will have different irradiation conditions in accordance with the interlayer distance.

Thus, an optical disk apparatus of the above configuration may not be able to avoid preventing each interlayer stray light generated in an optical disk having many recording layers such as four layers or six layers from reaching the receiving region. In such a case, the optical disk apparatus may not be able to exercise tracking control because an error is caused in a tracking error signal.

On the other hand, a modulation component may be superimposed on a center portion of signal light emitted from a desired layer performing recording or reproduction by a so-called "beat" generated in wobbles or pre-pits having a different phase or position in adjacent tracks. Like the interlayer stray light, a modulation component caused by such a beat may adversely affect the precision with which a preformatted signal is read and may also adversely affect the generation of correct address information or the like.

Thus, Japanese Patent Application Laid-Open No. 2004-273024 proposes a configuration to perform operations of a wobble signal or the like by a detecting element that does not selectively use the center portion of signal light on a light receiving element. However, when an optical disk having two recording layers or more is used, even an optical disk apparatus described in Japanese Patent Application Laid-Open No. 2004-273024 is affected by the interlayer stray light so that the precision with which a preformatted signal is read may be affected.

In light of the foregoing, it is desirable to provide a novel and improved optical disk apparatus capable of detecting a preformatted signal preset on a recording track of an optical disk with stability while reducing an influence by interlayer stray light, an optical pickup, a preformatted signal generation method, and a program.

According to an embodiment of the present invention, there is provided an optical disk apparatus including a light source that emits a light beam, an objective lens that condenses the light beam to a target recording layer to be a target of one or two or more recording layers provided on an optical disk, a condenser lens that condenses a reflected light beam after the light beam being reflected by the optical disk, a hologram device that, when the reflected light beam is caused to travel in a straight line or diffract to separate into a reflected zero-order light beam and a reflected primary light beam, causes a portion of the reflected primary light beam to diffract in a predetermined first direction by a first region to create a first beam and causes a portion of the reflected primary light beam to diffract in the first direction by a second region to create a second beam, a photo-detector that generates a received light signal each by receiving the first beam and the second beam by a first receiving region and a second receiving region provided at an irradiation position of the reflected zero-order light beam on a side of the first direction respectively, and a signal processing unit that generates a preformatted signal representing preformatted information recorded in track grooves of the optical disk in advance based on the received light signal generated by each of the first receiving region and the second receiving region.

Moreover, the photo-detector may include a zero-order light receiving unit provided at the irradiation position of the reflected zero-order light beam and divided into a plurality of receiving regions and the signal processing unit may include a switching circuit capable of selecting one of the received light signal generated by each of the plurality of receiving regions of the zero-order light receiving unit and the received light signal generated by each of the first receiving region and the second receiving region as the received light signal used for generating the preformatted signal and if the switching circuit selects the received light signal generated by each of the plurality of receiving regions of the zero-order light receiving unit, can generate the preformatted signal based on the received light signal.

Moreover, the first region may correspond to a portion containing + primary light diffracted by the track grooves of the reflected primary light beam and the second region may correspond to a portion containing − primary light diffracted by the track grooves of the reflected primary light beam.

The optical pickup can receive a reflected light beam after being diffracted in mutually different directions regarding a push-pull region where + primary light and − primary light after a light beam of the reflected light beam being diffracted by track grooves are contained and a lens shift region where the + primary light and − primary light are not contained. Accordingly, even an interlayer stray light beam after being reflected by another recording layer close to the target recording layer or another recording layer farthest from the target recording layer can be prevented from being received without the push-pull region and the lens shift region being mutually affected by the interlayer stray light beam.

Moreover, the photo-detector may have the first receiving region and the second receiving region arranged outside an irradiation range of a zero-order light beam generated by an interlayer stray light beam after a portion of the light beam being reflected by the other recording layer farthest apart from the target recording layer on the optical disk being passed through the hologram device in a straight line.

Moreover, the photo-detector may include a zero-order light receiving unit provided at the irradiation position of the reflected zero-order light beam and divided into a plurality of receiving regions and the signal processing unit may generate a reproducing RF signal representing information recorded in the track grooves of the optical disk based on the received light signal generated from each of the plurality of receiving regions of the zero-order light receiving unit.

Moreover, the hologram device may cause almost all of the reflected light beam to diffract in the first region and the second region as the first beam and the second beam respectively and the photo-detector may receive the reflected zero-order light beam that contains no portion corresponding to the first region or the second region by the zero-order light receiving unit.

Moreover, the hologram device may cause the first beam and the second beam to travel by setting a direction substantially in parallel with a running direction in an image of the track grooves as the first direction.

Moreover, the hologram device may cause each of the first beam and the second beam to travel in the first direction by mutually different angles of diffraction in the first beam and the second beam.

Moreover, the photo-detector may have a stray light receiving region that receives interlayer stray light after a portion of the light beam being reflected by the other recording layer other than the target recording layer on the optical disk provided near the first receiving region and the second receiving region.

Moreover, the hologram device may cause a portion of the reflected light beam that does not contain + primary light and − primary light diffracted by the track grooves to diffract in a second direction that is different from the first direction by a third region corresponding to a portion equivalent to an inner circumferential side of the optical disk to create a third beam and causes a portion of the reflected light beam that does not contain the + primary light and the − primary light diffracted by the track grooves to diffract in the second direction by a fourth region corresponding to a portion equivalent to an outer circumferential side of the optical disk to create a fourth beam, the photo-detector may generate a received light signal by receiving the third beam and the fourth beam by a third receiving region and a fourth receiving region, each provided on the side of the second direction at the irradiation position of the reflected zero-order light beam, respectively, the signal processing unit may have a tracking error signal representing an amount of shift between a focus of the light beam concerning the tracking direction and a center line of the track grooves generated based on the received light signal generated by each of the first receiving region, the second receiving region, the third receiving region, and the fourth receiving region, and the optical disk apparatus may include a lens moving unit that moves the objective lens in a tracking direction almost orthogonal to the track grooves formed in a spiral or concentric shape in the target recording layer, and a servo control unit that moves the objective lens in the tracking direction via the lens moving unit based on the tracking error signal.

The optical disk apparatus may further include a second light source that emits a second light beam having a wavelength different from the wavelength of the light beam, a separator that separates the second light beam into a main light beam and two sub-light beams, and a second objective lens that causes the sub-light beams to form a focus each on an inner circumferential side and an outer circumferential side separated from the focus of the main light beam by a predetermined interval in a direction orthogonal to second track grooves by condensing the main light beam and the two sub-light beams to a second optical disk on which the second track grooves that are different from the track grooves are formed in the recording layers, wherein the lens moving unit may move the objective lens and the second objective lens together and the photo-detector may receive a main reflected light beam after the main light beam being reflected by the optical disk by a zero-order light receiving unit and also receives sub reflected light beams after the sub-light beams being reflected by the optical disk each by a fifth receiving region and a sixth receiving region provided at opposite positions by sandwiching the irradiation position of the reflected zero-order light beam.

According to another embodiment of the present invention, there is provided an optical pickup including a light source that emits a light beam, an objective lens that condenses the light beam to a target recording layer to be a target among a plurality of recording layers provided on an optical disk, a condenser lens that condenses a reflected light beam after the light beam being reflected by the optical disk, a hologram device that, when the reflected light beam is caused to travel in a straight line or diffract to separate into a reflected zero-order light beam and a reflected primary light beam, causes a portion of the reflected primary light beam to diffract in a predetermined first direction by a first region to create a first beam and causes a portion of the reflected primary light beam to diffract in the first direction by a second region to create a second beam, and a photo-detector that generates a received light signal each by receiving the first beam and the second beam by a first receiving region and a second receiving region provided at an irradiation position of the reflected zero-order light beam on a side of the first direction respectively, wherein a preformatted signal representing preformatted information recorded in track grooves of the optical disk in advance is generated by a predetermined signal processing unit based on the received light signal generated by each of the first receiving region and the second receiving region.

According to another embodiment of the present invention, there is provided a preformatted signal generation method including the steps of emitting a light beam by a light source, condensing the light beam to a target recording layer to be a target among a plurality of recording layers provided on an optical disk by an objective lens, condensing a reflected light beam after the light beam being reflected by the optical disk by a condenser lens, when the reflected light beam is caused to travel in a straight line or diffract to separate into a reflected zero-order light beam and a reflected primary light beam, causing a portion of the reflected primary light beam to diffract in a predetermined first direction by a first region to create a first beam and causes a portion of the reflected primary light beam to diffract in the first direction by a second region to create a second beam by a hologram device, generating a received light signal each by receiving the first beam and the second beam by a first receiving region and a second receiving region provided at an irradiation position of the reflected zero-order light beam of a photo-detector on a side of the first direction respectively, and generating a preformatted signal representing preformatted information recorded in track grooves of the optical disk in advance based on the received light signal generated by each of the first receiving region and the second receiving region by a signal processing unit.

According to another embodiment of the present invention, there is provided a program for causing a computer to realize a control function that controls an optical pickup including a light source that emits a light beam, an objective lens that condenses the light beam to a target recording layer to be a target among a plurality of recording layers provided on an optical disk, a condenser lens that condenses a reflected light beam after the light beam being reflected by the optical disk, a hologram device that, when the reflected light beam is caused to travel in a straight line or diffract to separate into a reflected zero-order light beam and a reflected primary light beam, causes a portion of the reflected primary light beam to diffract in a predetermined first direction by a first region to create a first beam and causes a portion of the reflected primary light beam to diffract in the first direction by a second region to create a second beam, and a photo-detector that generates a received light signal each by receiving the first beam and the second beam by a first receiving region and a second receiving region provided at an irradiation position of the reflected zero-order light beam on a side of the first direction respectively and a signal processing function that generates a preformatted signal representing preformatted information recorded in track grooves of the optical disk in advance based on the received light signal generated by each of the first receiving region and the second receiving region.

According to the present invention as described above, a preformatted signal preset on a recording track on an optical disk can be detected with stability.

BRIEF DESCRIPTION OF THE DRAWINGS

FIG. 10B is an approximate diagram showing a configuration example of a tracking error signal operation circuit and a wobble signal operation circuit according to the first embodiment;

FIG. 18 is an approximate perspective view showing how the light beam is separated according to the third embodiment;

FIG. 24 is an approximate diagram showing the configuration of a photo-detector according to the fourth embodiment;

DETAILED DESCRIPTION OF THE EMBODIMENTS

Figure 1:
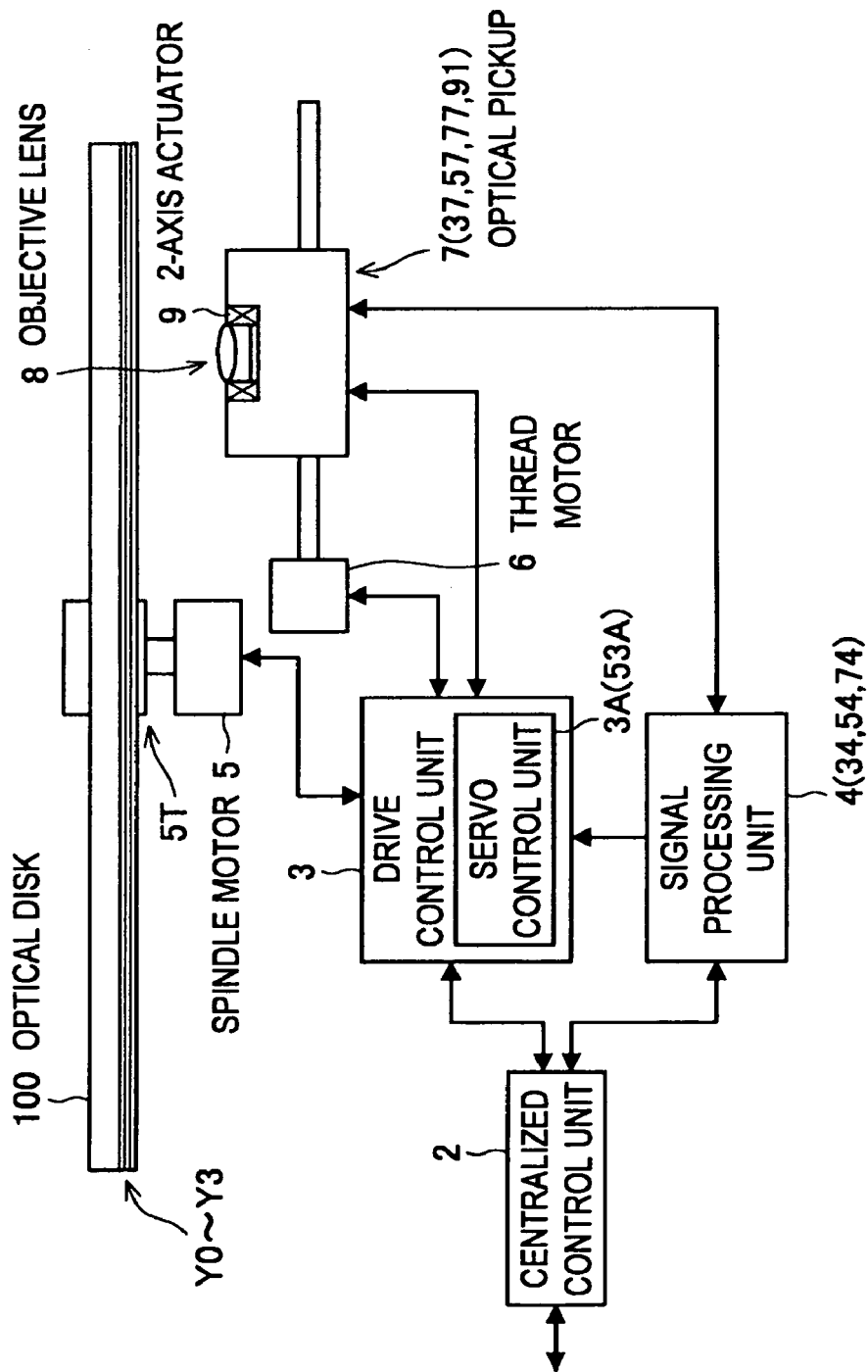
FIG. 1 is an approximate diagram showing a configuration of an optical disk apparatus according to a first embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Each embodiment of the present invention will be described below in the order shown below to make an understanding thereof easier:

<1. First Embodiment>
 [1-1. Configuration of Optical Disk Apparatus]
 [1-2. Configuration of Optical Pickup]
  [1-2-1. Hologram device 17]
  [1-2-2. Photo-detector 19]
 [1-3. Irradiation of Stray Light and Arrangement of Receiving Regions]
 [1-4. Generation of Preformatted Signal and the Like]
  [1-4-1. Focus error signal SFE1]
  [1-4-2. Tracking error signal STE1]
  [1-4-3. Focus control and tracking control]
  [1-4-4. Reproducing RF signal SRF]
  [1-4-5. Preformatted signal]
 [1-5. Type Determination of Optical Disk]
 [1-6. Operation and Effect]
  [1-6-1. Operation]
  [1-6-2. Effect]
  [1-6-3. Comparison with related technology]
<2. Second Embodiment>
<3. Third Embodiment>
 [3-1. Configuration of Optical Disk Apparatus]
 [3-2. Configuration of Optical Pickup]
 [3-3. Generation of Preformatted Signal or the Like]
 [3-4. Operation and Effect]
  [3-4-1. Operation]
  [3-4-2. Effect]
<4. Fourth Embodiment>
 [4-1. Configuration of Optical Disk Apparatus]
 [4-2. Configuration of Optical Pickup]
 [4-3. Generation of Preformatted Signal and the Like]
 [4-4. Operation and Effect]
  [4-4-1. Operation]
  [4-4-2. Effect]
<5. Fifth Embodiment>
 [5-1. Configuration of Optical Disk Apparatus]
 [5-2. Configuration of Optical Pickup]
 [5-3. Operation and Effect]
  [5-3-1. Operation]
  [5-3-2. Effect]
<6. Sixth Embodiment>
 [6-1. Configuration of Optical Disk Apparatus]
 [6-2. Configuration of Optical Pickup]
  [6-2-1. Irradiation of the Optical Disk 100B of BD Mode with Light Beam and Light Reception]
  [Switching of Wobble Signal]
  [6-2-2. Irradiation of the Optical Disk 100C of CD Mode with Light Beam and Light Reception]
  [6-2-3. Irradiation of the Optical Disk 100D of DVD Mode with Light Beam and Light Reception]
 [6-3. Operation and Effect]
  [6-3-1. Operation]
  [6-3-2. Effect]
<7. Other Embodiments>

1. First Embodiment

[1-1. Configuration of Optical Disk Apparatus]

As shown in FIG. 1, an optical disk apparatus 1 is configured around a centralized control unit 2 and records information on an optical disk 100 and reproduces information from the optical disk 100.

The optical disk 100 has a groove in a spiral or concentric shape in a recording layer Y and information is recorded along the groove. Incidentally, the optical disk 100 has, for example, four layers of recording layers Y0, Y1, Y2, and Y3 (hereinafter, these layers are together called the recording layer Y).

The centralized control unit 2 includes a CPU (Central Processing Unit) (not shown), ROM (Read Only Memory) (not shown) in which various programs are stored, and RAM (Random Access Memory) (not shown) used as a work memory of the CPU.

When information is reproduced from the optical disk 100 or information is recorded on the optical disk 100, the centralized control unit 2 drives a spindle motor 5 to rotate via a drive control unit 3 to rotate the optical disk 100 placed on a turntable 5T at a desired speed.

The centralized control unit 2 also causes an optical pickup 7 to move in a tracking direction, that is, in a direction toward an inner circumference or outer circumference along a moving axis by driving a thread motor 6 via the drive control unit 3.

The optical pickup 7 has a plurality of parts such as an objective lens 8 and 2-axis actuator 9 mounted thereon and irradiates the optical disk 100 with a light beam based on control of the centralized control unit 2.

Incidentally, when the optical disk 100 is irradiated with a light beam, the centralized control unit 2 selects, among the recording layers Y0 to Y3, the recording layer Y from which information is to be read, that is, the recording layer Y on which a light beam should be focused as a target recording layer YT.

The optical pickup 7 receives a reflected light beam after a light beam being reflected by the optical disk 100 and also generates a received light signal in accordance with a result of the received light to supply the received light signal to a signal processing unit 4.

The signal processing unit 4 generates a respective focus error signal, tracking error signal, or address information by performing predetermined operation processing using the supplied received light signal and supplies the focus error signal, tracking error signal, or address information to the drive control unit 3 or the like.

A servo control unit 3A of the drive control unit 3 generates a drive signal to drive the objective lens 8 based on the supplied focus error signal and tracking error signal and supplies the drive signal to the 2-axis actuator 9 of the optical pickup 7.

The 2-axis actuator 9 of the optical pickup 7 exercises focus control and tracking control of the objective lens 8 based on the drive signal to adjust the focal point of a light beam condensed by the objective lens 8 (details will be described later).

After receiving a notification of the target recording layer YT from the centralized control unit 2, the drive control unit 3 exercises focus control so that the light beam is focused on the target recording layer YT.

The signal processing unit 4 reproduces information recorded on the optical disk 100 by performing predetermined operation processing, demodulation processing, and decoding processing on a received light signal.

When information is recorded on the optical disk 100, the centralized control unit 2 receives information to be recorded from an external device (not shown) or the like and supplies the information to the signal processing unit 4. The signal processing unit 4 generates a signal for recording by performing predetermined encoding processing, modulation processing, and the like on the information and supplies the signal for recording to the optical pickup 7. At this point, the centralized control unit 2 acquires preformatted information such as address information and time information from the signal processing unit 4 and exercises control of the recording start position, recording/reproduction timing and the like based on the information. Such preformatted information may also be used similarly when information recorded on the optical disk 100 is reproduced.

The optical pickup 7 forms a recording mark in accordance with the signal for recording by setting a light beam as intensity for recording and also modulating the light beam in accordance with the signal for recording. For example, if the optical disk 100 has the same recording mode as BD-RE (Blu-ray Disc-Rewritable), the recording mark is formed by locally changing the phase of material forming the recording layer.

Thus, the optical disk apparatus 1 performs reproduction processing or recording processing of information by causing the optical pickup 7 to irradiate the optical disk 100 with a light beam and exercising focus control and tracking control based on a reflected light thereof.

[1-2. Configuration of Optical Pickup]

Figure 2:
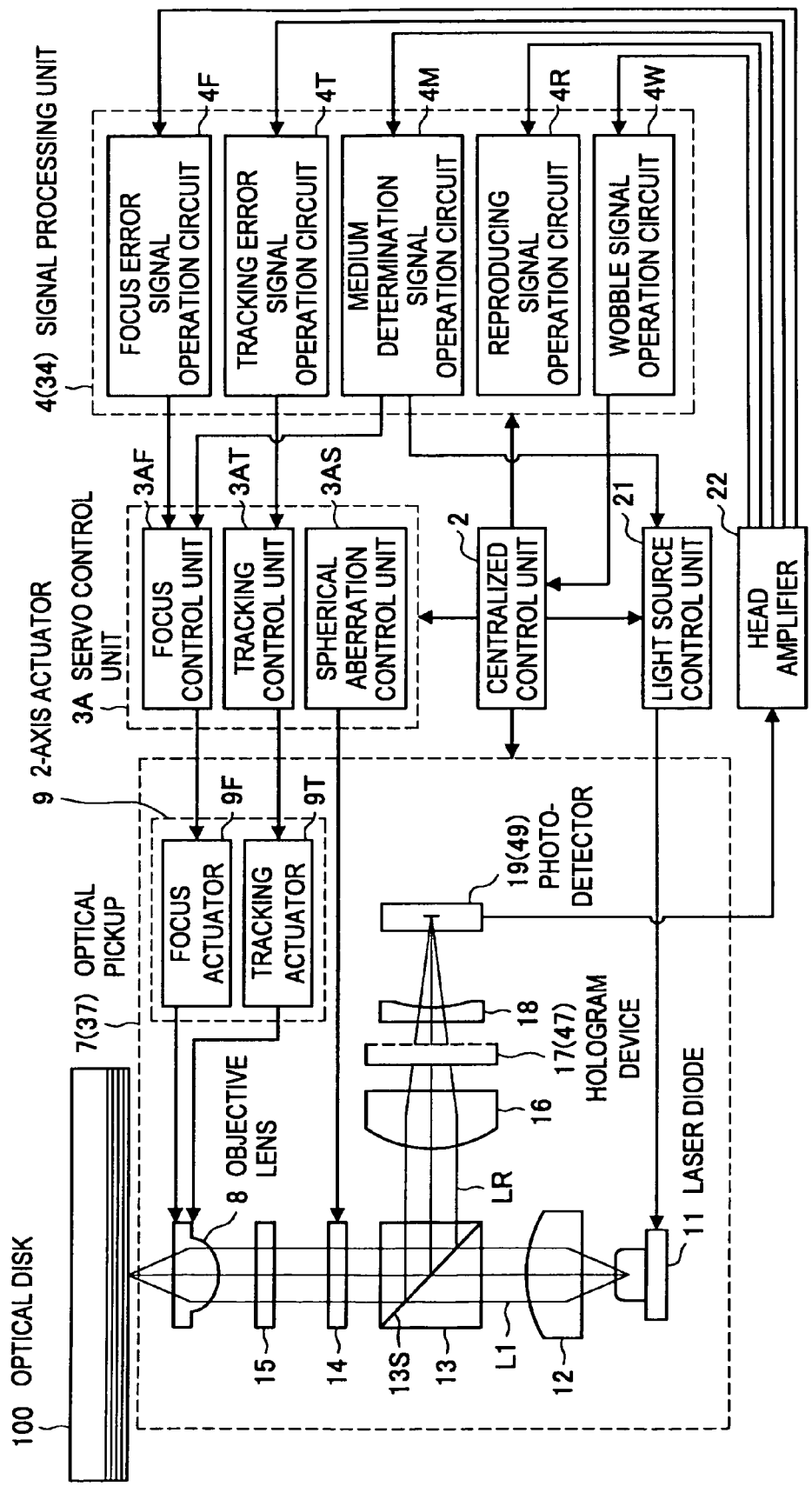
FIG. 2 is an approximate diagram showing the configuration of an optical pickup according to the first embodiment.

As shown in FIG. 2, the optical pickup 7 irradiates the optical disk 100 with a light beam L1 and receives a reflected light beam LR after the light beam L1 being reflected by the optical disk 100.

A laser diode 11 emits the light beam L1 consisting of violet laser light whose wavelength is, for example, 405 [nm] as a diverging ray under the control of a light source control unit 21. The laser diode 11 is adjusted in its mounting angle so that the light beam L1 becomes P polarization.

Actually, the centralized control unit 2 causes the laser diode 11 to emit a light beam L before causing the light beam L to enter a collimator lens 12 by controlling the light source control unit 21. The collimator lens 12 converts the light beam L from a diverging ray into a parallel light before causing the light beam L to enter a polarized beam splitter 13.

The polarized beam splitter 13 has a reflection/transmission surface 13S whose transmissivity changes depending on the polarization direction of a light beam and transmits a light beam of P polarization in an almost 100% ratio and also reflects a light beam of S polarization in an almost 100% ratio.

Actually, the polarized beam splitter 13 causes the reflection/transmission surface 13S to transmit the light beam L1 in an almost 100% ratio before causing the light beam L1 to enter a spherical aberration correction unit 14.

The spherical aberration correction unit 14 includes, for example, a liquid crystal device and changes a spherical aberration of the light beam L1 to cause the light beam L1 to enter a ¼ wave plate 15. The spherical aberration correction unit 14 also adjusts the degree of change of the spherical aberration due to the liquid crystal device by a spherical aberration control unit 3AS of the servo control unit 3A. As the spherical aberration correction unit shown in FIG. 2, a beam expander can also be used (see a third embodiment or the like). The spherical aberration correction unit 14 consisting of a beam expander has concave lenses and convex lenses arranged along a traveling direction of the light beam L1 and concave lenses are driven back and forth in an optical axis direction by the spherical aberration control unit 3AS of the servo control unit 3A. As a result, the light beam L1 entering the objective lens 8 is converted into a parallel light, diverging ray, and converging ray.

Actually, based on control of the centralized control unit 2 and the spherical aberration control unit 3AS, the spherical aberration correction unit 14 provides a spherical aberration having characteristics inverse to those of a spherical aberration generated when the light beam L1 is condensed and reaches the target recording layer YT of the optical disk 100 to the light beam L1 in advance. Accordingly, the spherical aberration correction unit 14 can correct the spherical aberration when the light beam L1 reaches the target recording layer YT.

The ¼ wave plate 15 is enabled to interconvert a light beam between linear polarization and circular polarization and converts, for example, the light beam L1 consisting of the P polarization into left circular polarization before causing the left circular polarization to enter the objective lens 8.

The objective lens 8 condenses the light beam L1. Here, the centralized control unit 2 makes adjustments of position in a focus direction of the objective lens 8 by a focus actuator 9F via a focus control unit 3AF. Thus, the objective lens 8 can roughly align a focus F1 of the light beam L1 with the target recording layer YT of the optical disk 100.

At this point, the light beam L1 becomes a reflected light beam LR after being reflected by the target recording layer YT to cause the reflected light beam LR to enter the objective lens 8. The reflected light beam LR becomes right circular polarization because the direction of rotation of the circular polarization is reversed when reflected.

Figure 3:
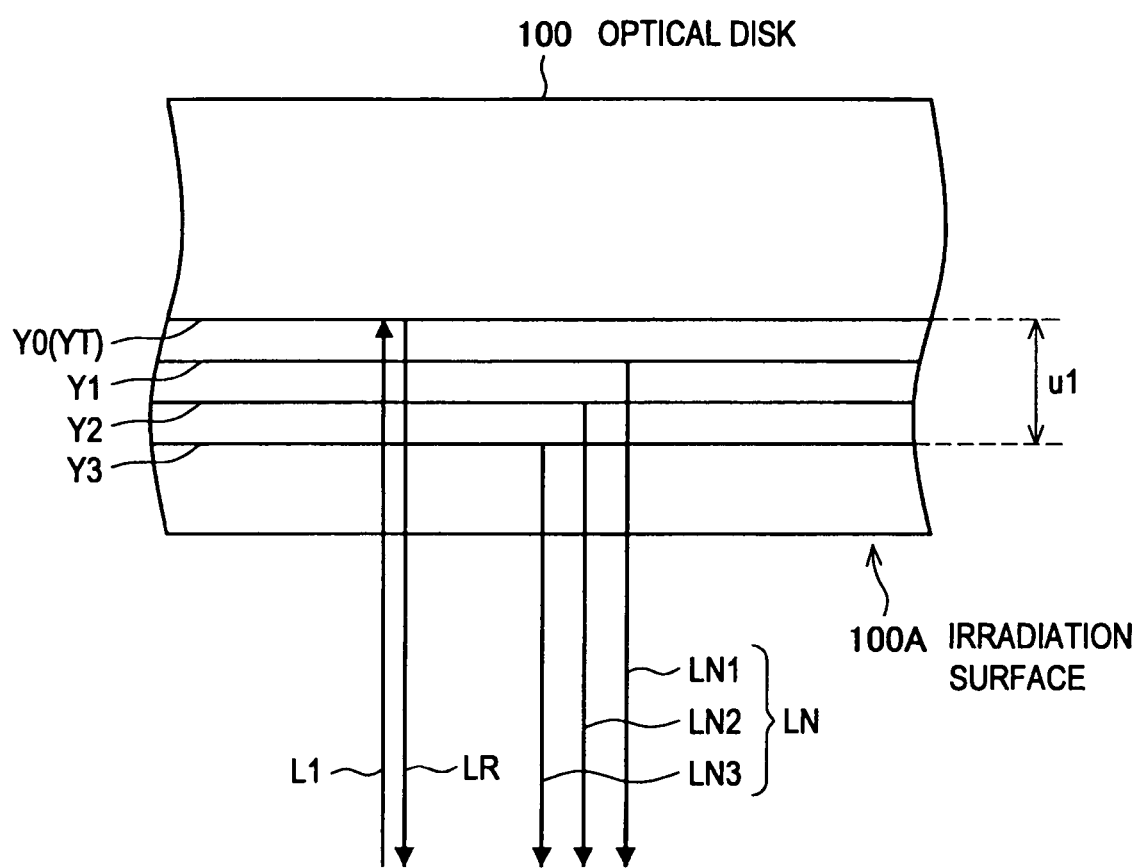
FIG. 3 is an approximate diagram serving to illustrate reflection of a light beam by a recording layer of an optical disk.

If, for example, the recording layer Y0 is the target recording layer YT, as shown in FIG. 3, the light beam L1 becomes the reflected light beam LR after being reflected by the target recording layer YT.

Then, the reflected light beam LR is converted from a diverging ray into a parallel light by the objective lens 8 and converted from right circular polarization into S polarization (linear polarization) by the ¼ wave plate 15 before being further caused to enter the spherical aberration correction unit 14.

The spherical aberration correction unit 14 corrects a spherical aberration generated before the reflected light beam LR passes through the objective lens 8 after being reflected by the target recording layer YT and causes the reflected light beam LR to enter the polarized beam splitter 13.

The polarized beam splitter 13 reflects the reflected light beam LR consisting of S polarization on the reflection/transmission surface 13S to cause the reflected light beam LR to enter a condenser lens 16. The condenser lens 16 converts the reflected light beam LR into a converging ray before causing the reflected light beam LR to enter a hologram device 17.

[1-2-1. Hologram Device 17]

As shown in FIG. 4, the hologram device 17 uses properties as a diffracting device to cause the reflected light beam LR to travel in a straight line or diffract to separate the reflected light beam LR at least into zero-order light and primary light. Then, the hologram device 17 causes a reflected light beam LR0 consisting of the zero-order light to travel in an almost straight line and also a reflected light beam LR1 consisting of the primary light to travel in a direction different from that of the zero-order light before causing the reflected light beam LR1 to enter a cylindrical lens 18.

Figure 4A:
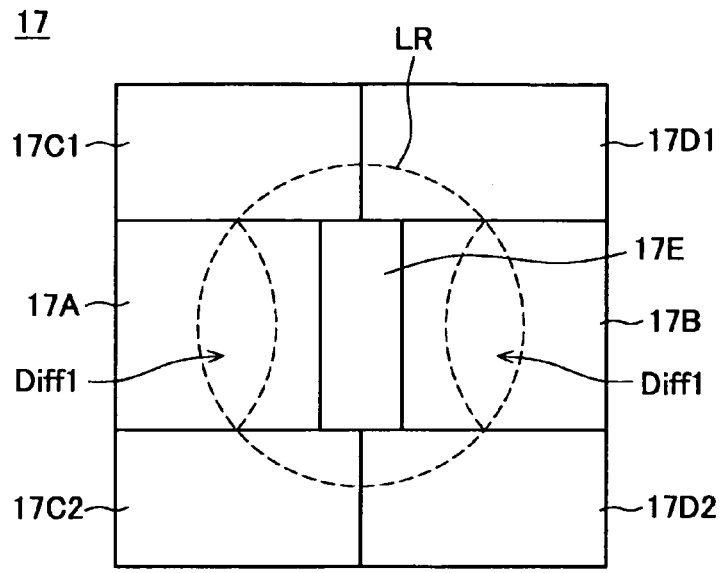
FIG. 4 is an approximate diagram showing the configuration of a hologram device according to the first embodiment.
Figure 4B:
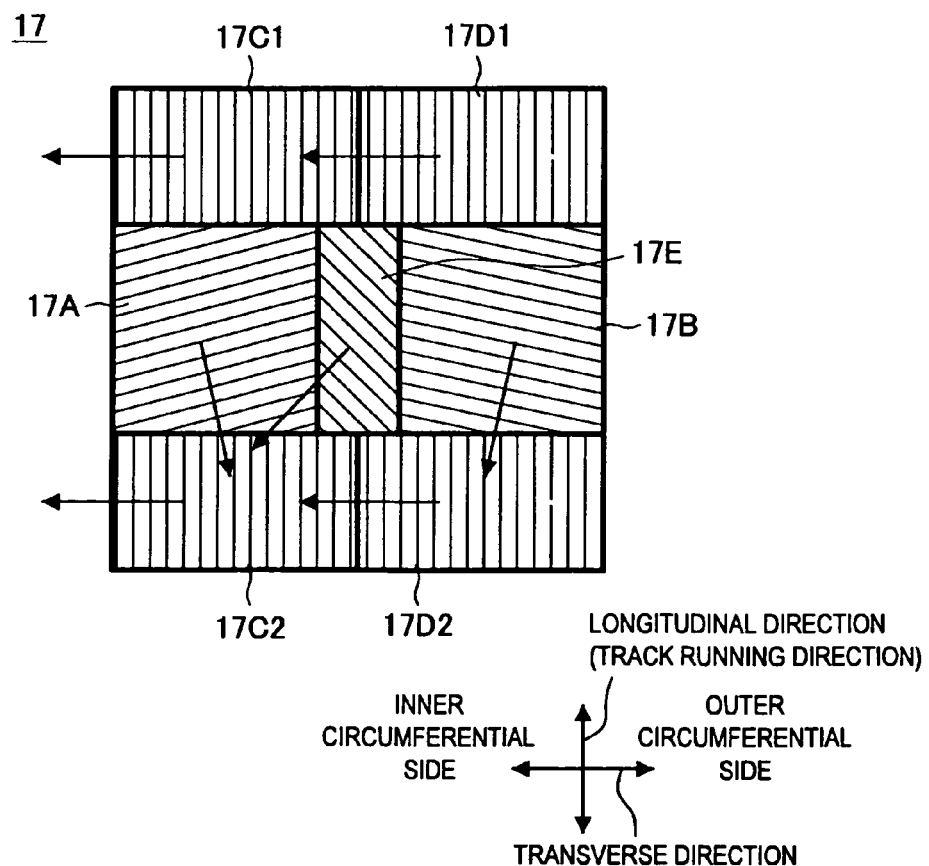

Here, the hologram device 17 has, as shown in FIG. 4A, a passage portion of the reflected light beam LR divided into a plurality of regions 17A to 17E and, as shown in FIG. 4B, the diffraction direction of the reflected light beam LR is set for each region.

The region 17A contains, of the reflected light beam LR1, primary diffracted light Diff1 diffracted by tracks of the optical disk 100 (that is, + primary light or − primary light) and converts a portion corresponding to an inner circumferential portion of the optical disk 100 into a reflected light beam LR1A. In this case, the region 17A diffracts the reflected light beam LR1A in a direction almost along a running direction of tracks (for convenience sake, hereinafter, the direction will be called a longitudinal direction).

The region 17B contains, of the reflected light beam LR1, primary diffracted light Diff1 diffracted by tracks of the optical disk 100 (that is, − primary light or + primary light) and converts a portion corresponding to an outer circumferential portion of the optical disk 100 into a reflected light beam LR1B. In this case, the region 17B causes the reflected light beam LR1B to diffract almost in the longitudinal direction and slightly larger than the reflected light beam LR1A.

Regions 17C1 and 17C2 (hereinafter, these regions are called the region 17C together) convert a portion of the reflected light beam LR1 that barely contains the primary diffracted light Diff1 diffracted by tracks of the optical disk 100 into a reflected light beam LR1C. In this case, the region 17C causes the reflected light beam LR1C to diffract in a direction almost orthogonal to the running direction of tracks (for convenience sake, hereinafter, the direction will be called a transverse direction).

On the other hand, regions 17D1 and 17D2 (hereinafter, these regions are called the region 17D together) convert another portion of the reflected light beam LR1 that barely contains the primary diffracted light Diff1 diffracted by tracks of the optical disk 100 into a reflected light beam LR1D. In this case, the region 17D causes the reflected light beam LR1D to diffract almost in the transverse direction and slightly smaller than the reflected light beam LR1C.

The reflected light beam LR1C diffracted by the region 17C is, of a region excluding the center portion of the reflected light beam LR1, a portion corresponding to an inner circumferential portion of the optical disk 100. On the other hand, the reflected light beam LR1D diffracted by the region 17D is, of a region excluding the center portion of the reflected light beam LR1, a portion corresponding to an outer circumferential portion of the optical disk 100.

The region 17E converts the center portion of the reflected light beam LR1 into a reflected light beam LR1E. In this case, the region 17E causes the reflected light beam LR1E to diffract in a slanting direction almost midway between the longitudinal direction and the transverse direction, that is, in a lower left direction in FIG. 4.

Thus, the hologram device 17 converts a portion having a push-pull component of the reflected light beam LR1 consisting of primary light into the reflected light beams LR1A and LR1B and causes each of these beams to diffract in the longitudinal direction. The push-pull component means a component whose light quantity changes when the focus F1 of the light beam L1 is displayed to the inner circumferential side or outer circumferential side with respect to the desired track, that is, a modulation component generated in a portion where, of the reflected light beam LR, zero-order light that was not diffracted by tracks of the optical disk 100 and ± primary light diffracted by tracks overlap and interfere.

The hologram device 17 also converts front and rear portions of the reflected light beam LR1 in the running direction of tracks that barely contain the push-pull component into the reflected light beams LR1C and LR1D and causes each of these beams to diffract in the transverse direction.

Incidentally, the hologram device 17 has a so-called binary type hologram formed in each of the regions 17A to 17E and thus, + primary light and − primary light are actually generated by the action of diffraction. In the optical pickup 7, however, only one of the + primary light and the − primary light may be used without using the other as the primary light of diffraction in the hologram device 17.

Thus, the hologram device 17 is constructed to divide the reflected light beam LR1 into a plurality of the reflected light beams LR1A to LR1E by diffracting the reflected light beam LR1 in a direction set for each region. The directions in which the hologram device 17 causes the reflected light beam LR1 to diffract are not limited to the above example and various directions may be set. Moreover, the mode of division into the regions 17A to 17E formed in the hologram device 17 is not limited to the above example.

The cylindrical lens 18 provides astigmatism to the reflected light beam LR0 consisting of zero-order light that travels through the hologram device 17 in a straight line without being diffracted and irradiates a photo-detector 19 with the reflected light beam LR0.

Incidentally, the cylindrical lens 18 similarly provides astigmatism to the reflected light beams LR1A, LR1B, LR1C, LR1D, and LR1E consisting of primary light due to optical properties thereof. However, a wave aberration that cancels out the astigmatism is given to the reflected light beams LR1A to LR1E in advance by diffraction gratings formed in the hologram device 17 so that the reflected light beams LR1A to LR1E have no astigmatism when emitted from the cylindrical lens 18.

[1-2-2. Photo-Detector 19]

Figure 5:
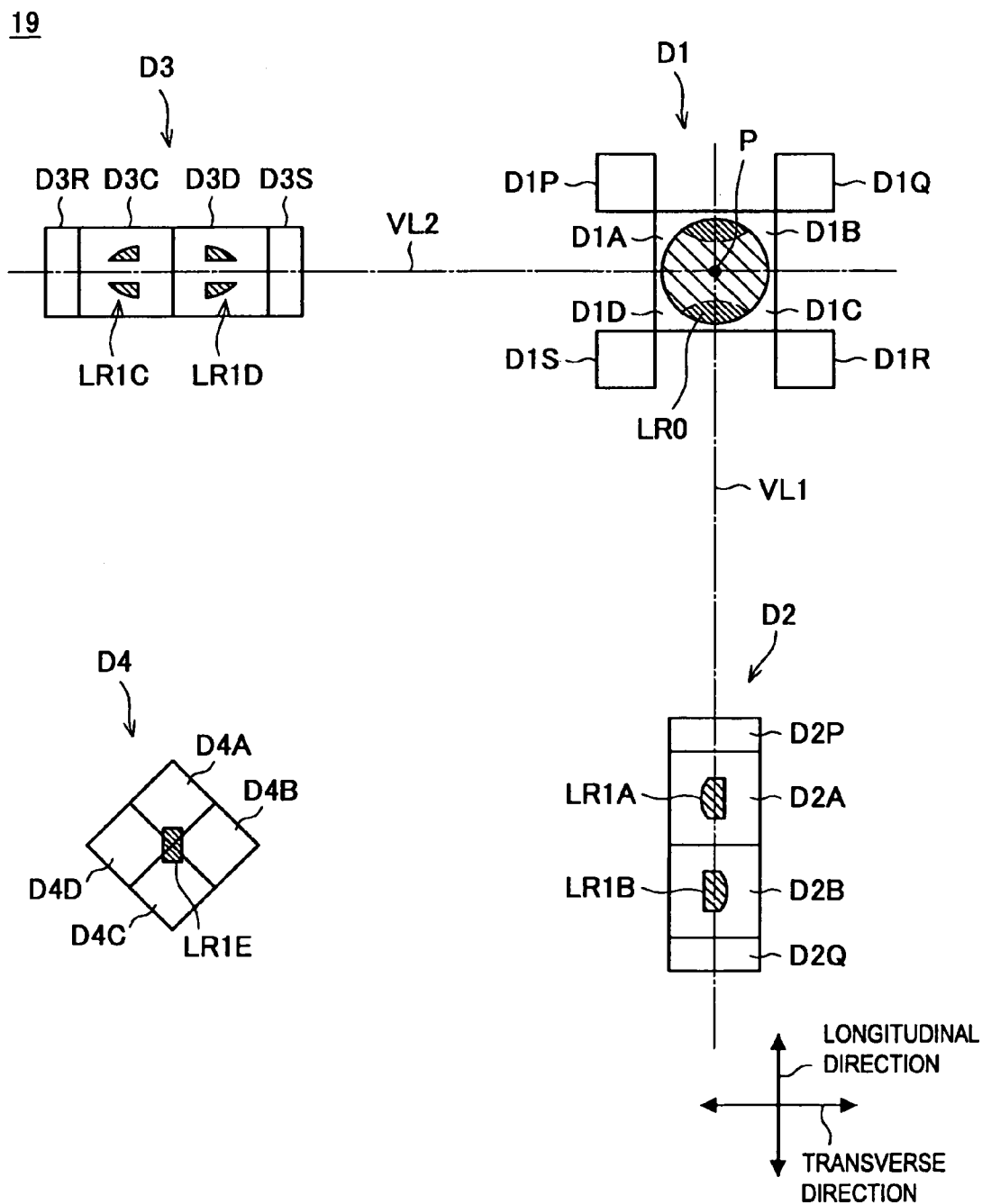
FIG. 5 is an approximate diagram showing the configuration of a photo-detector according to the first embodiment.

As shown in FIG. 5, the photo-detector 19 has a plurality of receiving units (light receiving elements) D1 to D4 formed therein and further, each of the receiving units D1 to D4 has a plurality of receiving regions formed therein.

The receiving unit D1 receives the reflected light beam LR0 by receiving regions D1A, D1B, D1C, and D1D divided into two each in the longitudinal direction and the transverse direction, that is, divided into four in a grid pattern around a reference point P corresponding to the optical axis of the reflected light beam LR0 consisting of zero-order light. Incidentally, the receiving regions D1A to D1D are formed in substantially square shapes having almost the same size.

The receiving regions D1A, D1B, D1C, and D1D also generate received light signals S1A, S1B, S1C, and S1D in accordance with the amount of received light respectively and send these signals to a head amplifier 22 (FIG. 2).

Further, stray light receiving regions D1P, D1Q, D1R, and D1S to detect stray light (details thereof will be described later) are provided around the receiving regions D1A, D1B, D1C, and D1D. The stray light receiving regions D1P, D1Q, D1R, and D1S also generate stray light receiving signals S1P, S1Q, S1R, and S1S in accordance with the amount of received light respectively and send these signals to the head amplifier 22 (FIG. 2).

The receiving unit D2 is provided at a location separated from the reference point P in the longitudinal direction and receiving regions D2A and D2B are arranged by being mutually placed in the longitudinal direction, that is, along a virtual straight line VL1 extending in the longitudinal direction from the reference point P. Incidentally, the receiving regions D2A and D2B are each formed in a substantially square shape having almost the same size.

The receiving regions D2A and D2B receive the reflected light beams LR1A and LR1B containing a push-pull component and generate received light signals S2A and S2B in accordance with the amount of received light respectively before sending these signals to the head amplifier 22 (FIG. 2).

Further, stray light receiving regions D2P and D2Q to detect stray light are provided in the receiving unit D2 along the longitudinal direction so as to be adjacent to the receiving regions D2A and D2B respectively. The stray light receiving regions D2P and D2Q also generate received light signals S2P and S2Q in accordance with the amount of received light respectively and send these signals to the head amplifier 22 (FIG. 2).

The receiving unit D3 is provided at a location separated from the reference point P in the transverse direction and receiving regions D3C and D3D are arranged by being mutually placed in the transverse direction, that is, along a virtual straight line VL2 extending in the transverse direction from the reference point P. Incidentally, the receiving regions D3C and D3D are each formed in a substantially square shape having almost the same size.

The receiving regions D3C and D3D receive the reflected light beams LR1C and LR1D and generate received light signals S3C and S3D in accordance with the amount of received light respectively before sending these signals to the head amplifier 22 (FIG. 2).

Further, stray light receiving regions D3R and D3S to detect stray light are provided in the receiving unit D3 along the transverse direction so as to be adjacent to the receiving regions D3C and D3D respectively. The stray light receiving regions D3R and D3S also generate received light signals S3R and S3S in accordance with the amount of received light respectively and send these signals to the head amplifier 22 (FIG. 2).

The receiving unit D4 is provided at a location separated from the reference point P in a slanting direction (that is, a direction almost midway between the longitudinal direction and the transverse direction) and receives the reflected light beam LR1E by receiving regions D4A, D4B, D4C, and D4D divided into four in a grid pattern. Incidentally, the division direction of each receiving region in the receiving unit D4 is set to an angle of about 45 degrees with respect to the division direction in the receiving unit D4. The receiving regions D4A to D4D are each formed in a substantially square shape having almost the same size.

The receiving regions D4A, D4B, D4C, and D4D generate received light signals S4A, S4B, S4C, and S4D in accordance with the amount of received light respectively and send these signals to the head amplifier 22 (FIG. 2).

Figure 6:
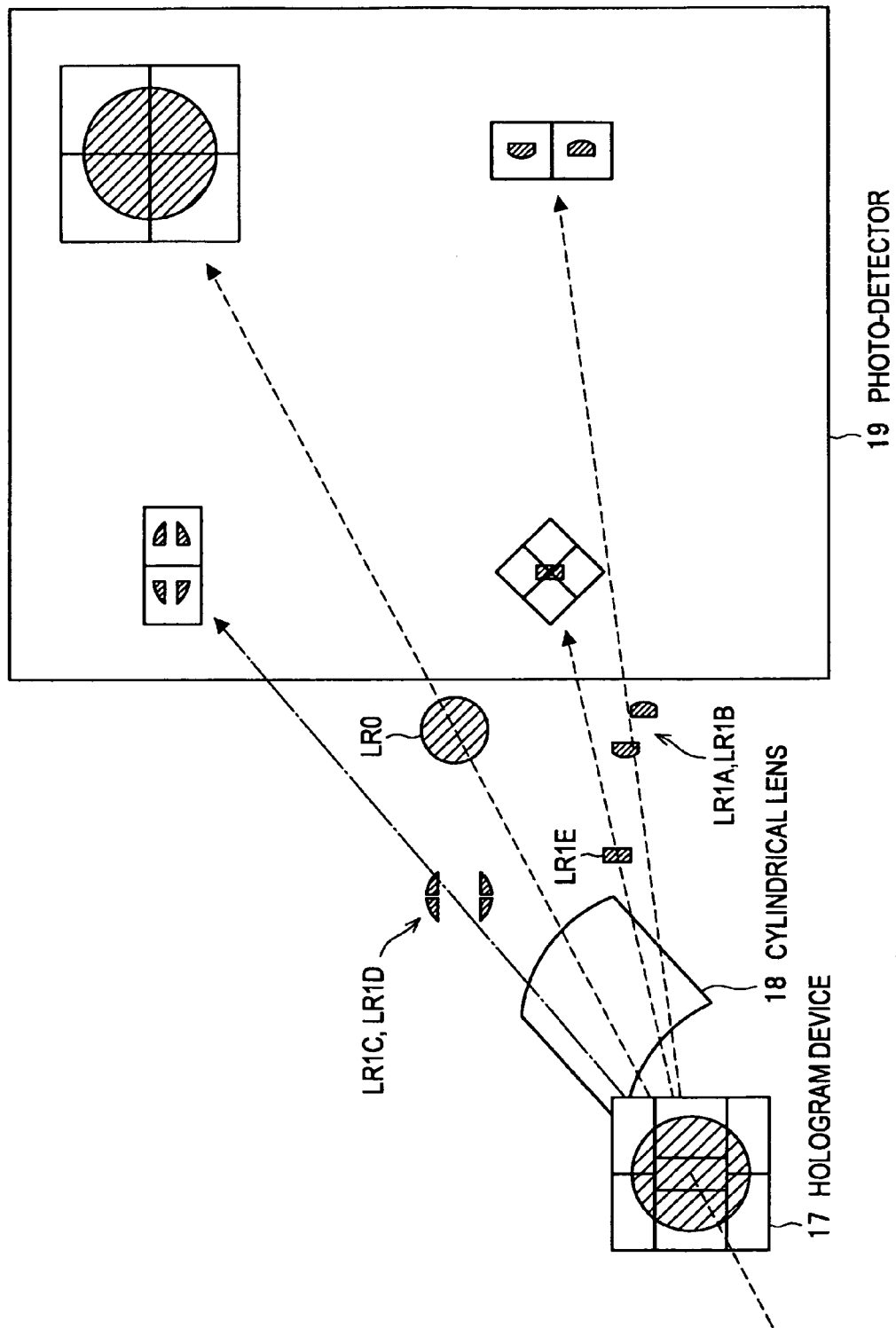
FIG. 6 is an approximate perspective view showing how the light beam is separated according to the first embodiment.

FIG. 6 schematically shows in three dimensions how the reflected light beam LR1 is diffracted by the hologram device 17 in the optical pickup 7 and divided into a plurality of light beams before the photo-detector 19 being irradiated with the light beams.

Thus, the photo-detector 19 receives the reflected light beams LR0 and LR1A to LR1E by the receiving units D1 to D4 and generates received light signals in accordance with the respective amount of received light to supply the received light signals to the head amplifier 22.

Incidentally, in the optical pickup 7, the reflected light beams LR1A, LR1B, LR1C, LR1D, and LR1E almost come into a focus at the photo-detector 19 depending on the design or the like of the condenser lens 16 and the hologram device 17. Thus, a beam spot formed in each of the receiving units D2, D3, and D4 of the photo-detector 19 is converged almost like a point. However, in FIG. 5 and the like, the shape of beam is depicted as it is to make the correspondence of beam easier to understand. In other figures, however, the shape of beam will be depicted like a point or a circle.

[1-3. Irradiation of Stray Light and Arrangement of Receiving Regions]

The optical disk 100 typically causes a light beam to reflect off the recording layers Y0 to Y3 with a respective predetermined reflectivity and the rest to transmit. Therefore, the light beam that has passed through the recording layer Y1 is reflected by the recording layer Y0.

Thus, as shown in FIG. 3, even if, for example, the recording layer Y0 is selected by the optical disk apparatus 1 as the target recording layer YT, the light beam L1 is typically reflected by each of the other recording layers Y1 to Y3. A light beam created after a portion of the light beam L1 being reflected in this manner by the other recording layers Y1 to Y3 is called an interlayer stray light beam LN.

The interlayer stray light beam LN passes through the same optical path as the reflected light beam LR and is reflected by the hologram device 17 before the photo-detector 19 being irradiated with the interlayer stray light beam LN in the end.

However, when compared with the reflected light beam LR, the interlayer stray light beam LN is different in optical path length before the photo-detector 19 is reached after being emitted from the objective lens 8 as the light beam L1.

In the optical pickup 7, the arrangement and optical characteristics of various optics regarding the reflected light beam LR are determined so that the photo-detector 19 becomes a confocal point of the target recording layer YT. Thus, the interlayer stray light beam LN is divided into the same division pattern as the reflected light beam LR and the photo-detector 19 is irradiated in an out-of-focus state, that is, a defocused state.

Further, the optical disk 100 has a plurality of the other recording layers Y1 to Y3 (three layers in this case) and the defocused state on the photo-detector 19 depends on by which of the other recording layers Y1 to Y3 a light beam among the interlayer stray light beams LN is reflected.

Figure 7A:
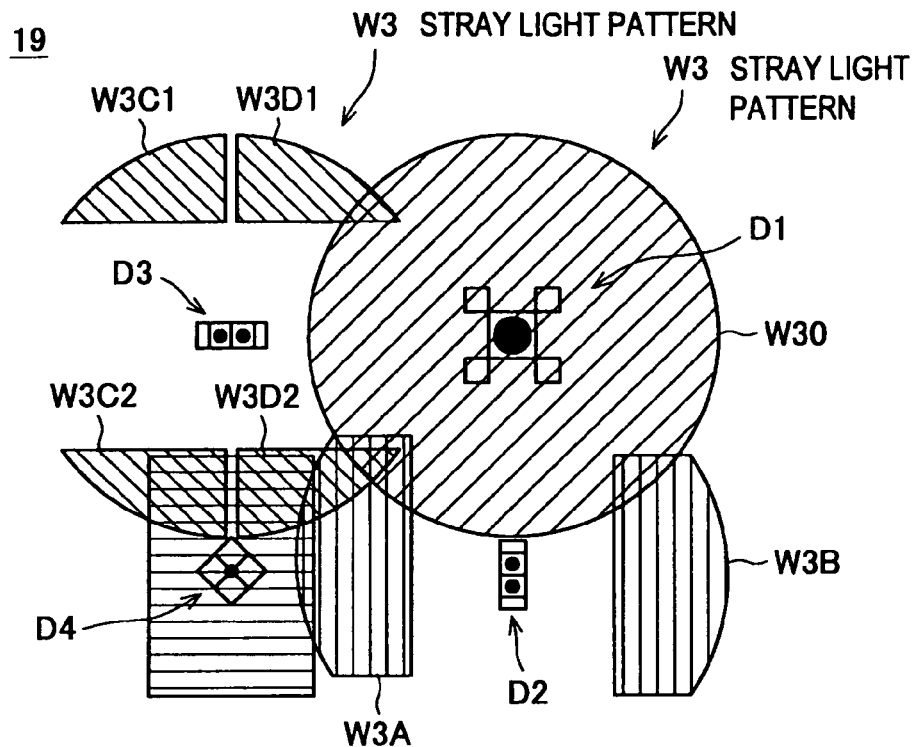
FIG. 7 is an approximate diagram showing formation (1) of a stray light pattern.

As shown in FIG. 7A, the interlayer stray light beam LN reflected by, for example, the recording layer Y3, that is, the recording layer Y located farthest from the recording layer Y0 of the target recording layer YT forms a stray light pattern W3 relatively broadly spread on the photo-detector 19. The interlayer stray light beam LN that forms the stray light pattern W3 is here called an interlayer stray light beam LN3.

The stray light pattern W3 has a stray light pattern W30 of zero-order light formed by the hologram device 17 and stray light patterns W3A and W3B formed by the regions 17A and 17B of primary light. Moreover, the stray light pattern W3 has stray light patterns W3C1, W3C2, W3D1, and W3D2 formed by the regions 17C1, 17C2, 17D1, and 17D2 respectively.

The receiving units D2 and D3 of the photo-detector 19 are arranged, as shown in FIG. 7A, so that the stray light pattern W3 having the broadest irradiation range (that is, stray light from the recording layer Y3 located farthest from the target recording layer YT) is not overlapped. That is, the receiving units D2 and D3 are arranged so that neither the stray light pattern W30, nor the stray light patterns W3A and W3B, nor stray light patterns W3C1, W3C2, W3D1, and W3D2 are overlapped.

On the other hand, the interlayer stray light beam LN reflected by the other recording layer Y1, that is, the recording layer Y close to the recording layer Y0 of the target recording layer YT (hereinafter, called an interlayer stray light beam LN1) forms a stray light pattern W1. The stray light pattern W1 is shrunk to a narrow range on the photo-detector 19.

The stray light pattern W1 corresponds to the stray light pattern W3. That is, the stray light pattern W1 has a stray light pattern W10 of zero-order light formed by the hologram device 17 and stray light patterns W1A and W1B formed by the regions 17A and 17B of primary light. Moreover, the stray light pattern W1 has stray light patterns W1C1, W1C2, W1D1, and W1D2 formed by the regions 17C1, 17C2, 17D1, and 17D2 respectively.

Figure 7B:
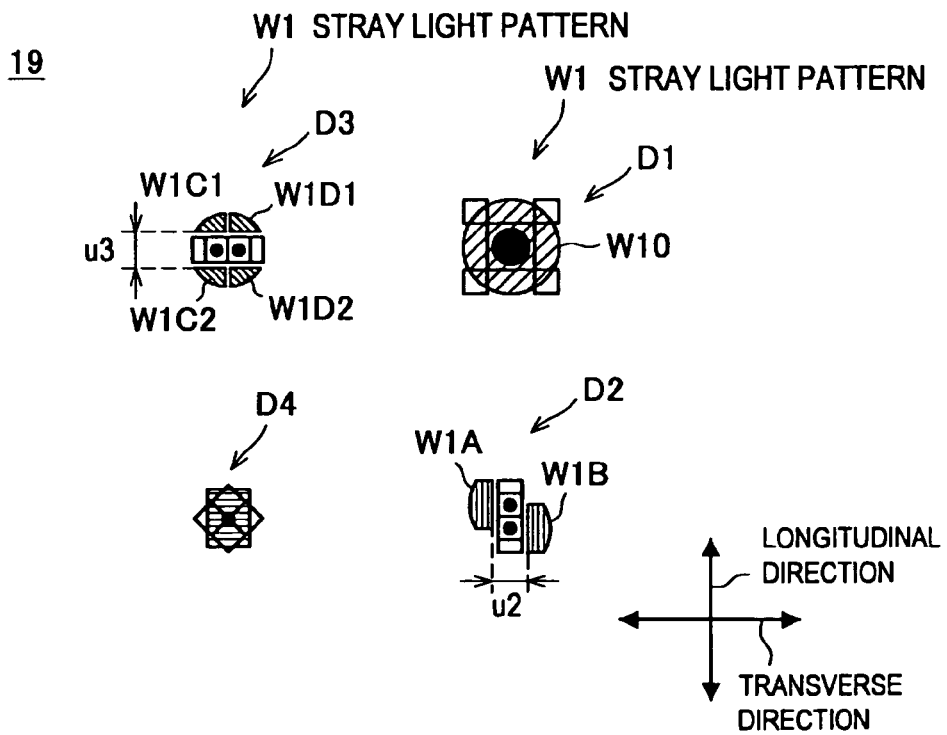

The receiving unit D2 of the photo-detector 19 is arranged, as shown in FIG. 7B, so that the stray light patterns W1A and W1B formed by the regions 17A and 17B of the hologram device 17 are not overlapped for the stray light pattern W1 whose irradiation range is shrunk to the narrowest range.

Here, an interval u2 between the stray light patterns W1A and W1B is, as shown in FIG. 7B, relatively narrow. If the other recording layer Y is located on the back side from the target recording layer YT, the stray light patterns W1A and W1B each move to an inverted position with respect to the virtual straight line VL1 (FIG. 5). Thus, in the photo-detector 19, the receiving regions D2A and D2B are arranged in the longitudinal direction, instead of the transverse direction, and also the width in the transverse direction is set smaller than the interval u2.

The receiving unit D3 of the photo-detector 19 is arranged so that none of the stray light patterns W3C1, W3C2, W3D1, and W3D2 formed by the regions 17C1, 17C2, 17D1, and 17D2 of the hologram device 17 respectively is overlapped for the stray light pattern W1.

Here, an interval u3 between the stray light patterns W1C1 and W1C2 is, as shown in FIG. 7B, relatively narrow. Thus, in the photo-detector 19, the receiving regions D3C and D3D are arranged in the transverse direction, instead of the longitudinal direction, and also the width in the transverse direction is set smaller than the interval u3.

Figure 8:
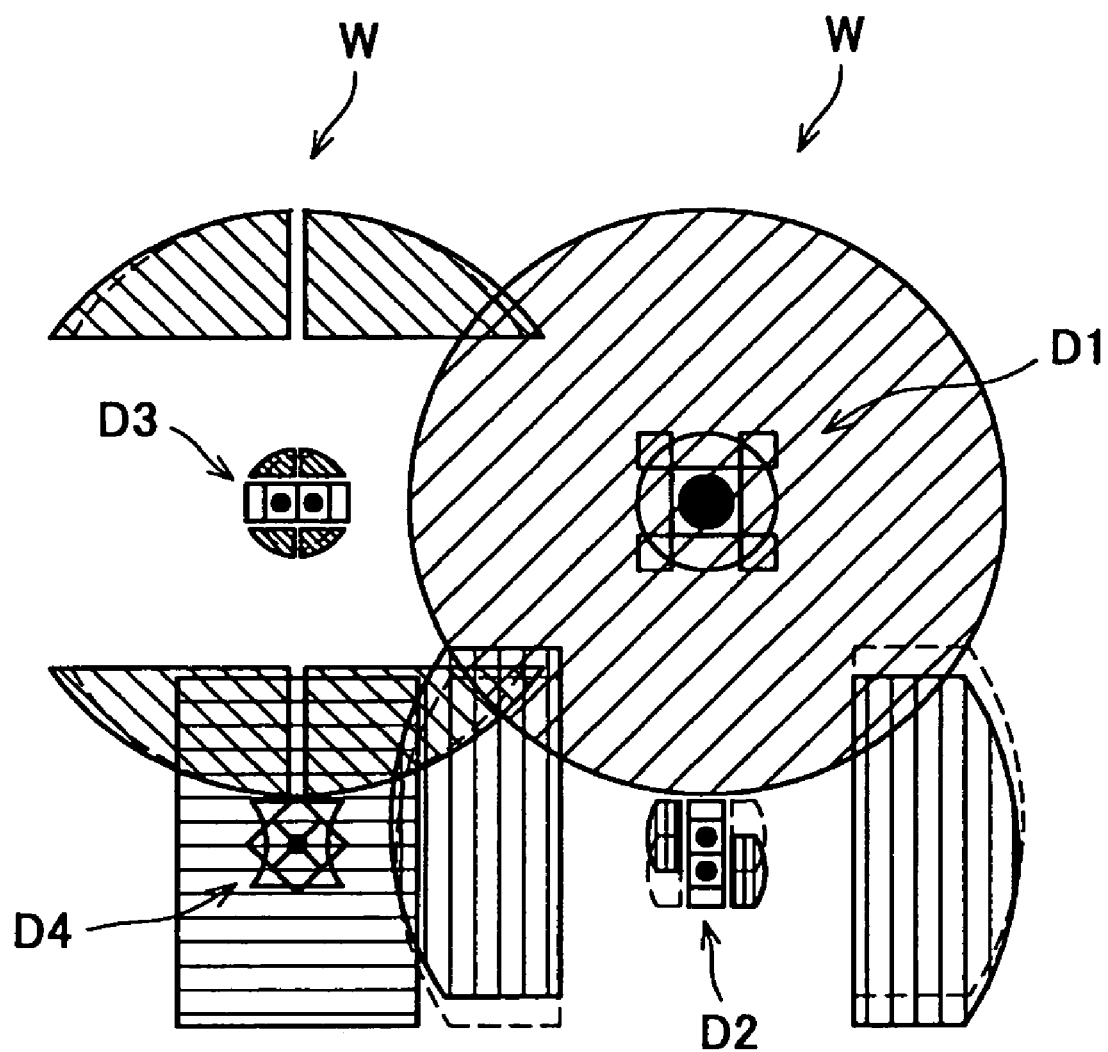
FIG. 8 is an approximate diagram showing formation (2) of a stray light pattern.

FIG. 8 shows overlapped stray light patterns W formed on the photo-detector 19 by two recording layers (for example, the recording layer Y3 and the recording layer Y1) having different layer intervals to the target recording layer YT. In FIG. 8, as examples of the layer interval, the stray light patterns W by the recording layer Y3 whose layer interval to the target recording layer YT is 45 [μm] and the recording layer Y1 whose layer interval to the target recording layer YT is 10 [μm] are shown.

In FIG. 8, when viewed from an irradiation surface 100A of the optical disk 100, the stray light pattern W when the other recording layer Y is on the front side is drawn by a solid line and the stray light pattern when the other recording layer Y is on the back side is drawn by a broken line.

Thus, each receiving region of the photo-detector 19 is arranged so that the stray light patterns W of various sizes formed by various interlayer stray light beams LN reflected by the other recording layers Y having different distances from the target recording layer YT do not overlap with the receiving units D2 and D3.

Further, when mounting positions of the hologram device 17 and the photo-detector 19 are adjusted in the optical pickup 7, detection results in the receiving unit D4 are used.

That is, the optical pickup 7 irradiates the optical disk 100 for adjustment with the light beam L1 based on control of the centralized control unit 2 after the optical disk 100 being inserted in an assembly process or the like.

Correspondingly, the receiving unit D1 of the photo-detector 19 is irradiated with the reflected light beam LR0 consisting of zero-order light with astigmatism.

In this assembly process, the mounting position concerning the direction along an optical axis of the reflected light beam LR0 and the mounting position in the plane orthogonal to the optical axis in the photo-detector 19 are fine-tuned so that a focus error signal SFE1 described later has the value "0".

Accordingly, the photo-detector 19 has the optimum mounting position concerning the direction along the optical axis of the reflected light beam LR0 and also the optimum mounting position concerning the longitudinal direction and the transverse direction.

Further, the mounting angle around the reference point P is adjusted in the photo-detector 19 so that the sum of the received light signals S4A and S4D and that of the received light signals S4B and S4C are at a comparable signal level.

Accordingly, the photo-detector 19 also has the optimum mounting angle concerning the rotation direction around the reference point P.

Further, the position concerning the direction along the optical axis of the reflected light beam LR0 is adjusted in the hologram device 17 so that the sum of the received light signals S4A and S4B and that of the received light signals S4C and S4D are at a comparable signal level. Accordingly, also the hologram device 17 has the optimum mounting position concerning the direction along the optical axis of the reflected light beam LR0.

Thus, the receiving regions D2A and D2B of the receiving unit D2 and the receiving regions D3C and D3D of the receiving unit D3 are arranged in the photo-detector 19 so that the interlayer stray light beam LN from each recording layer Y can be avoided.

[1-4. Generation of Preformatted Signal and the Like]

The head amplifier 22 (FIG. 2) of the optical disk apparatus 1 amplifies each of the received light signals S1A, S1B, S1C, and S1D, S2A, S2B, and S2C, and S4A, S4B, S4C, and S4D and supplies these signals to the signal processing unit 4.

The head amplifier 22 also amplifies each of the stray light receiving signals S1P, S1Q, S1R, and S1S, S2P and S2Q, and S3R and S3S and supplies these signals to the signal processing unit 4.

[1-4-1. Focus Error Signal SFE1]

The signal processing unit 4 generates the focus error signal SFE1 by a focus error signal operation circuit 4F. The configuration of the focus error signal operation circuit 4F is shown in FIG. 9A.

Figure 9A:
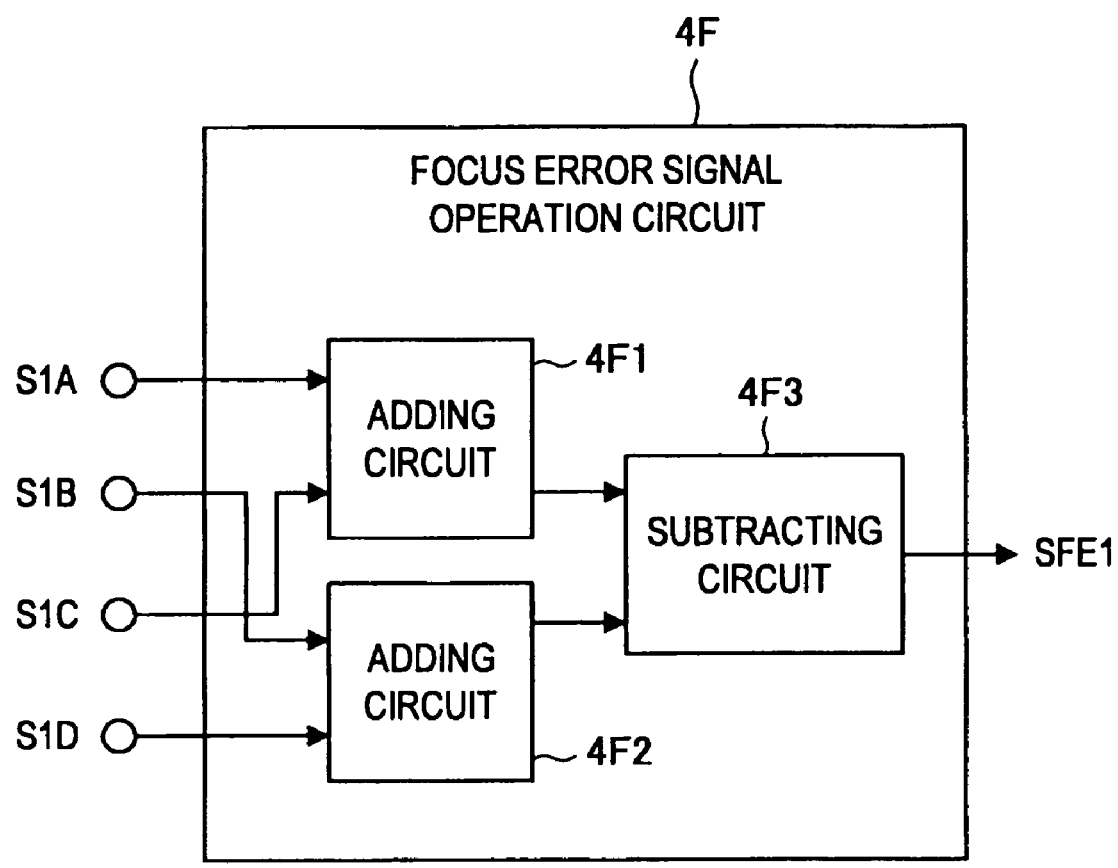
FIG. 9A is an approximate diagram showing a configuration example of a focus error signal operation circuit according to the first embodiment.

As shown in FIG. 9A, the focus error signal operation circuit 4F has, for example, adding circuits 4F1 and 4F2 and a subtracting circuit 4F3. With this configuration, the focus error signal operation circuit 4F performs operations according to Formula (1A) below to calculate the focus error signal SFE1 by the astigmatic method and supplies the focus error signal SFE1 to the focus control unit 3AF of the servo control unit 3A.

[Math 1]

$$FE1=(S1A+S1C)-(S1B+S1D) \tag{1A}$$

The focus error signal SFE1 represents an amount of shift between the focus F1 of the light beam L1 and the target recording layer YT in the optical disk 100.

In addition to the configuration shown in FIG. 9A, the focus error signal operation circuit 4F may perform operations according to Formula (1B) below by further including two adding circuits, two subtracting circuits, and one coefficient multiplication circuit. Then, the focus error signal operation circuit 4F calculates, in the same manner as above, the focus error signal SFE1 by the astigmatic method and supplies the focus error signal SFE1 to the focus control unit 3AF of the servo control unit 3A.

[Math 2]

$$SFE1=(S1A+S1C)-(S1B+S1D)-k \times \{(S1P+S1R)-(S1Q+S1S)\} \tag{1B}$$

Incidentally, the coefficient k in Formula (1B) denotes a predetermined coefficient and the term $k \times \{(S1P+S1R)-(S1Q+S1S)\}$ is provided to correct non-uniformity when such non-uniformity arises in received light due to stray light.

[1-4-2. Tracking Error Signal STE1]

The signal processing unit 4 uses one of the phase contrast method such as the DPD (Differential Phase Detection) method and the one-beam push-pull method to generate a tracking error signal.

More specifically, depending on the type of the optical disk 100, the signal processing unit 4 uses the phase contrast method when the optical disk 100 is an optical disk such as BD-ROM (Read Only Memory) in which a pit sequence is formed in the recording layer Y in advance. Also, the signal processing unit 4 uses the one-beam push-pull method when the optical disk 100 is a recordable BD-R (Recordable), BD-RE (Rewritable) or the like.

When the one-beam push-pull method is used, the signal processing unit 4 calculates the tracking error signal STE1 by performing operations according to Formula (2A) below through a tracking error signal operation circuit 4T. Further, the signal processing unit 4 supplies the tracking error signal STE1 to a tracking control unit 3AT of the servo control unit 3A.

Figure 9B:
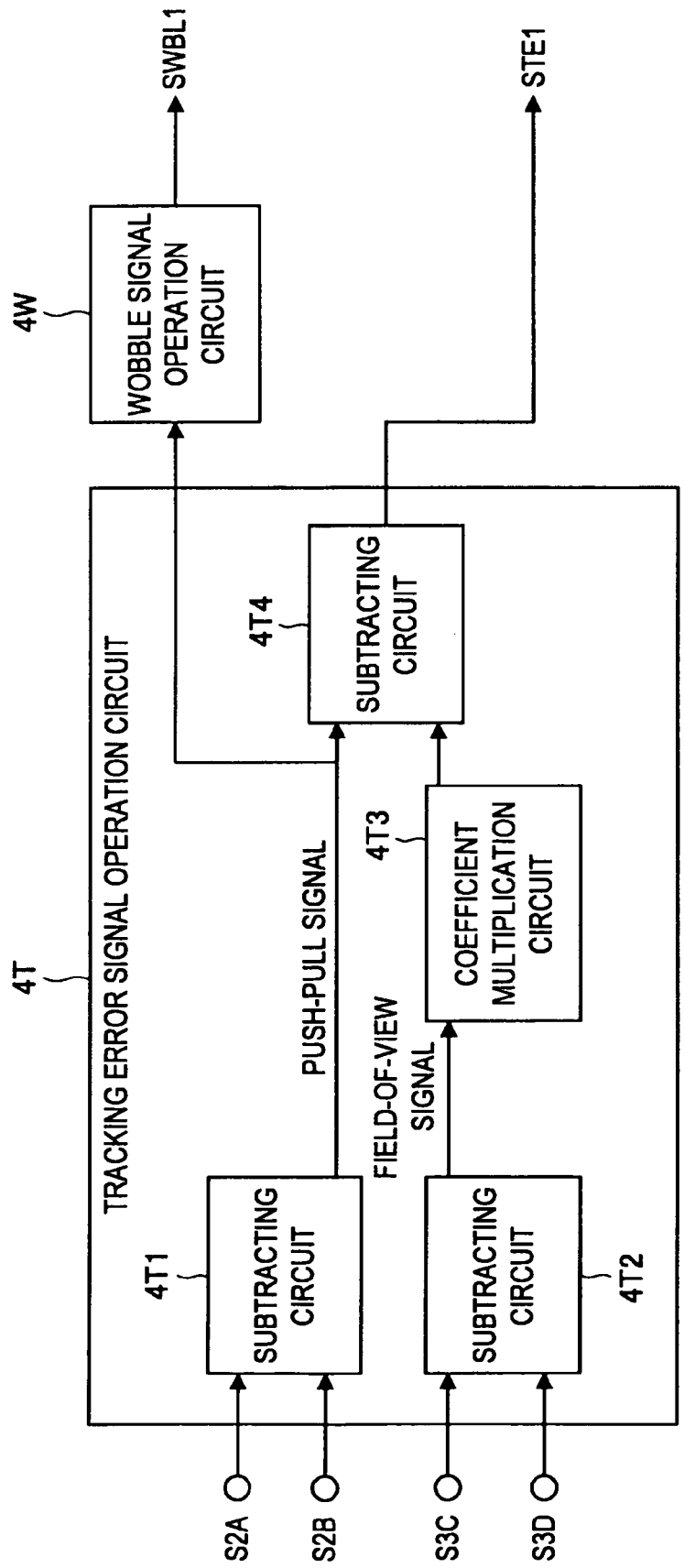
FIG. 9B is an approximate diagram showing a configuration example of a tracking error signal operation circuit and a wobble signal operation circuit according to the first embodiment.

As shown in FIG. 9B, when operations according to Formula (2A) are performed, the tracking error signal operation circuit 4T may include subtracting circuits 4T1 and 4T2, a coefficient multiplication circuit 4T3, and a subtracting circuit 4T4.

[Math 3]

$$STE1=(S2A-S2B)-\alpha\times(S3C-S3D) \quad (2A)$$

The tracking error signal STE1 represents an amount of shift between the focus F1 of the light beam L1 and a desired track in the target recording layer YT in the optical disk 100.

In addition to the configuration shown in FIG. 9B, the tracking error signal operation circuit 4T may perform operations according to Formula (2B) below by further including four subtracting circuits and two coefficient multiplication circuits. Then, the tracking error signal operation circuit 4T supplies the operated tracking error signal STE1 to the tracking control unit 3AT of the servo control unit 3A.

[Math 4]

$$STE1=(S2A-S2B)-\alpha\times(S3C-S3D)-j\times\{(S2P-S2Q)-\alpha\times(S3R-S3S)\} \quad (2B)$$

Incidentally, the coefficients α and j in Formula (2A) and Formula (2B) each denote a predetermined coefficient. The term (S2A−S2B) corresponds to a value obtained by adding a lens shift component (that is, a displacement of the objective lens 8 in the tracking direction) to a push-pull component (that is, a relative displacement of the focus F1 of the light beam L1 with respect to a desired track). Further, the term α×(S3C−S3D) corresponds to a value of the lens shift component.

That is, in the first half of Formula (2A) and Formula (2B), a push-pull component is calculated by subtracting a lens shift component only from the value of the push-pull component after the lens shift component being added.

Further, the term j×{(S2P−S2Q)—α×(S3R−S3S)} in the second half of Formula (2B) is provided, like the case of the focus error signal SFE1, to correct non-uniformity when such non-uniformity arises in received light due to stray light.

On the other hand, when the phase contrast method is used, the signal processing unit 4 generates the tracking error signal STE1 by performing operations according to Formula (3) below based on the received light signals S1A, S1B, S1C, and S1D and supplies the tracking error signal STE1 to the tracking control unit 3AT of the servo control unit 3A.

[Math 5]

$$STE1=\phi(S1A-S1C)-\phi(S1B-S1D) \quad (3)$$

Incidentally, the tracking error signal operation circuit 4T has two adding circuits, one subtracting circuit, and two phase extraction circuits. In Formula (3) operated with this configuration, the operator φ denotes a signal phase and the formula as a whole calculates a phase difference.

[1-4-3. Focus Control and Tracking Control]

The focus control unit 3AF (FIG. 2) of the servo control unit 3A generates a focus drive signal SFD1 based on the focus error signal SFE1 and supplies the focus drive signal SFD1 to a focus actuator 9F. The focus actuator 9F drives the objective lens 8 in the focusing direction based on the focus drive signal SFD1 (hereinafter, this will be called focus control).

The optical disk apparatus 1 converges the amount of shift between the focus F1 of the light beam L1 and the target recording layer YT concerning the focusing direction toward any target value by repeatedly exercising the focus control (that is, exercising feedback control).

The tracking control unit 3AT (FIG. 2) of the servo control unit 3A generates a tracking drive signal STD1 based on the tracking error signal STE1 and supplies the tracking drive signal STD1 to a tracking actuator 9T. The tracking actuator 9T drives the objective lens 8 in the tracking direction based on the tracking drive signal STD1 (hereinafter, this will be called tracking control).

The optical disk apparatus 1 converges the amount of shift between the focus F1 of the light beam L1 and a predetermined track in the target recording layer YT concerning the tracking direction toward any target value also by repeatedly exercising the tracking control (that is, exercising feedback control).

Thus, the optical disk apparatus 1 can adjust the focus F1 of the light beam L1 to a desired track in the target recording layer YT by exercising the focus control and tracking control.

[1-4-4. Reproducing RF Signal SRF]

The optical disk apparatus 1 also calculates a reproducing RF signal SRF by a reproducing signal operation circuit 4R of the signal processing unit 4. The configuration of the reproducing signal operation circuit 4R is shown in FIG. 9C.

Figure 9C:
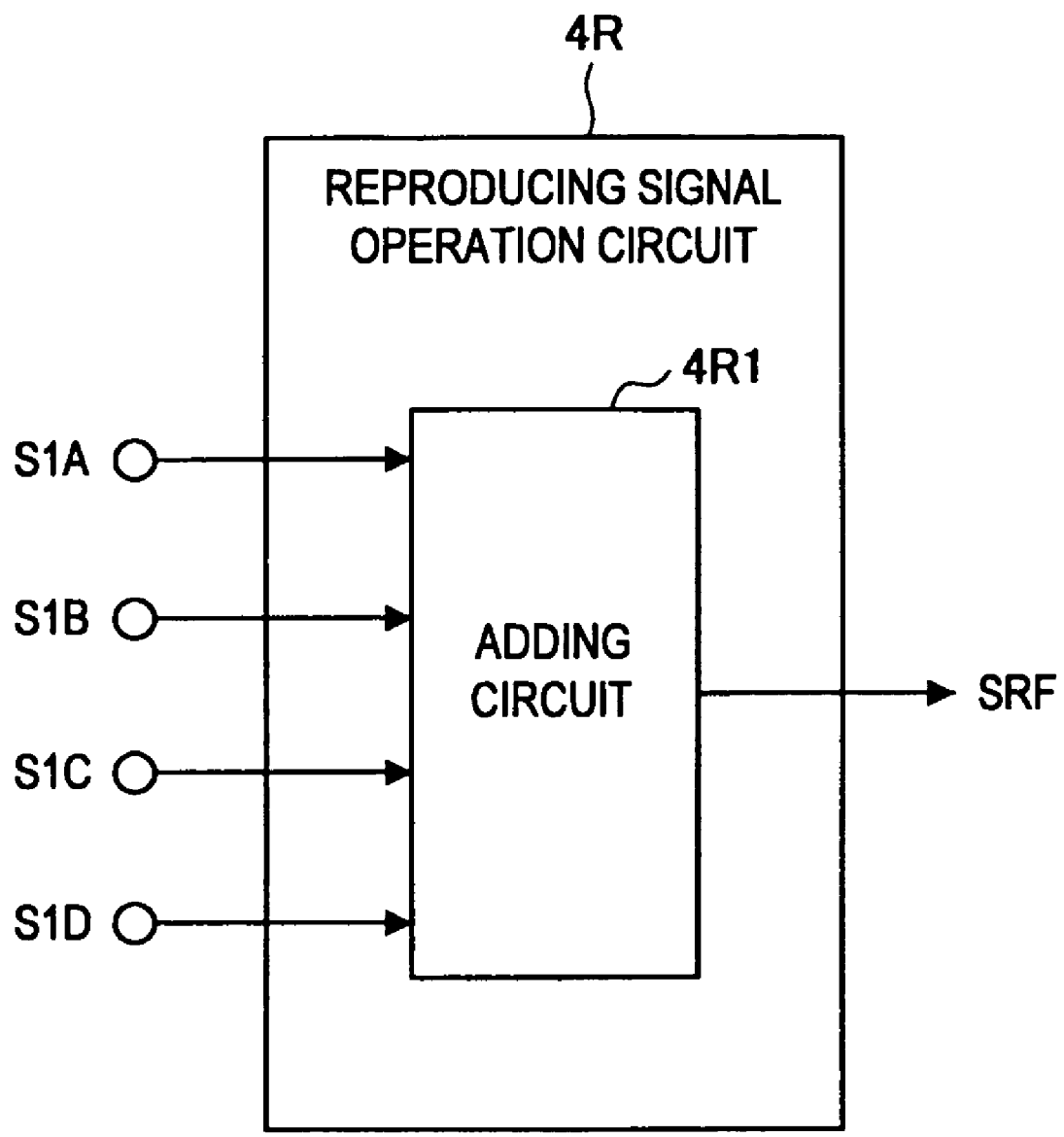
FIG. 9C is an approximate diagram showing the configuration of a reproducing signal operation circuit according to the first embodiment.

As shown in FIG. 9C, the reproducing signal operation circuit 4R has one adding circuit 4R1 (may be configured by three adding circuits). With this configuration, the reproducing signal operation circuit 4R calculates the reproducing RF signal SRF by adding the received light signals S1A to S1D according to Formula (4) below.

[Math 6]

$$SRF1=S1A+S1B+S1C+S1D \quad (4)$$

The reproducing RF signal SRF corresponds to the amount of light of the whole reflected light beam LR0 consisting of zero-order light and also represents a signal recorded on the optical disk 100. Then, the reproducing signal operation circuit 4R reproduces information recorded on the optical disk 100 by performing predetermined demodulation processing and decoding processing on the reproducing RF signal SRF.

[1-4-5. Preformatted Signal]

As described above, the optical disk 100 is preformatted with address information, time information and the like being embedded in the optical disk 100 in advance as wobbles or pre-pits. Then, the optical disk apparatus 1 uses a preformatted signal operation circuit (for example, a wobble signal operation circuit 4W) of the signal processing unit 4 to extract a preformatted signal such as a wobble signal or pre-pit signal. For convenience of description, a case of extracting a wobble signal will be described below as an example of the preformatted signal, but the preformatted signal is not specifically limited. A similar configuration can also be used when a pre-pit signal or a signal by an information pit sequence with wobble is extracted.

As shown in FIG. 9B, the wobble signal operation circuit 4W of the signal processing unit 4 is an example of the preformatted signal operation circuit and taps an output signal of a subtracting circuit 4T1 from the tracking error signal operation circuit 4T. As a result, a signal operated by Formula (5) below is extracted as a wobble signal SWBL1.

[Math 7]

$$SWBL1=S2A-S2B \quad (5)$$

When a signal is tapped as described above, the wobble signal operation circuit 4W can be considered to have the subtracting circuit 4T1. Instead of tapping, the wobble signal operation circuit 4W may calculate the wobble signal SWBL1 by including a subtracting circuit and performing operations according to Formula (5).

The wobble signal SWBL1 contains, as described above, a push-pull component (that is, a relative displacement of the focus F1 of the light beam L1 with respect to a desired track).

As is evident with reference to Formula (5), the wobble signal SWBL1 is generated from the received light signals S2A and S2B from the receiving regions D2A and D2B of the receiving unit D2 that have avoided the interlayer stray light beam LN. Therefore, the wobble signal operation circuit 4W can generate the wobble signal SWBL1 without being affected by stray light. The received light signals S2A and S2B are not signals from the center portion of signal light (the received light signals S1A, S1B, S1C, and S1D) either. Thus, the wobble signal operation circuit 4W can generate the wobble signal SWBL1 without being affected by a beat either.

Then, the wobble signal operation circuit 4W can extract preformatted information such as address information and time information embedded in the optical disk 100 in advance by performing predetermined demodulation processing and decoding processing on the wobble signal SWBL1.

The wobble signal SWBL1 uses the received light signals S2A and S2B from the receiving regions D2A and D2B and the received light signals S2A and S2B are generated from the reflected light beams LR1A and LR1B (FIG. 6). The reflected light beams LR1A and LR1B are the reflected light beam LR diffracted by the regions 17A and 17B of the hologram device 17. Thus, the reflected light beams LR1A and LR1B contain, as shown in FIG. 4, a push-pull component of tracks of the optical disk 100. Therefore, the wobble signal operation circuit 4W can generate the wobble signal SWBL1 from the received light signals S2A and S2B containing a push-pull component of tracks. By generating the wobble signal SWBL1 in this manner, the wobble signal operation circuit 4W can generate the wobble signal SWBL1 from which preformatted information such as address information and time information can be extracted correctly and reliably.

[1-5. Type Determination of Optical Disk]

As shown in FIGS. 7A and 7B, the stray light pattern W formed on the photo-detector 19 has the irradiation range that changes in accordance with the interval between the recording layer Y where the interlayer stray light beam LN is reflected and the target recording layer YT.

More specifically, if the interval between the recording layer Y and the target recording layer YT is wide, the irradiation range of the stray light pattern W widens in the photo-detector 19 and, if the interval is narrow, the irradiation range of the stray light pattern W narrows.

In other words, if the number of the recording layers Y formed on the optical disk 100 is unknown immediately after the optical disk 100 being inserted or the like, the number of the recording layers Y can be determined to a certain extent based on the formation range of the recording layers Y.

Particularly, as shown in FIGS. 7A and 7B, the photo-detector 19 is irradiated in such a way that both the stray light patterns W10 and W30 overlap with the stray light receiving regions D1P, D1Q, D1R, and D1S of the receiving unit D1.

If, on the other hand, the optical disk 100 has only one layer of the recording layer Y, the interlayer stray light beam LN is not generated in principle and thus, no stray light pattern overlaps with the stray light receiving regions D1P, D1Q, D1R, and D1S of the receiving unit D1 in the photo-detector 19.

Then, a medium determination signal operation circuit 4M of the signal processing unit 4 determines whether the stray light receiving signals S1P, S1Q, S1R, and S1S generated by the stray light receiving regions D1P, D1Q, D1R, and D1S of the receiving unit D1 are equal to or more than a predetermined threshold.

If the stray light receiving signals S1P, S1Q, S1R, and S1S are equal to or more than the threshold, the medium determination signal operation circuit 4M determines that the stray light pattern W is formed in the stray light receiving regions D1P, D1Q, D1R, and D1S and the optical disk 100 has two layers of the recording layers Y or more.

In, on the other hand, the stray light receiving signals S1P, S1Q, S1R, and S1S are less than the threshold, the medium determination signal operation circuit 4M determines that the stray light pattern W is not formed in the stray light receiving regions D1P, D1Q, D1R, and D1S and the optical disk 100 has one layer of the recording layer Y.

In this manner, the signal processing unit 4 of the optical disk apparatus 1 determines presence/absence of the stray light pattern W based on the stray light receiving signals S1P, S1Q, S1R, and S1S and then can determine from the determination result whether the optical disk 100 has one layer of the recording layer Y or two or more layers of the recording layers Y.

[1-6. Operation and Effect]
[1-6-1. Operation]

In the above configuration, the optical pickup 7 of the optical disk apparatus 1 irradiates the optical disk 100 with the light beam L1 and separates the reflected light beam LR reflected by the optical disk 100 by the hologram device 17.

The hologram device 17 causes the reflected light beam LR0 consisting of zero-order light to travel in an almost straight line and also the reflected light beam LR1 consisting of the primary light to diffract by each of the regions 17A to 17E (FIG. 4A).

At this point, the hologram device 17 causes each of the reflected light beams LR1A and LR1B to diffract in the longitudinal direction, each of the reflected light beams LR1C and LR1D to diffract in the transverse direction, and further the reflected light beam LR1E to diffract in a slanting direction.

Correspondingly, the photo-detector 19 receives the reflected light beam LR0 by the receiving regions D1A to D1D of the receiving unit D1 to generate the received light signals S1A to S1D. The photo-detector 19 also receives the reflected light beams LR1A and LR1B by the receiving regions D2A and D2B of the receiving unit D2 respectively to generate the received light signals S2A and S2B. Further, the photo-detector 19 receives the reflected light beams LR1C and LR1D by the receiving regions D3C and D3D of the receiving unit D3 respectively to generate the received light signals S3C and S3D.

The signal processing unit 4 calculates the focus error signal SFE1 by the focus error signal operation circuit 4F according to Formula (1A) or (1B) based on each received light signal amplified by the head amplifier 22. The signal processing unit 4 also calculates the tracking error signal STE1 by the tracking error signal operation circuit 4T according to Formula (2A) or (2B) and supplies the tracking error signal STE1 to the servo control unit 3A.

The servo control unit 3A exercises focus control by generating the focus drive signal SFD1 by the focus control unit 3AF based on the focus error signal SFE1 and supplying the focus drive signal SFD1 to the focus actuator 9F.

The servo control unit 3A also exercises tracking control by generating the tracking drive signal STD1 by the tracking control unit 3AT based on the tracking error signal STE1 and supplying the tracking drive signal STD1 to the tracking actuator 9T.

Further, the signal processing unit 4 calculates or extracts the wobble signal SWBL1 according to Formula (5) by the wobble signal operation circuit 4W based on each received light signal amplified by the head amplifier 22. Then, the signal processing unit 4 generates preformatted information such as address information and time information from the wobble signal SWBL1 and outputs the preformatted information to the centralized control unit 2. The centralized control unit 2 can control a recording or reproduction operation based on the address information, time information or the like.

[1-6-2. Effect]

Therefore, the optical disk apparatus 1 can receive the reflected light beams LR1A, LR1B, LR1C, and LR1D by the receiving unit D2 or D3 of the photo-detector 19. Then, the optical disk apparatus 1 can exercise tracking control based on the tracking error signal STE1 generated by using the received light signals S2A, S2B, S3C, and S3D, which are received light results thereof.

According to the one-beam push-pull method, light intensity of the reflected light beam LR0 consisting of zero-order light is generally made higher than that of the reflected light beam LR1 consisting of primary light by the action of diffraction to increase the signal level of the reproducing RF signal SRF.

Accordingly, irradiation intensity of the reflected light beams LR1A, LR1B, LR1C1, LR1C2, LR1D1, and LR1D2 consisting of primary light becomes relatively lower in the photo-detector 19 and also the S/N (Signal/Noise) ratio of the received light signal S1A or the like becomes comparatively lower.

Thus, in the optical disk apparatus 1, if the stray light pattern W overlaps with the receiving regions D2A, D2B, D3C, and D3D to receive primary light in the photo-detector 19, there is a possibility that the precision of the wobble signal SWBL1 or the tracking error signal STE1 deteriorates significantly.

In contrast, the hologram device 17 causes the reflected light beams LR1A and LR1B containing a large amount of push-pull component and the reflected light beams LR1C and LR1D containing a large amount of lens shift component to diffract in mutually different directions. Accordingly, the photo-detector 19 can avoid the receiving unit D3 being irradiated with a stray light pattern by the regions 17A and 17B and also the receiving unit D2 being irradiated with a stray light pattern by the regions 17C and 17D.

Thus, in the photo-detector 19, the receiving unit D2 may be designed in such a way that the stray light pattern W originating from zero-order light and the regions 17A and 17B is avoided. Also, the receiving unit D3 may be designed in such a way that the stray light pattern W originating from zero-order light and the regions 17C and 17D is avoided. Therefore, the degree of difficulty in design can be diminished.

Further, in the photo-detector 19, the receiving unit D2 is arranged in the longitudinal direction when viewed from the reference point P. The receiving regions D2A and D2B are arranged by being mutually placed in the longitudinal direction and are designed to fall within the interval u2 (FIG. 7B) in the transverse direction.

Thus, in the photo-detector 19, as shown in FIGS. 7A and 7B, the stray light pattern W formed by the interlayer stray light beam LN being diffracted by the regions 17A and 17B of the hologram device 17 does not overlap with the receiving regions D2A and D2B respectively. Incidentally, the stray light pattern W includes the stray light patterns W3A and W3B (FIG. 7A), W1A and W1B (FIG. 7B) and the like.

Particularly if the angle of diffraction deviates from a design value due to a lattice pitch error in the hologram device 17 or a wavelength shift in the light beam L1, the stray light pattern W does not overlap with the receiving regions D2A and D2B in the photo-detector 19.

That is, an influence of the interlayer stray light beam LN on the received light signals S2A and S2B does not basically arise in the photo-detector 19.

Moreover, in the photo-detector 19, the receiving unit D3 is arranged in the transverse direction when viewed from the reference point P. The receiving regions D3C and D3D are arranged by being mutually placed in the transverse direction and are designed to fall within the interval u3 (FIG. 7B) in the longitudinal direction.

Thus, in the photo-detector 19, as shown in FIGS. 7A and 7B, the stray light pattern W formed by the interlayer stray light beam LN being diffracted by the regions 17C1, 17C2, 17D1, and 17D2 of the hologram device 17 does not overlap with the receiving regions D3C and D3D. Incidentally, the stray light pattern W includes the stray light patterns W3C1, W3C2, W3D1, and W3D2 (FIG. 7A), W1C1, W1C2, W1D1, and W1D2 (FIG. 7B) and the like.

Particularly if the angle of diffraction deviates from a design value due to a lattice pitch error in the hologram device 17 or a wavelength shift in the light beam L1, the stray light pattern W does not overlap with the receiving regions D3C and D3D in the photo-detector 19.

That is, an influence of the interlayer stray light beam LN on the received light signals S3C and S3D does not basically arise in the photo-detector 19.

Therefore, the wobble signal SWBL1 (an example of the preformatted signal) calculated by using the received light signals S2A and S2B is considered hardly affected by the interlayer stray light beam LN. Similarly, the tracking error signal STE1 calculated by using the received light signals S2A, S2B, S3C, and S3D is considered hardly affected by the interlayer stray light beam.

Thus, in the photo-detector 19, the receiving regions D2A, D2B, D3C, and D3D are arranged so that various kinds of the stray light patterns W originating from a plurality of recording layers Y having different interlayer distances from the target recording layer YT in the optical disk 100 can effectively be avoided. Therefore, the optical disk apparatus 1 need not deteriorate the precision of the wobble signal SWBL1 of the tracking error signal STE1.

Further, the stray light receiving regions D2P and D2Q for stray light detection are provided in the receiving unit D2 of the photo-detector and the stray light receiving regions D3R and D3S for stray light detection are provided in the receiving unit D3.

Accordingly, the term j×{(S2P−S2Q)−α×(S3R−S3S)} is provided in the second half of Formula (2B) for the tracking error signal operation circuit 4T of the signal processing unit 4.

Thus, even if an influence of the interlayer stray light beam LN is contained in the received light signal S2A, S2B, S2C, or S2D due to overlapping of the stray light pattern W with the receiving regions D2A and D2B or D3C and D3D for some reason in the signal processing unit 4, the influence can effectively be eliminated.

Further, the optical pickup 7 condenses the reflected light beam LR1A and the like shone on the receiving units D2, D3, and D4 of the photo-detector 19 so as to make the reflected light beam a point-like beam spot based on the design of the condenser lens 16 and the hologram device 17. Thus, the optical pickup 7 can reduce the area of each receiving region in the photo-detector 19 to a minimum and also reduce the amount of movement of each beam spot to a minimum when a lens shift of the objective lens 8 occurs.

At this point, the optical pickup 7 also condenses the reflected light beam so as to reduce the stray light patterns W and thus, the irradiation range of the stray light patterns W can be narrowed as much as possible.

According to the above configuration, the optical pickup 7 of the optical disk apparatus 1 causes the reflected light beam LR0 consisting of zero-order light that is not diffracted by the hologram device 17 to travel in an almost straight line and detects the reflected light beam LR0 by the receiving unit D1 of the photo-detector 19 to generate the received light signals S1A to S1D.

The optical pickup 7 also causes the reflected light beams LR1A and LR1B of the reflected light beams LR1 diffracted by the hologram device 17 and consisting of primary light to diffract in the longitudinal direction and receives the reflected light beams LR1A and LR1B by the receiving regions D2A and D2B of the receiving unit D2 to generate the received light signals S2A and S2B respectively.

Further, the optical pickup 7 causes the reflected light beams LR1C and LR1D of the reflected light beams LR1 diffracted by the hologram device 17 and consisting of primary light to diffract in the transverse direction and receives the reflected light beams LR1C and LR1D by the receiving regions D3C and D3D of the receiving unit D3 to generate the received light signals S3C and S3D respectively.

Accordingly, the optical disk apparatus 1 can generate the wobble signal SWBL1 that excludes an influence of the stray light pattern W formed by each of the interlayer stray light beams LN from the plurality of recording layers Y. Thus, the optical disk apparatus 1 can correctly extract preformatted information such as address information and time information with stability.

Further, the optical disk apparatus 1 can generate the tracking error signal STE1 that excludes an influence of the stray light pattern W formed by each of the interlayer stray light beams LN from the plurality of recording layers Y so that tracking control can be exercised with precision.

[1-6-3. Comparison with Related Technology]

The above effect will further be described more specifically by comparing the optical disk apparatus 1 according to the first embodiment with an optical disk apparatus according to related technology.

As described, for example, in Japanese Patent Application Laid-Open No. 2004-273024, an optical disk apparatus according to related technology calculates a wobble signal or the like by the three-beam push-pull method. In this case, for example, in the configuration of optical pickup shown in FIG. 2, for example, a diffractive optical element (not shown and corresponds to a grating 132 in a sixth embodiment) that splits the light beam L1 of incident light into three luminous fluxes by diffraction is provided upstream from the beam splitter 13. The luminous flux of the three luminous fluxes that travels in a straight line without being diffracted corresponds to the light beam L1 and is called here a main light beam L1-M. On the other hand, the other two diffracted luminous fluxes are called here sub-light beams L1-S1 and L1-S2.

Like the light beam L1, the main light beam L1-M is reflected by the optical disk 100 to become a main reflected beam LR-M. The sub-light beams L1-S1 and L1-S2 pass optical paths deviated from that of the main light beam L1-M before being reflected by the optical disk 100 to become sub reflected light beams LR-S1 and LR-S2. In contrast to the optical disk apparatus 1 according to the first embodiment, the optical disk apparatus according to related technology does not have the hologram device 17 and has a photo-detector and another signal processing unit instead of the photo-detector 19 and the signal processing unit 4. Other components can be configured like the optical disk apparatus 1 according to the first embodiment almost in the same manner and thus, differences will mainly be described below.

Figure 10A:
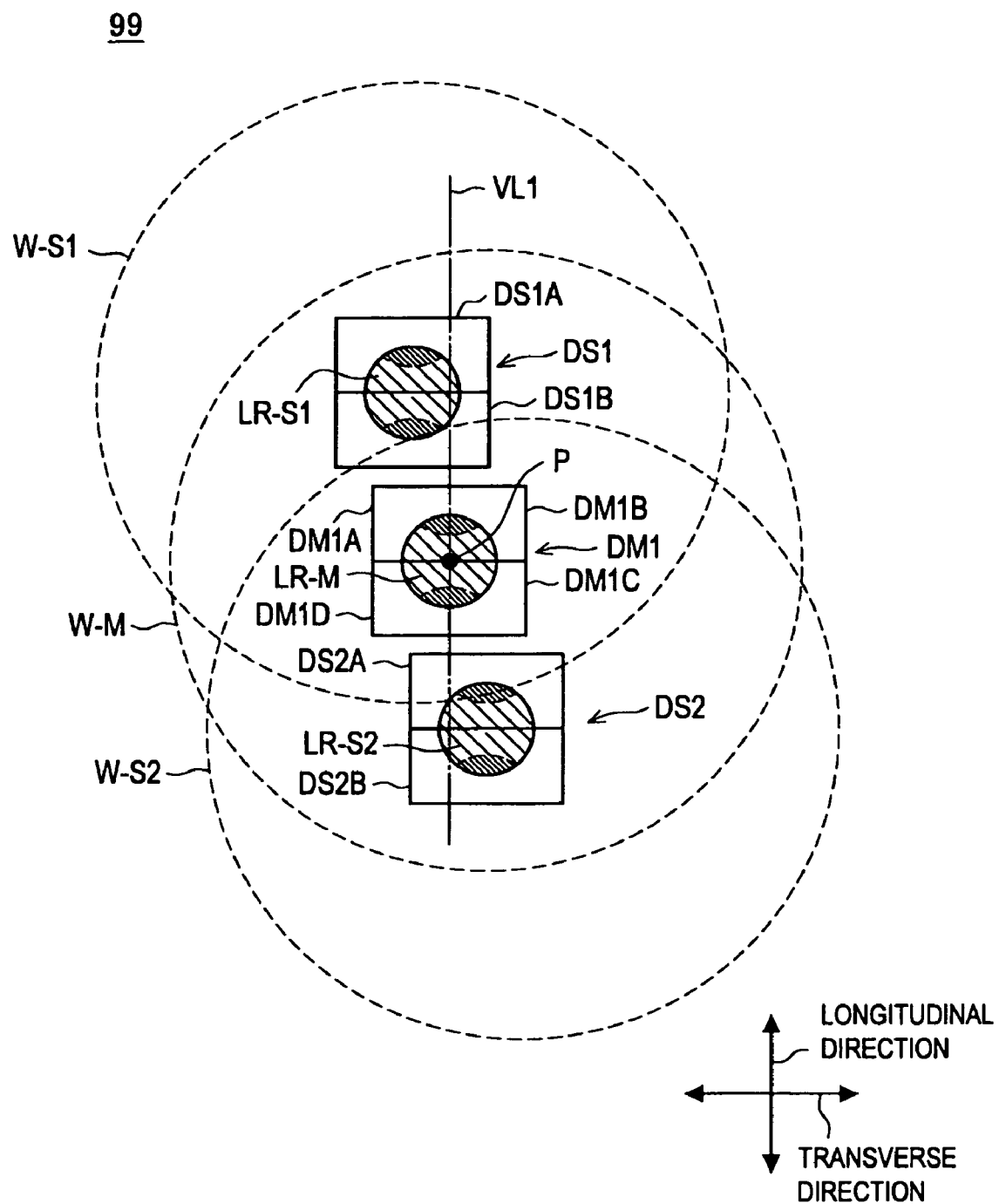
FIG. 10A is an approximate diagram showing the configuration of the photo-detector according to related technology.

FIG. 10A shows the configuration of receiving units of the photo-detector 99.

The photo-detector 99 has a receiving unit DM1 and receiving units DS1 and DS2 for the main reflected light beam LR-M and the sub reflected light beams LR-S1 and LR-S2 respectively.

Like the above receiving unit D1, the receiving unit DM1 is divided into two each in the longitudinal direction and the transverse direction around the reference point P corresponding to the optical axis of the main reflected light beam LR-M (corresponding to the reflected light beam LR0) consisting of zero-order light that was not diffracted by the diffractive optical element to split a beam into three beams. That is, the receiving unit DM1 receives the reflected light beam LR by receiving regions DM1A, DM1B, DM1C, and DM1D divided into four in a grid pattern. The receiving regions DM1A, DM1B, DM1C, and DM1D generates received light signals SM1A, SM1B, SM1C, and SM1D according to the amount of received light respectively and send these signals to the head amplifier 22 (FIG. 2).

The receiving unit DS1 is provided at a location separated from the reference point P on one side almost in the longitudinal direction and receiving regions DS1A and DS1B are arranged by being mutually placed in the longitudinal direction almost along the virtual straight line VL1 extended from the reference point P in the longitudinal direction.

The receiving regions DS1A and DS1B each receive the sub reflected light beam LR-S1 and generate received light signals SS1A and SS1B in accordance with the amount of received light respectively before sending these signals to the head amplifier 22 (FIG. 2).

The receiving unit DS2 is provided at a location separated from the reference point P on one side almost in the longitudinal direction and receiving regions DS2A and DS2B are arranged by being mutually placed in the longitudinal direction almost along the virtual straight line VL1 extended from the reference point P in the longitudinal direction.

The receiving regions DS2A and DS2B each receive the sub reflected light beam LR-S2 and generate received light signals SS2A and SS2B in accordance with the amount of received light respectively before sending these signals to the head amplifier 22 (FIG. 2).

In the optical disk apparatus according to related technology, the signal processing unit has, instead of the wobble signal operation circuit 4W and the tracking error signal operation circuit 4T shown in FIG. 9B, a wobble signal operation circuit 4W-M and a tracking error signal operation circuit 4T-M shown in FIG. 10B. Incidentally, the focus error signal operation circuit and reproducing signal operation circuit are configured in the same manner as the focus error signal operation circuit 4F and the reproducing signal operation circuit 4R. However, instead of the received light signals S1A to S1D, the received light signals SM1A to SM1D are used in the focus error signal operation circuit and reproducing signal operation circuit.

As shown in FIG. 10B, the signal processing unit according to related technology further has a main push-pull operation circuit 4P-M and a sub-push-pull operation circuit 4P-S. The main push-pull operation circuit 4P-M has adding circuits 4P1 and 4P2 and a subtracting circuit 4P3 to generate a main push-pull signal. The sub-push-pull operation circuit 4P-S has adding circuits 4P4 and 4P5 and a subtracting circuit 4P6 to generate a sub-push-pull signal.

On the other hand, the wobble signal operation circuit 4W-M generates a wobble signal SWL0 by tapping the main push-pull signal. That is, with the above configuration, the wobble signal operation circuit 4W-M generates the wobble signal SWL0 operated according to Formula (5M).

[Math 8]

$$SWBL0=(SM1A+SM1B)-(SM1C+SM1D) \quad (5M)$$

The tracking error signal operation circuit 4T-M has a coefficient multiplication circuit 4T3 and a subtracting circuit 4T4 and generates a tracking error signal STE0 from the main push-pull signal and sub-push-pull signal. That is, with the above configuration, the tracking error signal operation circuit 4T-M performs operations according to Formula (2M) to generate the tracking error signal STE0.

[Math 9]

$$STE0=(SM1A+SM1B)-(SM1C+SM1D)-kt \times \{(SS1A+SS2A)-(SS1B+SS2B)\} \quad (2M)$$

The received light signals SM1A to SM1D, SS1A and SS1B, and SS2A and SS2B used by the optical disk apparatus according to related technology has, as shown in FIG. 10A, stray light beams W-M, W-S1, and W-S2 superimposed thereon. Therefore, in contrast to the wobble signal SWL1 not affected by stray light like the optical disk apparatus 1 according to the first embodiment, the wobble signal SWL0 or the like calculated here is affected by stray light. Therefore, when the multilayer optical disk 100 is used, it is difficult for the optical disk apparatus according to related technology to reliably extract preformatted signals with stability. The optical disk apparatus 1 according to the first embodiment, by contrast, can extract preformatted signals that are not affected by stray light.

Since the wobble signal generally uses a higher band than the tracking error signal and thus, each circuit to be used to generate the wobble signal allow a higher band than each circuit to be used to generate the tracking error signal. Therefore, it is necessary for the signal processing unit according to related technology to use circuits that allow a high band as four circuits including the two adding circuits 4P1 and 4P2, the subtracting circuit 4P3, and the wobble signal operation circuit 4W-M. On the other hand, as shown in FIG. 9B, the signal processing unit 4 according to the first embodiment needs to use circuits that allow a high band only for two circuits of the subtracting circuit 4T1 and the wobble signal operation circuit 4W when the wobble signal SWBL1 is generated. Therefore, the signal processing unit 4 according to the first embodiment can generate the stable wobble signal SWBL1 while reducing the number of expensive circuits that allow a high band.

2. Second Embodiment

An optical disk apparatus 30 according to the second embodiment is different from the optical disk apparatus according to the first embodiment in that, instead of the signal processing unit 4, the optical pickup 7, the hologram device 17, and the photo-detector 19, a signal processing unit 34, an optical pickup 37, a hologram device 47, and a photo-detector 49 are provided.

The signal processing unit 34 generates each of the focus error signal and tracking error signal by performing, like the signal processing unit 4, predetermined operation processing and supplies these signals to the drive control unit 3, content of operation processing is partially different from that of the signal processing unit 4 (details will be described later). Other components are configured basically in the same manner as the signal processing unit 4 in the first embodiment.

Figure 11A:
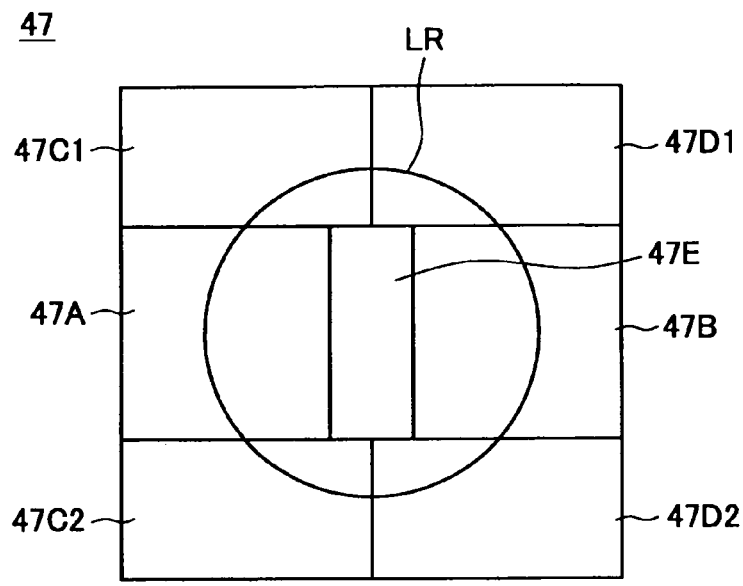
FIG. 11 is an approximate diagram showing the configuration of a hologram device according to a second embodiment.
Figure 11B:
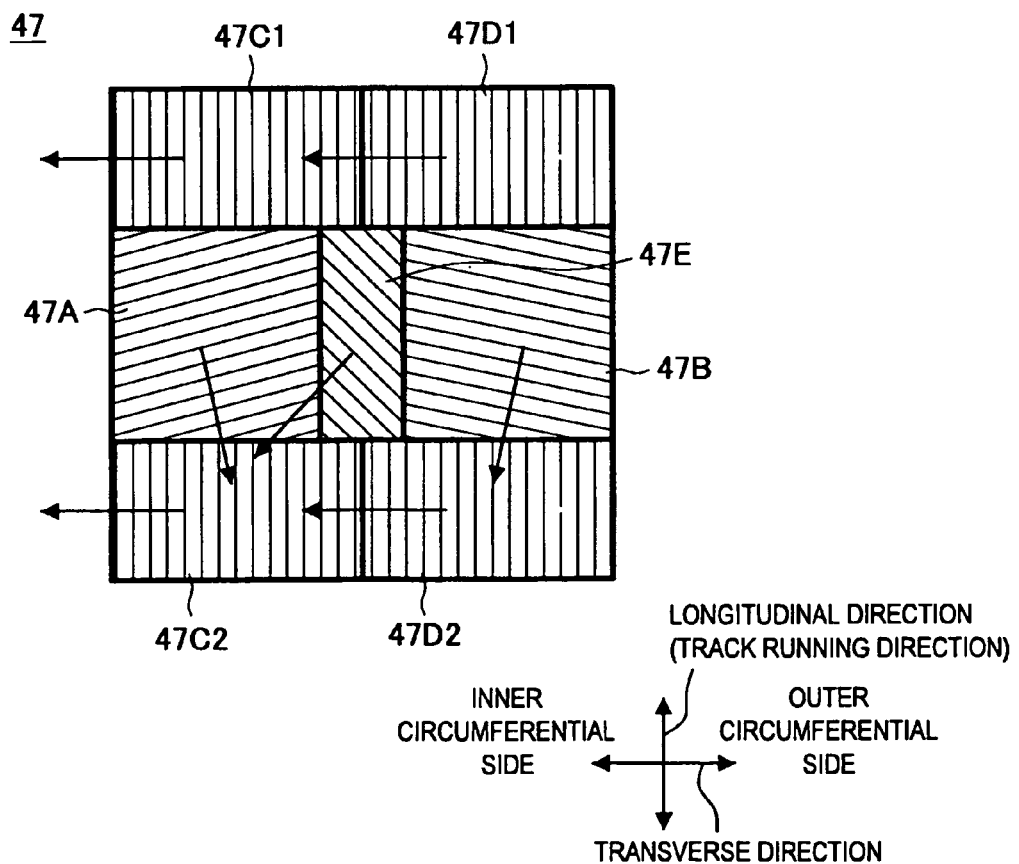

While the hologram device 47 of the optical pickup is divided, as shown in FIG. 11 corresponding to FIG. 4, into similar division patterns when compared with the hologram device 17 of the optical pickup 7, the type of diffractive element formed in regions 47A and 47B is different.

That is, the regions 47A and 47B are made of a so-called blazed hologram and cause almost all portions of the reflected light beam LR overlapping with the regions 47A and 47B to diffract as primary light to create the reflected light beams LR1A and LR1B.

Figure 12:
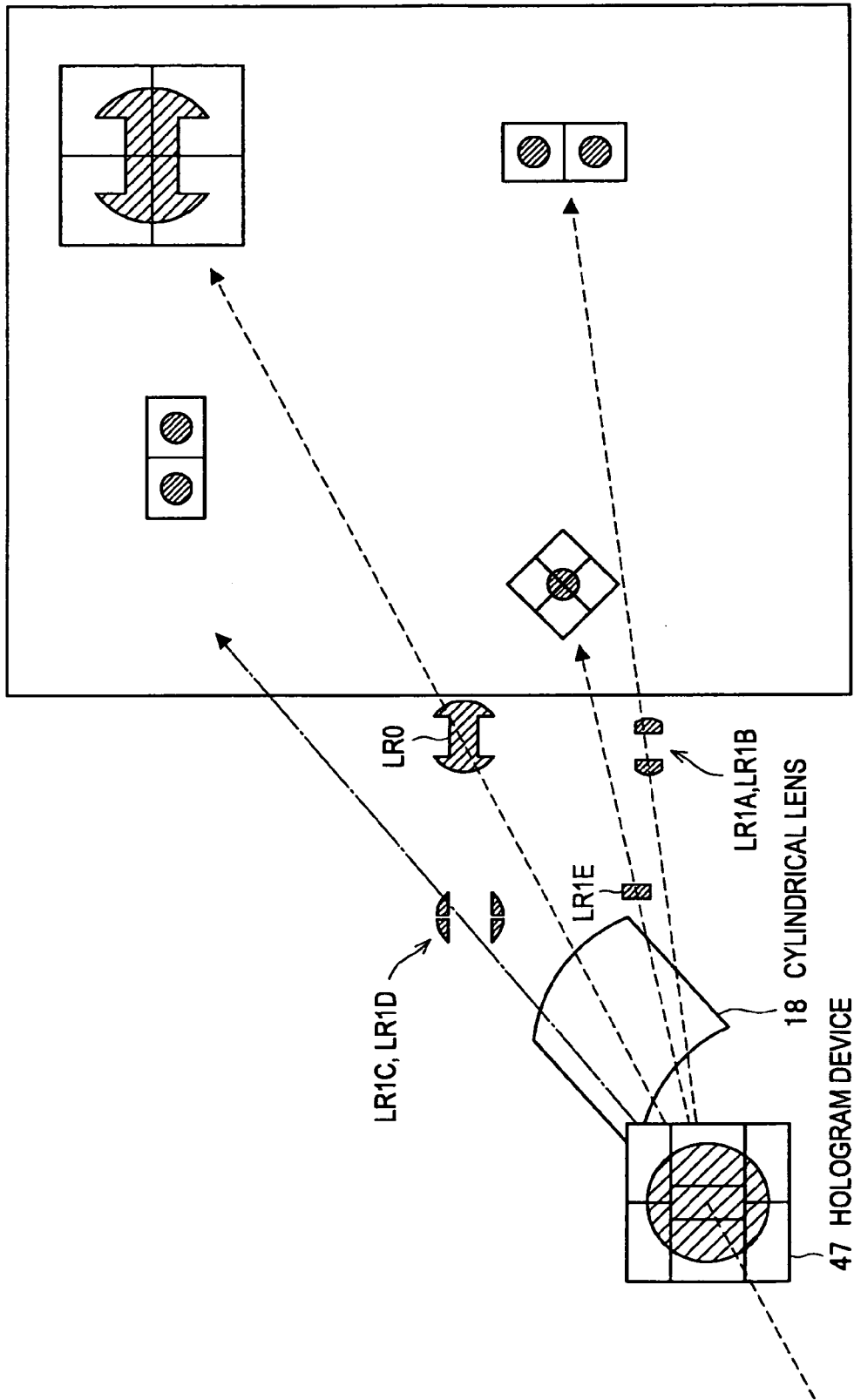
FIG. 12 is an approximate perspective view showing how the light beam is separated according to the second embodiment.

Regions 47C1, 47c2, 47D1, and 47D2 are designed so that, when compared with the first embodiment, the angle of diffraction of each of the reflected light beams LR1C1, LR1C2, LR1D1, and LR1D2 consisting of primary light becomes smaller. FIG. 12 schematically shows how the reflected light beams LR1A to LR1D are shone.

Figure 13:
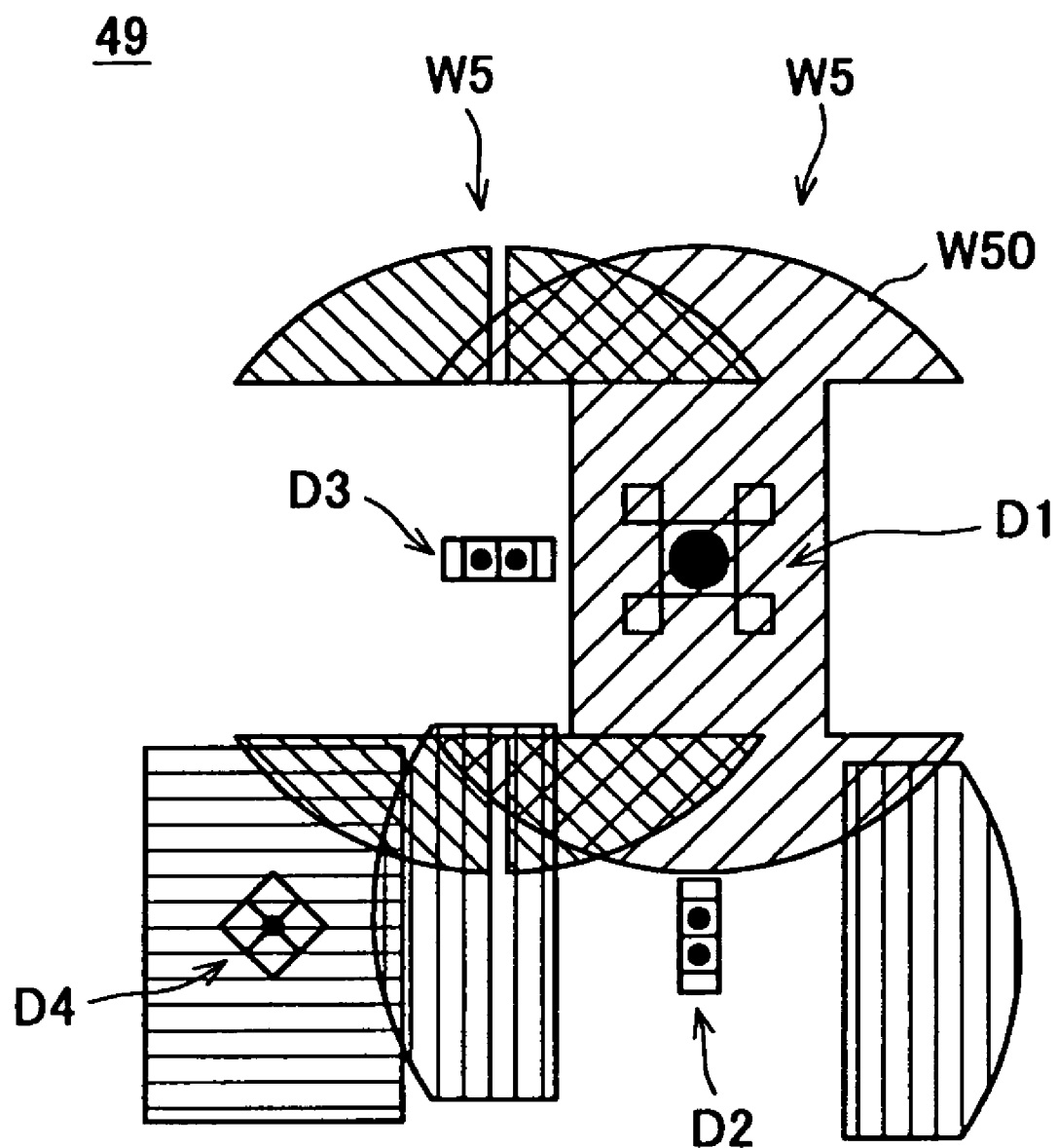
FIG. 13 is an approximate diagram showing the configuration of a photo-detector according to the second embodiment.

As shown in FIG. 13 corresponding to FIG. 4, the receiving unit D3 is provided, when compared with the photo-detector 19, closer to the receiving unit D1 in the photo-detector 49.

Practically, when the photo-detector 49 is irradiated with, for example, the interlayer stray light beam LN3, a stray light pattern W5 corresponding to the stray light pattern W3 in FIG. 7 is formed.

When the stray light pattern W5 is compared with the stray light pattern W3 (FIG. 7A), a stray light pattern W50 consisting of zero-order light has a shape obtained by eliminating portions corresponding to the regions 47A and 47B of the hologram device 47 from a corresponding stray light pattern W30. This is because zero-order light is hardly generated by the regions 47A and 47B.

Also when compared with the stray light pattern W30, the stray light pattern W50 has a shape whose broadening in the transverse direction is suppressed. Thus, though the photo-detector 49 has the receiving unit D3 closer to the receiving unit D1, the photo-detector 49 is formed in such a way that the stray light pattern W50 does not overlap with the receiving unit D3.

The optical pickup 37, on the other hand, calculates the reproducing RF signal SRF according to Formula (6) by using a predetermined coefficient, instead of Formula (4) shown above.

[Math 10]

$$SRF=S1A+S1B+S1C+S1D+\gamma \times (S2A+S2B) \quad (6)$$

In the second embodiment, the so-called push-pull component of the reflected light beam LR is shone on the receiving regions D2A and D2B of the receiving unit D2 as the reflected light beams LR1A and LR1B almost all of which consists of primary light.

Thus, when compared with Formula (4), the term 7×(S2A+ S2B) is added in Formula (6).

Incidentally, in other respects, the optical disk apparatus 30 is configured almost in the same manner as the optical disk apparatus 1 according to the first embodiment.

In the above configuration, the optical pickup 37 of the optical disk apparatus 30 according to the second embodiment irradiates the optical disk 100 with the light beam L1 and separates the reflected light beam LR after being reflected by the optical disk 100 through the hologram device 47.

The hologram device 47 causes the reflected light beam LR0 consisting of zero-order light in portions other than the regions 47A and 47B (FIG. 11A) to travel in an almost straight line and the reflected light beam LR1 consisting of primary light to diffract for each of the regions 47A to 47E.

At this point, the hologram device 47 causes each of the reflected light beams LR1A and LR1B to diffract in the longitudinal direction, each of the reflected light beams LR1C and LR1D to diffract in the transverse direction, and further the reflected light beam LR1E to diffract in a slanting direction.

Correspondingly, the photo-detector 49 receives the reflected light beam LR0 by the receiving regions D1A to D1D of the receiving unit D1 to generate the received light signals S1A to S1D. The photo-detector 49 also receives the reflected light beams LR1A and LR1B by the receiving regions D2A and D2B of the receiving unit D2 respectively to generate the received light signals S2A and S2B. Further, the photo-detector 49 receives the reflected light beams LR1C and LR1D by the receiving regions D3C and D3D of the receiving unit D3 respectively to generate the received light signals S3C and S3D.

The signal processing unit 34 calculates the focus error signal SFE1 by the focus error signal operation circuit 4F according to Formula (1A) or (1B). The signal processing unit 4 also calculates the tracking error signal STE1 by the tracking error signal operation circuit 4T according to Formula (2A) or (2B) and supplies the tracking error signal STE1 to the servo control unit 3A.

Like in the first embodiment, the servo control unit 3A exercises focus control and tracking control.

Therefore, the optical disk apparatus 30 can receive the reflected light beams LR1A, LR1B, LR1C, and LR1D by the receiving unit D2 or D3 of the photo-detector 49. Then, the optical disk apparatus 30 can use the received light signals S2A, S2B, S3C, and S3D, which are received light results thereof, to exercise tracking control based on the generated tracking error signal STE1.

The signal processing unit 34 calculates or extracts the wobble signal SWBL1 according to Formula (5) by the wobble signal operation circuit 4W based on each received light signal amplified by the head amplifier 22. Then, the signal processing unit 34 generates preformatted information such as address information and time information from the wobble signal SWBL1 and outputs the preformatted information to the centralized control unit 2. The centralized control unit 2 can control a recording or reproduction operation based on the address information, time information or the like.

At this point, though the receiving unit D3 is arranged close to the receiving unit D1 in the photo-detector 49, because portions of the stray light pattern W50 originating from zero-order light corresponding to the regions 47A and 47B of the hologram device 47 the stray light pattern W50 does not overlap with the regions 47A and 47B.

That is, when compared with the regions 17C1, 17C2, 17D1, and 17D2 of the hologram device 17 in the first embodiment, the angle of diffraction of primary light by the regions 47C1, 47C2, 47D1, and 47D2 of the hologram device 47 can be made smaller.

When the angle of diffraction is increased in a hologram device, it is generally necessary to make the lattice pitch finer, which may restrict the design or production. In the hologram device 47 according to the second embodiment, by contrast, the lattice pitch of the regions 47C1, 47C2, 47D1, and 47D2 can be made rough, easing restrictions on the design or production.

Further, the optical disk apparatus 30 can receive the reflected light beam that contains almost no push-pull component by the receiving regions D1A to D1D of the receiving unit D1. Thus, the optical disk apparatus 30 can exercise stable focus control whose disturbance by the push-pull component is suppressed based on the focus error signal SFE1 generated by using the received light signals S1A to S1D, which are received light results thereof. A disturbance by the push-pull component means leakage of a tracking error signal into a so-called focus error signal. In other respects, the optical disk apparatus 30 can achieve operation effects similar to those of the first embodiment.

According to the above configuration, the optical pickup 37 of the optical disk apparatus 30 causes the reflected light beam LR to travel in a straight line or to diffract through the hologram device 47. As a result, the optical pickup 37 causes the reflected light beam LR excluding portions corresponding to the regions 47A and 47B and consisting of zero-order light to travel in a straight line and detects the reflected light beam LR0 by the receiving unit D1 of the photo-detector 49 to generate the received light signals S1A to S1D.

The optical pickup 37 also causes the reflected light beams LR1A and LR1B of the reflected light beams LR1 diffracted by the hologram device 47 and consisting of primary light to diffract in the longitudinal direction and receives the reflected light beams LR1A and LR1B by the receiving regions D2A and D2B of the receiving unit D2 to generate the received light signals S2A and S2B respectively.

Further, the optical pickup 37 causes the reflected light beams LR1C and LR1D of the reflected light beams LR1 diffracted by the hologram device 47 and consisting of primary light to diffract in the transverse direction and receives the reflected light beams LR1C and LR1D by the receiving regions D3C and D3D of the receiving unit D3 to generate the received light signals S3C and S3D respectively.

Accordingly, like in the first embodiment, the optical disk apparatus 30 can generate the wobble signal SWBL1 that excludes an influence of the stray light pattern W formed by each of the interlayer stray light beams LN from the plurality of recording layers Y. Thus, the optical disk apparatus 30 can correctly extract preformatted information such as address information and time information with stability. In the second embodiment, as described above, the regions 47A and 47B of the hologram device 47 are made of the so-called blazed hologram. Thus, a portion of the reflected light beam LR overlapping with the region 47A or 47B of the hologram device 47 is almost entirely diffracted as primary light to create the reflected light beam LR1A or LR1B respectively. Therefore, because not subject to attenuation by the hologram device, a signal higher in intensity than in the first embodiment can be obtained as the wobble signal SWBL1 according to Formula (5) calculated by extracted by the wobble signal operation circuit 4W.

Further, the optical disk apparatus 30 can generate, like in the first embodiment, the tracking error signal STE1 that excludes an influence of the stray light pattern W formed by each of the interlayer stray light beams LN from the plurality of recording layers Y so that tracking control can be exercised with precision.

3. Third Embodiment

[3-1. Configuration of Optical Disk Apparatus]

An optical disk apparatus 50 (FIG. 1) according to the third embodiment is different from the optical disk apparatus 1 according to the first embodiment in that, instead of the servo control unit 3A, the signal processing unit 4, and the optical pickup 7, a servo control unit 53A, a signal processing unit 54, and an optical pickup 57 are provided.

Figure 14:
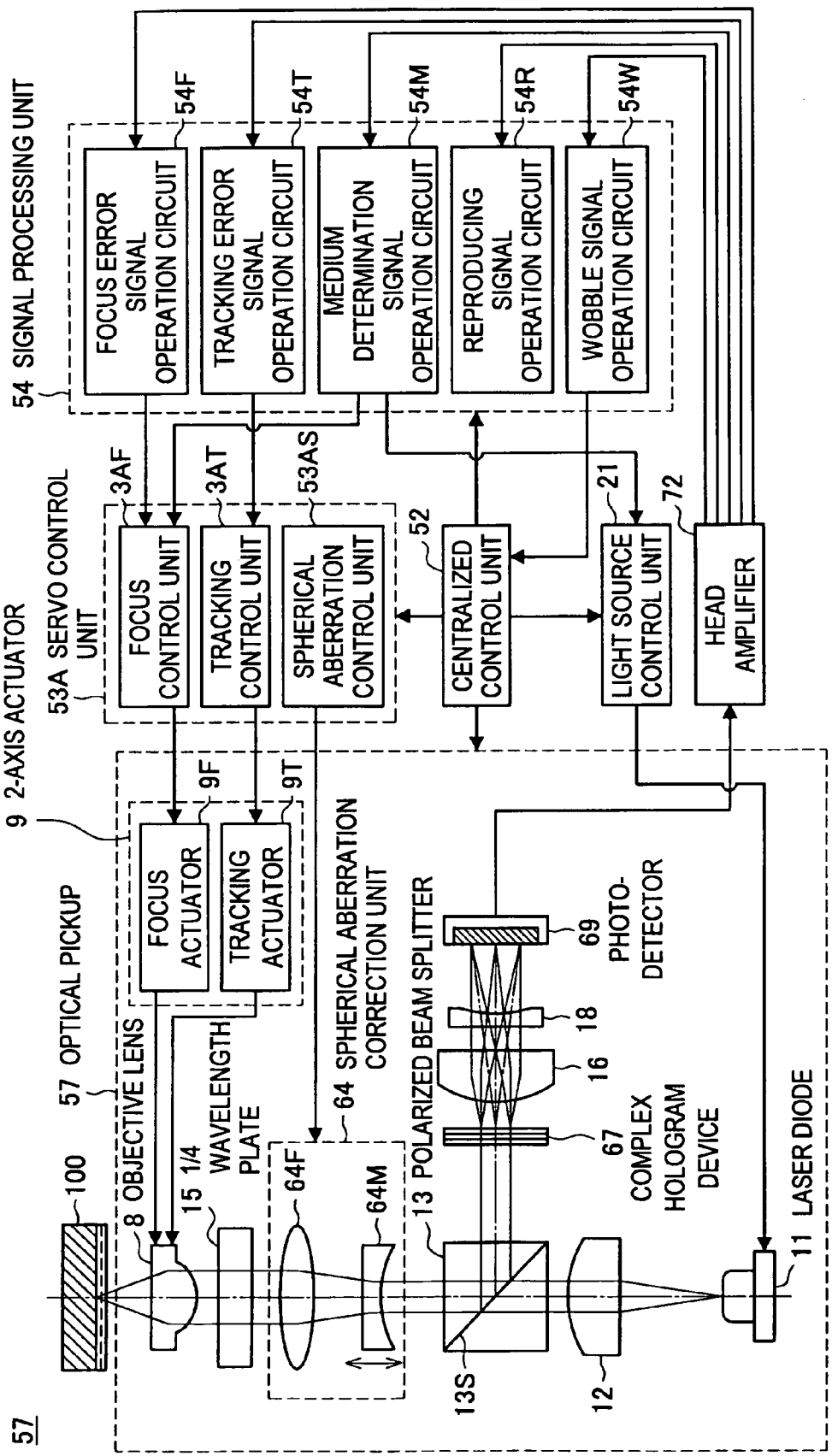
FIG. 14 is an approximate diagram showing the configuration of an optical pickup according to a third embodiment.

As shown in FIG. 14, the servo control unit 53A is different from the servo control unit 3A (FIG. 2) according to the first embodiment in that, instead of the spherical aberration control unit 3AS, a spherical aberration control unit 53AS is provided, but otherwise, the servo control unit 53A is configured in the same manner.

Though the signal processing unit 54 has each operation circuit of the signal processing unit 4 and each corresponding operation circuit, operation processing thereof is partially different from that of the signal processing unit (details will be described later).

[3-2. Configuration of Optical Pickup]

The optical pickup 57 is different from the optical pickup 7 (FIG. 2) in that, instead of the spherical aberration correction unit 14, the hologram device 17, and the photo-detector 19, a spherical aberration correction unit 64, a complex hologram device 67, and a photo-detector 69 are provided.

The spherical aberration correction unit 64 is configured by a fixed lens 64F consisting of a convex lens and whose position is fixed and a moving lens 64M consisting of a concave lens and movable in the direction along the optical axis of the light beam L1 as a Galileo-type beam expander. The moving lens 64M moves based on control from the spherical aberration control unit 53AS of the servo control unit 53A.

Actually, the spherical aberration correction unit 64 first diffuses the light beam L1 by the moving lens 64M and then condenses the light beam L1 by the fixed lens 64F.

Accordingly, like the spherical aberration correction unit 14 in the first embodiment, the spherical aberration correction unit 64 can provide a spherical aberration having characteristics inverse to those of a spherical aberration generated when the light beam L1 is condensed and reaches the target recording layer YT of the optical disk 100 to the light beam L1 in advance.

The complex hologram device 67 replaces the hologram device 17 in the optical pickup 7 (FIG. 2) and is arranged on the front side when viewed from the polarized beam splitter 13.

Figure 15:
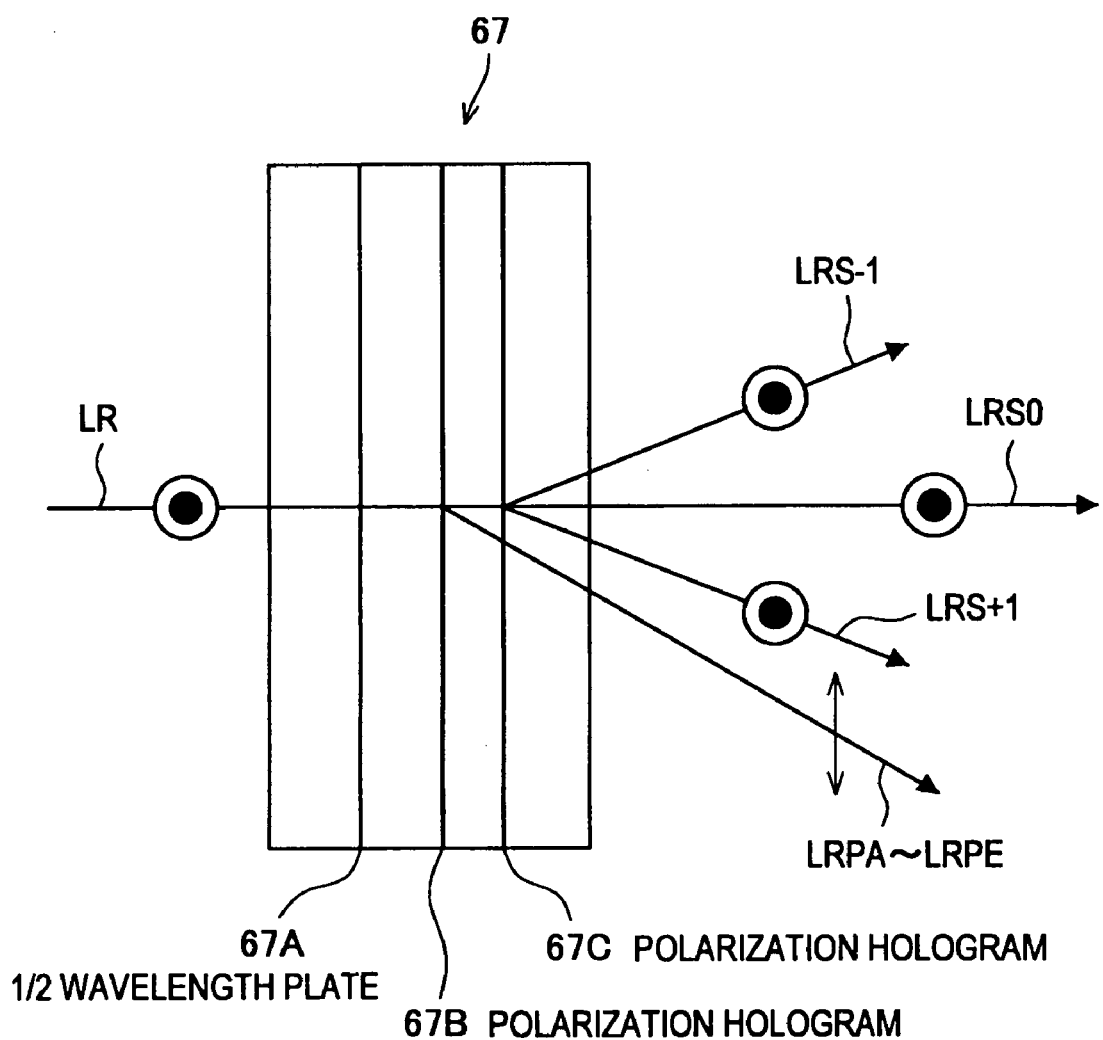
FIG. 15 is an approximate diagram showing the configuration of a complex hologram device according to the third embodiment.

The complex hologram device 67 has, as a schematic sectional view in FIG. 15 shows, an integrated configuration in which a ½ wavelength plate 67A, a polarization hologram 67B, and a polarization hologram 67C are laminated.

Actually, the reflected light beam LR is incident as a light beam of S polarization from the polarized beam splitter 13. In FIG. 15, the polarization direction of the reflected light beam LR consisting of S polarization is represented as a direction perpendicular to the paper surface.

The ½ wavelength plate 67A reduces the S polarization component to a predetermined ratio by rotating the polarization direction of the reflected light beam LR by a predetermined angle and also causes the rest thereof to enter the polarization hologram 67B as a P polarization component.

The polarization hologram 67B is made to exhibit the action of diffraction on a component of a specific polarization direction of a light beam and actually exhibits the action of diffraction on the P polarization component of the reflected light beam LR and allows the S polarization component to transmit without action thereon.

Figure 16A:
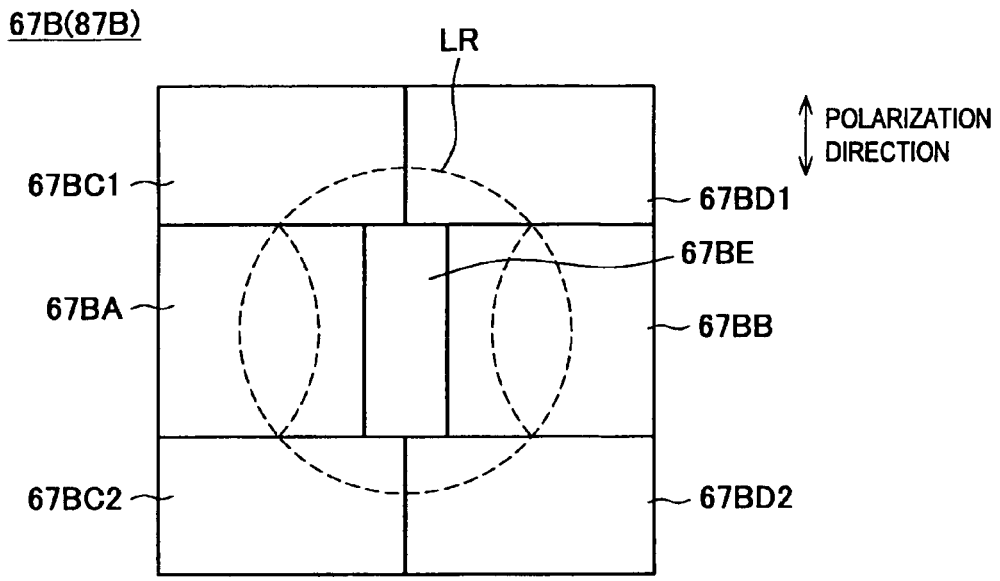
FIG. 16 is an approximate diagram showing a configuration (1) of a polarization hologram.

As shown in FIG. 16A corresponding to FIG. 4A, the polarization hologram 67B is divided, like the similar division pattern of the hologram device 17, into regions 67BA, 67BB, 67BC1, 67BC2, 67BD1, 67BD2, and 67BE.

Figure 16B:
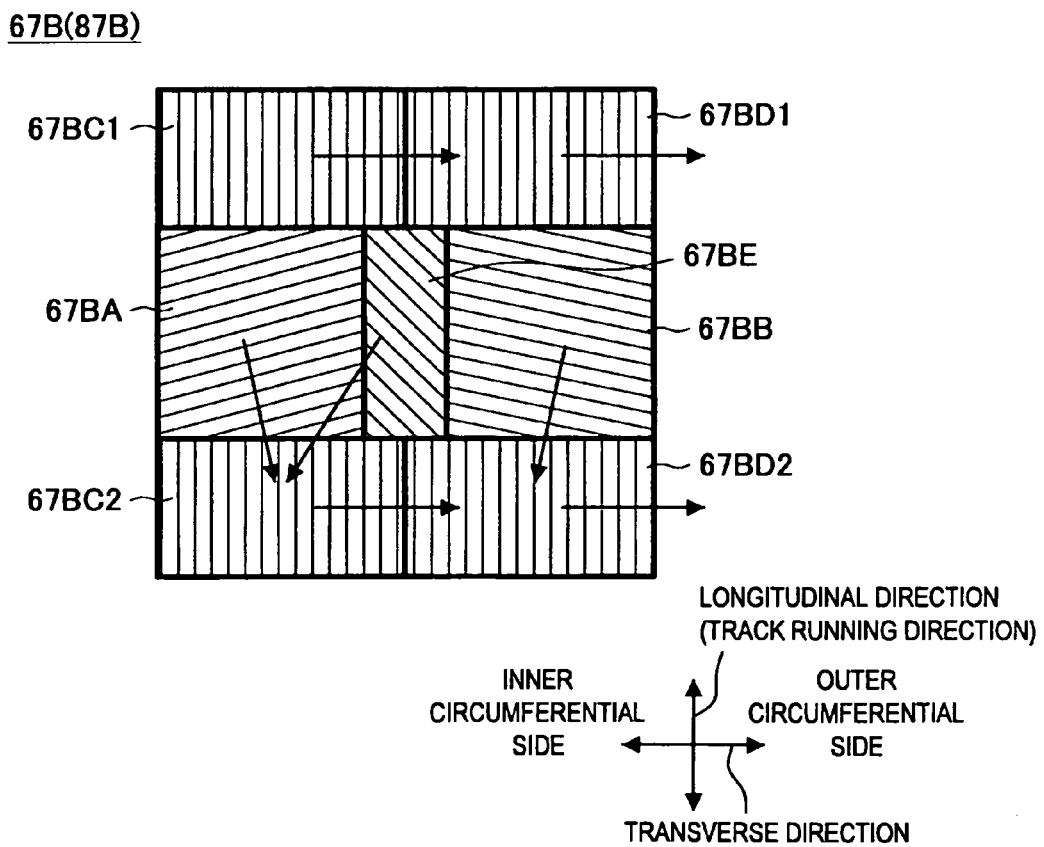

As shown in FIG. 16B corresponding to FIG. 4B, the regions 67BA to 67BE have each diffraction gratings formed therein and the diffraction direction thereof set. The diffraction direction of primary light in the regions 67BA, 67BB, and 67BE is configured in the same manner as that in the regions 17A, 17B, and 17E. Then, the diffraction direction of primary light in the regions 67BC1, 67BC2, 67BD1, and 67BD2 is inverted from that in the regions 17C1, 17C2, 17D1, and 17D2 respectively.

That is, the polarization hologram 67B is made of a blazed hologram that causes the reflected light beam LR to diffract into almost primary light and allows the S polarization component of the reflected light beam LR to transmit unchanged while the P polarization component being caused to diffract for each region.

The polarization hologram 67C is made to exhibit the action of diffraction on a different polarization direction component from that of the polarization hologram 67B and exhibits the action of diffraction on the S polarization component of the reflected light beam LR while the P polarization component being allowed to transmit without any action thereon.

Figure 17A:
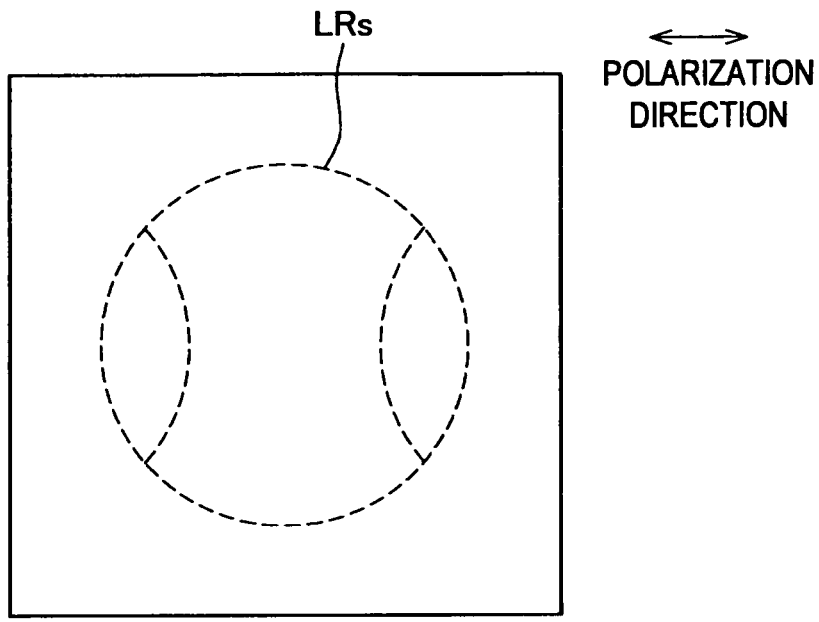
FIG. 17 is an approximate diagram showing a configuration (2) of a polarization hologram.
Figure 17B:
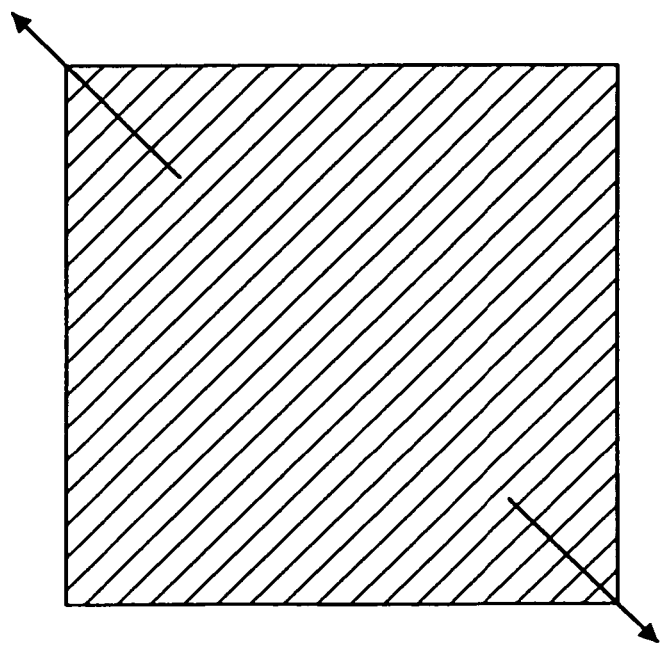

As shown in FIG. 17A, the polarization hologram 67C is configured as uniform diffraction gratings as a whole and is made to diffract primary light, as shown in FIG. 17B, in a slanting direction, that is, in a direction orthogonal to the region 67BE of the polarization hologram 67B. Incidentally, the polarization hologram 67C is made of a so-called binary hologram and separates a light beam into zero-order light and ± primary light.

Actually, as shown in FIG. 18, the polarization hologram 67C exhibits the action of diffraction on the S polarization component of the reflected light beam LR that has passed through the polarization hologram 67B (hereinafter, called a reflected light beam LRS).

In this case, the polarization hologram 67C causes a reflected light beam LRS0 consisting of zero-order light to travel in a straight line unchanged. Further, the polarization hologram 67C causes each of a reflected light beam LRS+1 consisting of + primary light and a reflected light beam LRS−1 consisting of − primary light to diffract in a slanting direction, that is, a direction different from both the longitudinal direction and the transverse direction.

Incidentally, the polarization hologram 67C allows the P polarization component of the reflected light beam LR, that is, reflected light beams LRPA to LRPE diffracted by the polarization hologram 67B for each region to transmit unchanged without the action of diffraction thereon being exhibited.

The condenser lens 16 condenses each of the reflected light beams LRPA to LRPE, LRS0, LRS+1, and LRS−1 emitted from the complex hologram device 67 and causes these reflected light beams to enter the cylindrical lens 18.

Like in the first embodiment, the cylindrical lens provides astigmatism to the reflected light beam LR0 consisting of zero-order light, the reflected light beam LRS+1 consisting of + primary light, and the reflected light beam LRS−1 consisting of − primary light and irradiates the photo-detector 69 with these reflected light beams.

Incidentally, the cylindrical lens 18 similarly provides astigmatism to the reflected light beams LRPA to LRPE consisting of primary light due to optical properties thereof. However, an aberration that cancels out the astigmatism when diffracted by the polarization hologram 67B is given to the reflected light beams LRPA to LRPE in advance.

Thus, the reflected light beams LRPA to LRPE have no aberration when emitted from the cylindrical lens 18.

Figure 19:
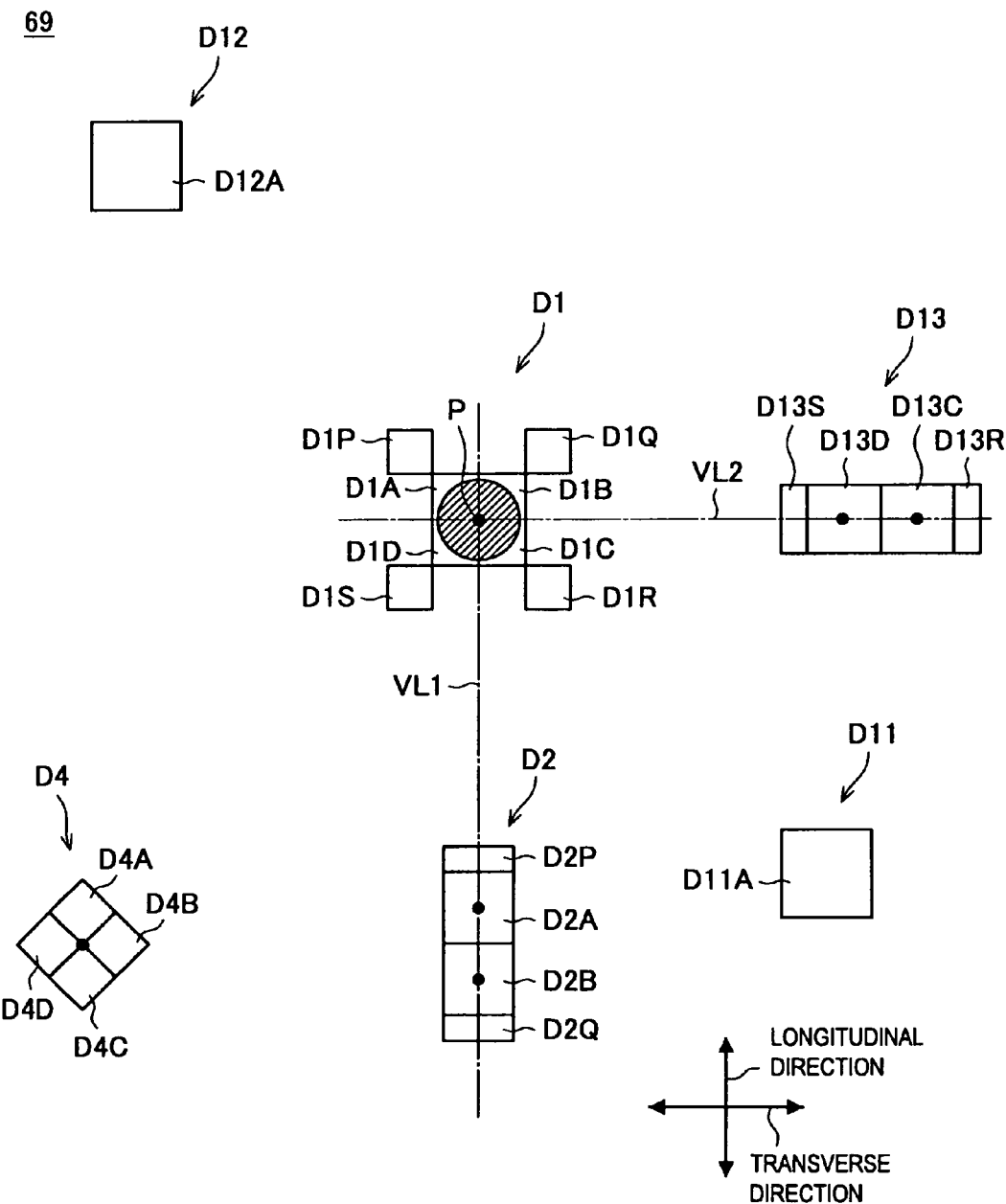
FIG. 19 is an approximate diagram showing the configuration of a photo-detector according to the third embodiment.

As shown in FIG. 19, the photo-detector 69 has a configuration partially similar to that of the photo-detector (FIG. 7) and has the receiving units D1, D2, and D4 similar to those of the photo-detector 19 provided therein.

That is, the photo-detector 69 receives the reflected light beam LRS0 by the receiving regions D1A to D1D of the receiving unit D1 and the reflected light beams LRPA to LRPE by the receiving regions D2A and D2B of the receiving unit D2 respectively. The photo-detector 69 also receives the reflected light beam LRPE by the receiving units D1A to D4D of the receiving unit D4.

The photo-detector 69 has, in place of the receiving unit D3 of the photo-detector 19, a receiving unit D13 provided therein. Like the receiving unit D3, the receiving unit D13 is arranged in the transverse direction from the reference point P, but at a symmetric location of the receiving unit D3 with respect to the virtual straight line VL1 as an axis of symmetry.

The receiving unit D13 also has receiving regions D13C and D13D corresponding to the receiving regions D3C and D3D respectively and receiving regions D13R and D13S corresponding to the stray light receiving regions D3R and D3S provided therein.

The receiving region D13C receives reflected light beams LRPC1 and LRPC2 (these beams are together called a reflected light beam LRPC) to generate the received light signal S3C. The receiving region D13D receives reflected light beams LRPD1 and LRPD2 (these beams are together called a reflected light beam LRPD) to generate the received light signal S3D.

Further, the photo-detector 69 has a receiving unit D11 provided at an approximately symmetric location of the receiving unit D4 with respect to the virtual straight line VL1 as an axis of symmetry, that is, at a location in a slanting direction when viewed from the reference point P and approximately equidistant from the receiving units D2 and D13.

The receiving unit D11 receives the reflected light beam LRS+1 by a single receiving region D11 and generates a received light signal S11 in accordance with the amount of light thereof to supply the received light signal S11 to a head amplifier 72 (FIG. 14).

The photo-detector 69 also has a receiving unit D12 provided at an approximately symmetric location of the receiving unit D11 about the reference point P.

The receiving unit D12 receives the reflected light beam LRS−1 by a single receiving region D12 and generates a received light signal S12 in accordance with the amount of light thereof to supply the received light signal S12 to the head amplifier 72 (FIG. 14).

Thus, the photo-detector 69 receives the reflected light beams LRS0, LRPA to LRPE, LRS+1, and LRS−1 by each of the receiving units D1, D2, D4, D13, D11, and D12. Then, the photo-detector 69 generates a received light signal in accordance with the respective amount of received light to supply the received light signal to the head amplifier 72.

Figure 20:
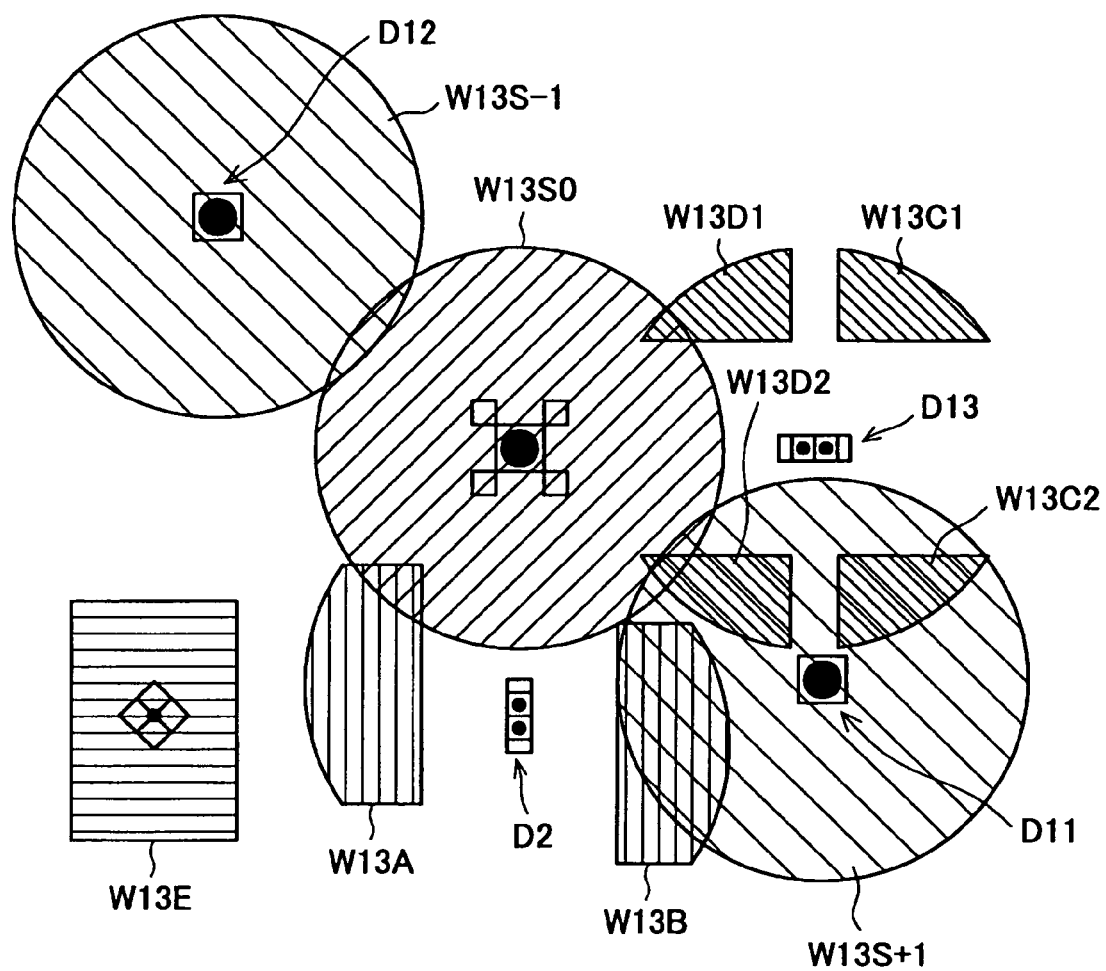
FIG. 20 is an approximate diagram showing the formation of the stray light pattern according to the third embodiment.

As shown in FIG. 20, the photo-detector 69 has a stray light pattern W13 formed by the interlayer stray light beam LN according to the same principle as in the first embodiment. Incidentally, the stray light pattern W13 represents, like the stray light pattern W3, a stray light pattern when the irradiation range is the broadest.

When compared with the stray light pattern W3 shown in FIG. 7A, as shown in FIG. 20, the stray light pattern W13 has stray light patterns W13C1, W13C2, W13D1, and W13D2 formed at symmetric locations of the stray light patterns W3C1, W3C2, W3D1, and W3D2 with respect to the virtual straight line VL1 (FIG. 19) as an axis of symmetry respectively.

The stray light pattern W13 also has stray light patterns W13S+1 and W13S−1 formed by the interlayer stray light beam LN being diffracted by the polarization hologram 67C.

In the photo-detector 69, like the receiving units D1 and D2 of the photo-detector 19, the receiving units D1 and D2 are arranged in such a way that none of a stray light pattern W130, stray light patterns W13A and W13B, and the stray light patterns W13C1, W13C2, W13D1, and W13D2 is overlapped.

Thus, in the photo-detector 69, an error is hardly caused by the interlayer stray light beam LN in the received light signals S2A, S2B, S3C, and S3D generated by the receiving regions D2A, D2B, D13C, and D13D respectively.

[3-3. Generation of Preformatted Signal or the Like]

Actually, like the optical disk apparatus 1 in the first embodiment, the optical disk apparatus 50 is enabled to exercise focus control and tracking control by the servo control unit 53A.

That is, a focus error signal operation circuit 54F of the signal processing unit 54 calculates the focus error signal SFE1 by performing operations according to Formula (1A) or Formula (1B) described above and supplies the focus error signal SFE1 to a focus control unit 53AF of the servo control unit 53A.

When a tracking error signal is generated by the one-beam push-pull method, a tracking error signal operation circuit 54T of the signal processing unit 54 calculates the tracking error signal STE1 by performing operations according to Formula (2A) or Formula (2B) described above. Then, the tracking error signal operation circuit 54T supplies the tracking error signal STE1 to the tracking control unit 53AT of the servo control unit 53A.

When a tracking error signal is generated by the phase contrast method, on the other hand, the tracking error signal operation circuit 54T of the signal processing unit 54 calculates the tracking error signal STE1 by performing operations according to Formula (3) described above. Then, the tracking error signal operation circuit 54T supplies the tracking error signal STE1 to the tracking control unit 53AT of the servo control unit 53A.

Further, in contrast to the first embodiment, the signal processing unit 54 calculates the reproducing RF signal SRF by adding the received light signals S11 and S12 according to Formula (7) below.

[Math 11]

$$SRF=S11+S12 \qquad (7)$$

That is, the optical disk apparatus 50 generates the reproducing RF signal SRF based on received light results of the reflected light beams LRS+1 and LRS−1.

Then, like the reproducing signal operation circuit 4R (FIG. 2), a reproducing signal operation circuit 54R reproduces information recorded on the optical disk 100 by performing predetermined demodulation processing and decoding processing on the reproducing RF signal SRF.

A wobble signal operation circuit 54W of the signal processing unit 54 calculates or extracts the wobble signal SWBL1 according to Formula (5) described above. Then, the wobble signal operation circuit 54W generates preformatted information such as address information and time information from the wobble signal SWBL1 and outputs the preformatted information to the centralized control unit 2. The centralized control unit 2 can control a recording or reproduction operation based on the address information, time information or the like.

[3-4. Operation and Effect]
[3-4-1. Operation]

In the above configuration, the optical pickup 57 of the optical disk apparatus 50 irradiates the optical disk 100 with the light beam L1 to separate the reflected light beam LR reflected by the optical disk 100 and consisting of S polarization by the complex hologram device 67.

The complex hologram device 67 changes the ratio of the S polarization component and P polarization component in the reflected light beam LR by the ½ wavelength plate 67A. Then, the complex hologram device 67 causes the S polarization component in the reflected light beam LR to transmit by the polarization hologram 67B to create the reflected light beam LRS and causes the P polarization component in the reflected light beam LR to diffract for each of the regions 67BA to 67BE.

At this point, the polarization hologram 67B causes each of the reflected light beams LRPA and LRPB to diffract in the longitudinal direction, each of the reflected light beams LRPC and LRPD to diffract in the transverse direction, and further the reflected light beam LRPE to diffract in a slanting direction.

Further, the complex hologram device 67 causes the reflected light beam LRS consisting of S polarization to diffract by the polarization hologram 67C and the reflected light beams LRPA to LRPE consisting of P polarization to transmit. At this point, the polarization hologram 67C causes the reflected light beam LRS0 consisting of zero-order light to travel in an almost straight line and each of the reflected light beams LRS+1 and LRS−1 consisting of + primary light and − primary light respectively to diffract in a slanting direction almost orthogonal to the reflected light beam LRPE.

Correspondingly, the photo-detector 69 receives the reflected light beam LRS0 by the receiving regions D1A to D1D of the receiving unit D1 to generate the received light signals S1A to S1D. The photo-detector 69 also receives the reflected light beams LRPA and LRPB by the receiving regions D2A and D2B of the receiving unit D2 respectively to generate the received light signals S2A and S2B. Further, the photo-detector 69 receives the reflected light beams LRPC and LRPD by the receiving regions D13C and D13D of the receiving unit D13 respectively to generate the received light signals S3C and S3D.

The signal processing unit 54 calculates the focus error signal SFE1 by the focus error signal operation circuit 54F according to Formula (1A) or (1B) based on each received light signal amplified by the head amplifier 72. The signal processing unit 54 also calculates the tracking error signal STE1 by the tracking error signal operation circuit 54T according to Formula (2A) or (2B) and supplies the tracking error signal STE1 to the servo control unit 53A.

The servo control unit 53A exercises tracking control by generating the tracking drive signal STD1 by the tracking control unit 53AT based on the tracking error signal STE1 and supplying the tracking drive signal STD1 to the tracking actuator 9T.

Further, the signal processing unit 54 calculates or extracts the wobble signal SWBL1 according to Formula (5) by the wobble signal operation circuit 54W based on each received light signal amplified by the head amplifier 72. Then, the signal processing unit 54 generates preformatted information such as address information and time information from the wobble signal SWBL1 and outputs the preformatted information to a centralized control unit 52. The centralized control unit 52 can control a recording or reproduction operation based on the address information, time information or the like.

[3-4-2. Effect]

Therefore, the optical disk apparatus 50 can receive each of the reflected light beams LRPA, LRPB, LRPC, and LRPD by the receiving unit D2 or D13 of the photo-detector 69. Then, the optical disk apparatus 50 can exercise tracking control based on the tracking error signal STE1 generated by using the received light signals S2A, S2B, S3C, and S3D, which are received light results thereof.

Here, in the photo-detector 69, like in the photo-detector 19, the receiving unit D2 is arranged in the longitudinal direction when viewed from the reference point P and the receiving regions D2A and D2B are arranged by being mutually placed in the longitudinal direction so that various kinds of the stray light pattern W can be avoided.

Moreover, in the photo-detector 69, the receiving unit D13 is arranged in the transverse direction when viewed from the reference point P and the receiving regions D13C and D13D are arranged by being mutually placed in the transverse direction so that various kinds of the stray light pattern W can be avoided.

That is, in the photo-detector 69, the receiving regions D2A, D2B, D13C, and D13D are arranged in such a way that various kinds of the stray light pattern W generated by a plurality of recording layers Y having different interlayer distances from the target recording layer YT in the optical disk 100 can be avoided. Thus, the optical disk apparatus 50 can extract the correct wobble signal SWBL1 with the precision of the tracking error signal STE1 nearly maintained.

The optical disk apparatus 50 can also calculate the reproducing RF signal SRF by the reproducing signal operation circuit 54R of the signal processing unit 54 by adding the two received light signals S11 and S12.

Thus, when compared with the optical disk apparatus 1 that calculates the reproducing RF signal SRF by adding the four received light signals S1A to S1D, the optical disk apparatus 50 can reduce the number of involving amplifier circuits (in the head amplifier 72). Thus, the optical disk apparatus 50 can reduce an amplifier noise component contained in the reproducing RF signal SRF.

Further, in the optical disk apparatus 50, a spherical aberration generated in the light beam L1 and reflected light beam LR is corrected by the spherical aberration correction unit 64. Accordingly, when compared with an optical disk apparatus configured to correct the spherical aberration by moving, for example, the collimator lens 12 in the direction of optical axis, the optical disk apparatus 50 can stabilize the amount of light of the light beam L1 emitted from the objective lens 8 without fluctuations.

In addition, the optical disk apparatus 50 can achieve operation effects similar to those of the optical disk apparatus 1 in the first embodiment.

According to the above configuration, the optical pickup 57 of the optical disk apparatus 50 causes the reflected light beam LRS0 to travel in an almost straight line by causing the reflected light beam LR to diffract by the complex hologram device 67 and detects the reflected light beam LRS0 by the receiving unit D1 of the photo-detector 69 to generate the received light signals S1A to S1D.

The optical pickup 57 also causes the reflected light beams LRPA and LRPB to diffract in the longitudinal direction and receives the reflected light beams LRPA and LRPB by the receiving regions D2A and D2B of the receiving unit D2 to generate the received light signals S2A and S2B respectively.

Further, the optical pickup 57 causes the reflected light beams LRPC and LRPD to diffract in the transverse direction and receives the reflected light beams LRPC and LRPD by the receiving regions D13C and D13D of the receiving unit D13 to generate the received light signals S3C and S3D respectively.

Accordingly, the optical disk apparatus 50 can generate the wobble signal SWBL1 that excludes an influence of the stray light pattern W formed by each of the interlayer stray light beams LN from the plurality of recording layers Y. Thus, the optical disk apparatus 50 can correctly extract preformatted information such as address information and time information with stability.

Further, the optical disk apparatus 50 can generate the tracking error signal STE1 that excludes an influence of the stray light pattern W formed by each of the interlayer stray light beams LN from the plurality of recording layers Y so that tracking control can be exercised with precision.

4. Fourth Embodiment

[4-1. Configuration of Optical Disk Apparatus]

An optical disk apparatus 70 (FIG. 1) according to the fourth embodiment is different from the optical disk apparatus 50 according to the third embodiment in that, instead of the signal processing unit 54 and the optical pickup 57, a signal processing unit 74 and an optical pickup 77 are provided.

The signal processing unit 74 is different from the signal processing unit 54 in that, instead of the reproducing signal operation circuit 54R, a reproducing signal operation circuit 74R is provided, but other operation circuits are configured in the same manner as those of the reproducing signal operation circuit 54R.

[4-2. Configuration of Optical Pickup]

Figure 21:
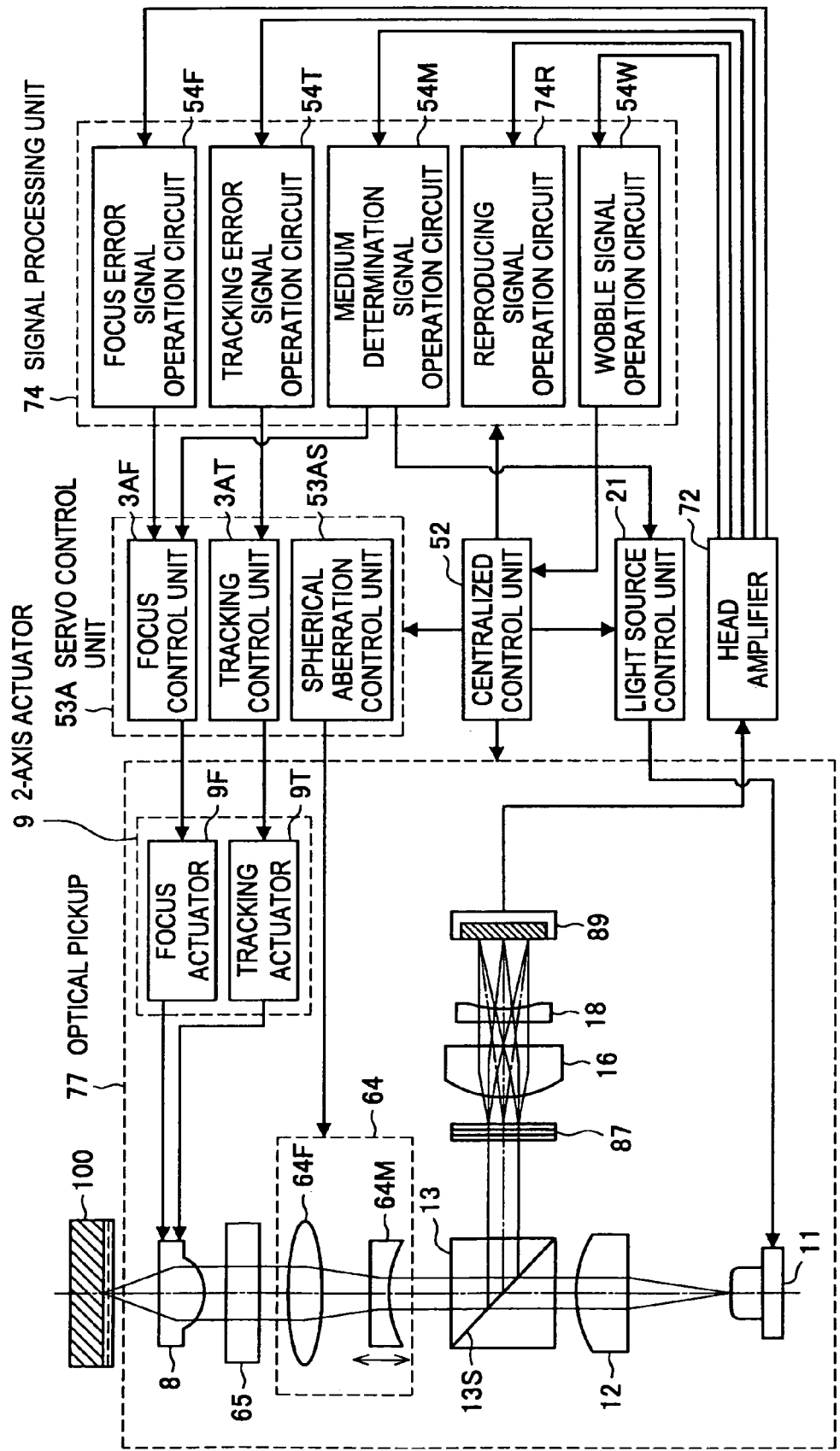
FIG. 21 is an approximate diagram showing the configuration of an optical pickup according to a fourth embodiment.

As shown in FIG. 21, the optical pickup 77 is different from the optical pickup 57 (FIG. 14) in that, instead of the complex hologram device 67 and the photo-detector 69, a complex hologram device 87 and a photo-detector 89 are provided.

Figure 22:
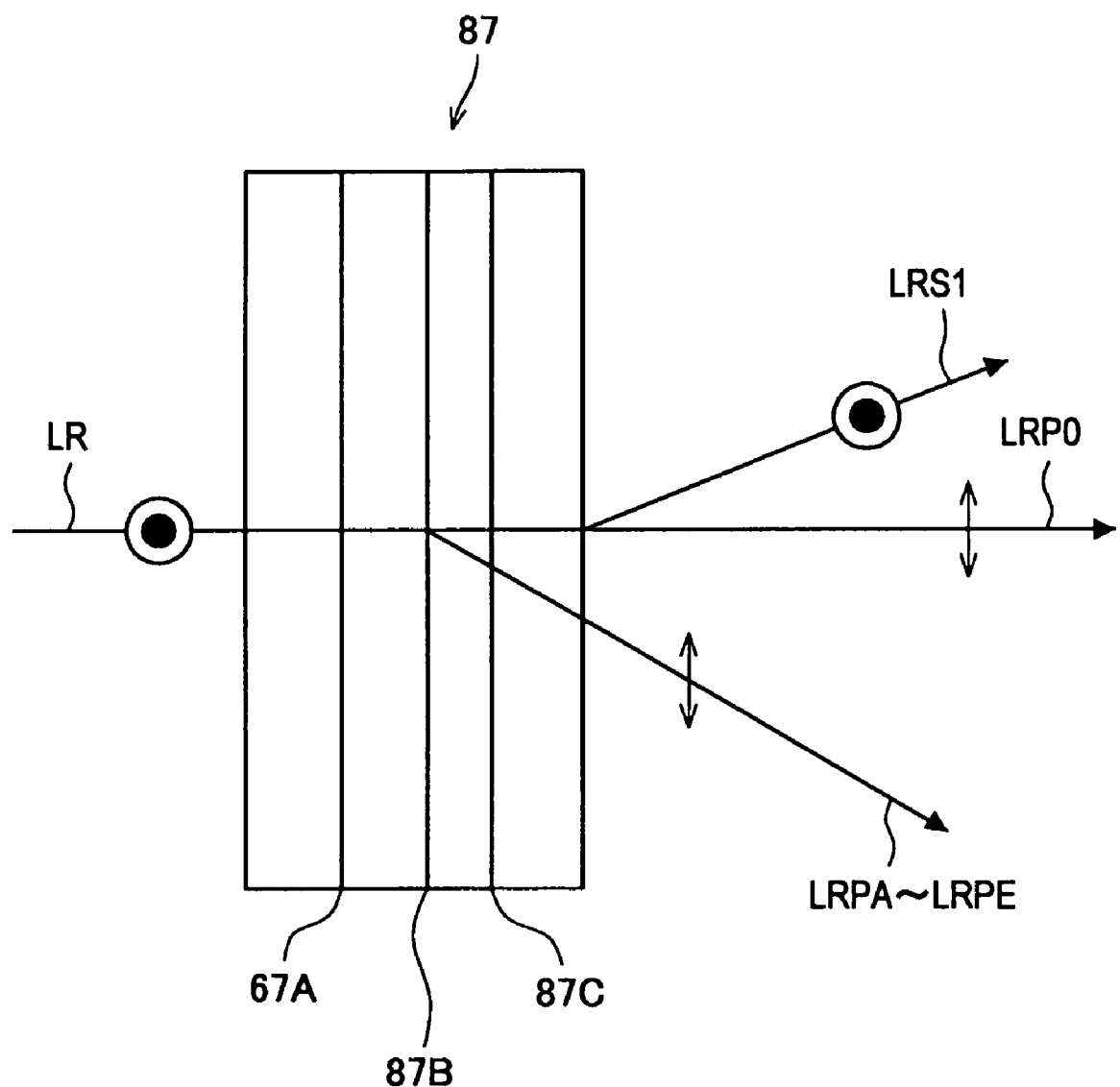
FIG. 22 is an approximate diagram showing the configuration of a complex hologram device according to the fourth embodiment.

As shown in FIG. 22 corresponding to FIG. 15, when compared with the complex hologram device 67 in the third embodiment, the complex hologram device 87 is provided with a polarization hologram 87B, instead of the polarization hologram 67B. Then, the complex hologram device 87 is provided with a polarization hologram 87C, instead of the polarization hologram 67C. Incidentally, the ½ wavelength plate 67A is configured in the same manner.

The polarization hologram 87B is made of a binary hologram that diffracts the reflected light beam LR into zero-order light and primary light and is divided, like the polarization hologram 67B, into the regions 67BA to 67BE (FIG. 16).

Like the polarization hologram 67C (FIG. 17), the polarization hologram 87C exhibits the action of diffraction only on the S polarization component of the reflected light beam LR and allows the P polarization component to transmit without action thereon.

Figure 23A:
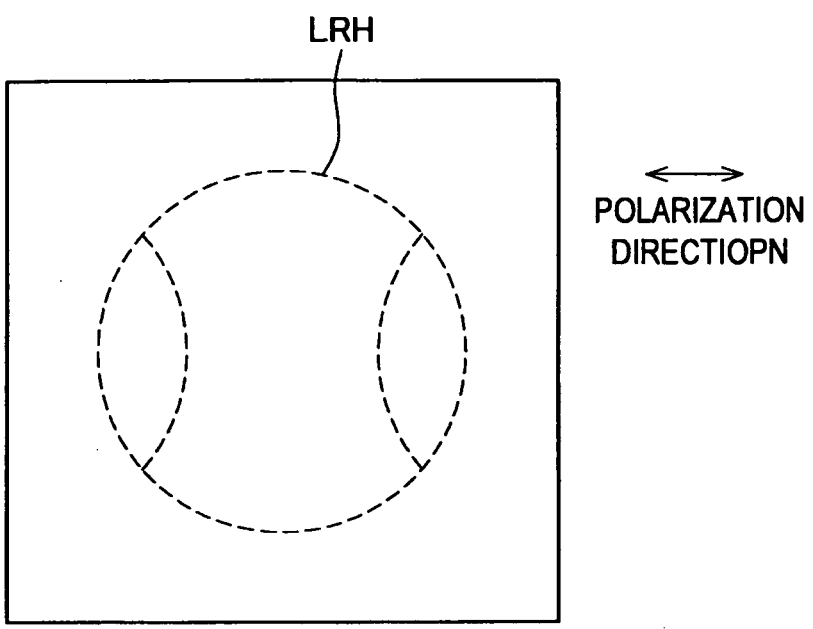
FIG. 23 is an approximate diagram showing a configuration (3) of a polarization hologram.

As shown in FIG. 23A corresponding to FIG. 17A, the polarization hologram 87C is configured as uniform diffraction gratings as a whole, but has, in contrast to the polarization hologram 67C, a blazed hologram that diffracts the light beam into almost primary light only formed therein.

Figure 23B:
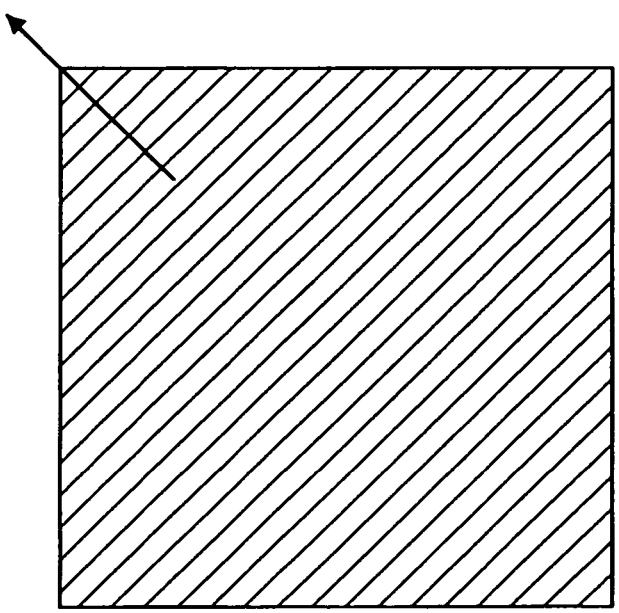

Thus, as shown in FIG. 23B, the polarization hologram 87C diffracts the primary light in one of slanting directions that is different from both the longitudinal direction and the transverse direction, that is, only in an upper left direction.

Actually, as shown in FIG. 24, the polarization hologram 87C exhibits the action of diffraction on the reflected light beam LRS of the reflected light beam LR that has passed through the polarization hologram 87B.

At this point, the polarization hologram 87C causes a reflected light beam LRS1 consisting of primary light to diffract in a slanting direction.

Incidentally, like the polarization hologram 67C, the polarization hologram 87C causes the P polarization component of the reflected light beam LR, that is, a reflected light beam LRP0 that travels through the polarization hologram 87B in a straight line and the reflected light beams LRPA to LRPE diffracted by the polarization hologram 87B for each region to transmit unchanged without the action of diffraction thereon being exhibited.

The condenser lens 16 condenses each of the reflected light beams LRP0, LRPA to LRPE, and LRS1 emitted from the complex hologram device 87 and causes these reflected light beams to enter the cylindrical lens 18.

Like in the first embodiment, the cylindrical lens provides astigmatism to the reflected light beam LRP0 consisting of zero-order light and irradiates the photo-detector 89 with the reflected light beam.

Incidentally, the cylindrical lens 18 similarly provides astigmatism to the reflected light beams LRPA to LRPE and LRS1 consisting of primary light due to optical properties thereof. However, an aberration that cancels out the astigmatism when diffracted by the polarization holograms 87B and 87C is given to the reflected light beams LRPA to LRPE and LRS1 in advance.

Thus, the reflected light beams LRPA to LRPE and LRS1 have no aberration when emitted from the cylindrical lens 18.

Figure 25:
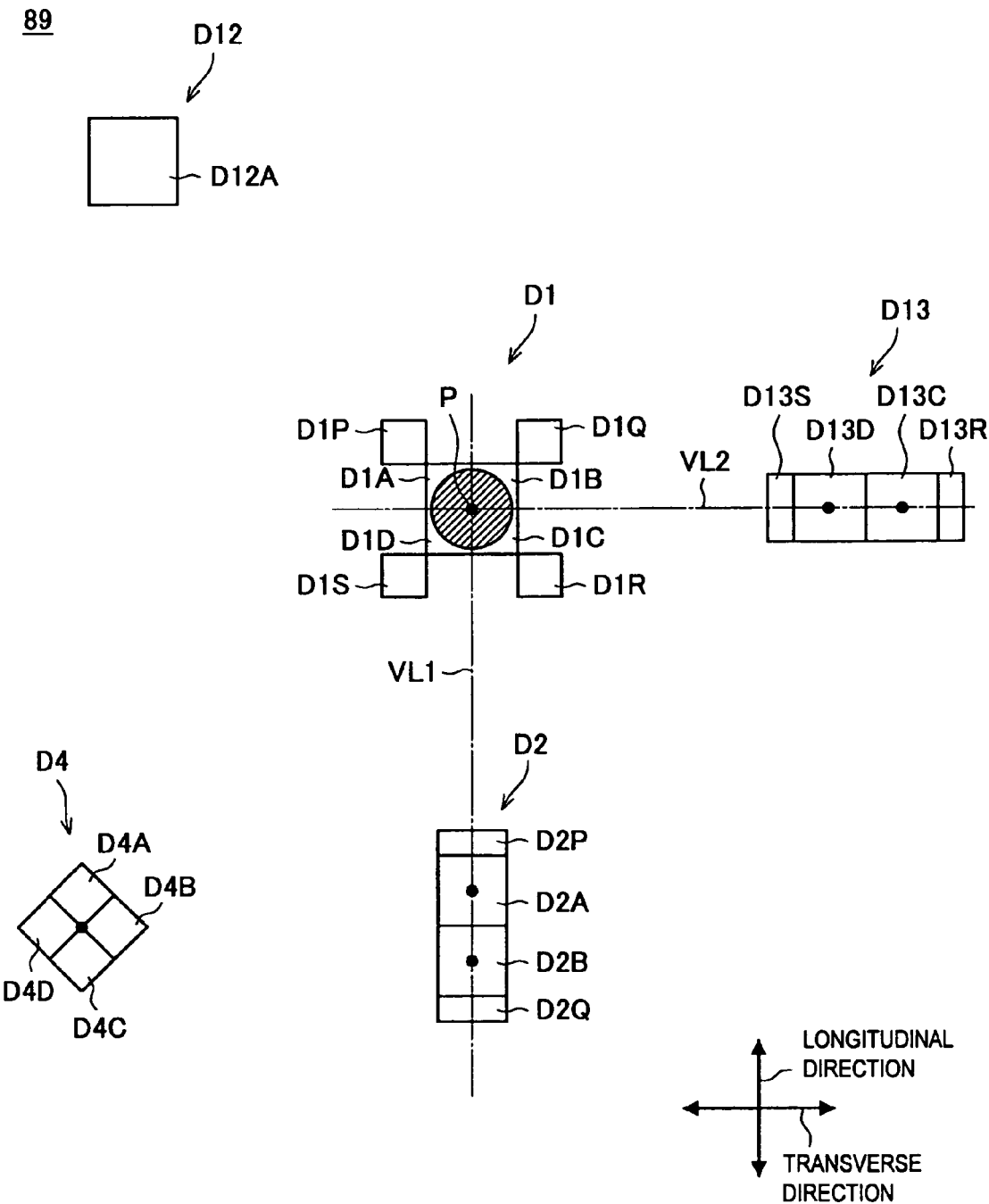
FIG. 25 is an approximate diagram showing the formation of the stray light pattern according to the fourth embodiment.

On the other hand, as shown in FIG. 25 corresponding to FIG. 19, the photo-detector 89 corresponding to the photo-detector 69 has a configuration in which the receiving unit D11 is omitted from that of the photo-detector 69.

The receiving unit D12 receives the reflected light beam LRS1 by a receiving region D12A and generates the received light signal S12 in accordance with the amount of light thereof to supply the received light signal S12 to the head amplifier 72 (FIG. 21).

Thus, the photo-detector 89 receives the reflected light beams LRP0, LRPA to LRPE, and LRS1 by each of the receiving units D1, D2, D4, D13, and D12. Then, the photo-detector 89 generates a received light signal in accordance with the respective amount of received light to supply the received light signal to the head amplifier 72.

Figure 26:
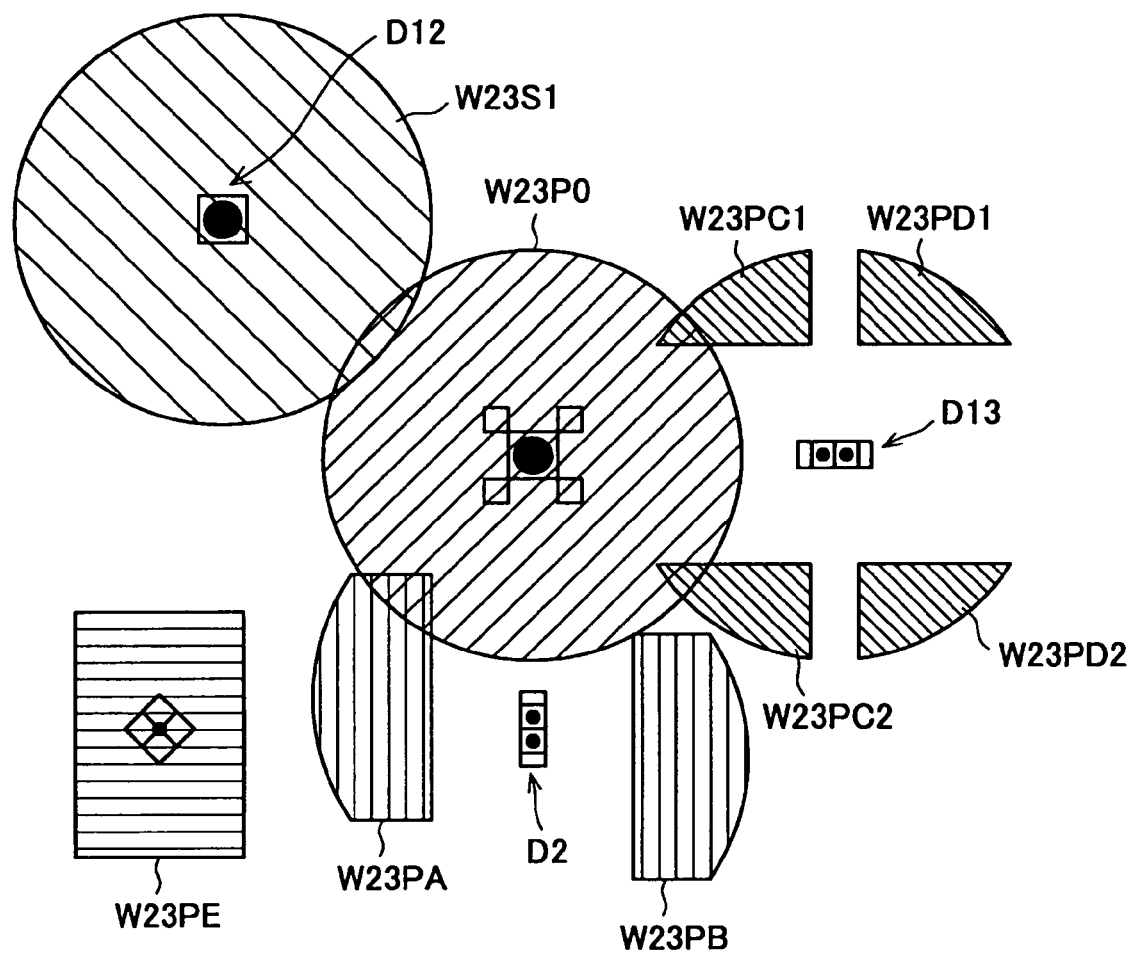
FIG. 26 is an approximate diagram showing the formation of the stray light pattern according to the fourth embodiment.

As shown in FIG. 26 corresponding to FIG. 22, the photo-detector 89 has a stray light pattern W23 formed by the interlayer stray light beam LN. Incidentally, the stray light pattern W23 represents, like the stray light pattern W13, a stray light pattern when the irradiation range is the broadest.

When compared with the stray light pattern W13, the stray light pattern W23 has a shape in which a portion of the stray light pattern W13S+1 is omitted from that of the stray light pattern W13. This is because the polarization hologram 87C becomes a blazed hologram so that when a light beam is diffracted, only primary light is generated.

Thus, in the photo-detector 89, like the photo-detector 69 in the third embodiment, the receiving units D2 and D13 are arranged in such a way that none of stray light patterns W23P0, W23AS1, and W23PA to W23PE is overlapped.

Thus, in the photo-detector 89, an error is hardly caused by the interlayer stray light beam LN in the received light signals S2A, S2B, S3C, and S3D generated by the receiving regions D2A, D2B, D13C, and D13D respectively.

[4-3. Generation of Preformatted Signal and the Like]

Actually, like the optical disk apparatus 50 in the third embodiment, the optical disk apparatus 70 is enabled to exercise focus control and tracking control by the servo control unit 53A.

In contrast to the third embodiment, the signal processing unit 74 sets the received light signal S12 as the reproducing RF signal SRF according to Formula (8) below.

[Math 12]

$$SRF = S12 \tag{8}$$

That is, in the optical disk apparatus 70, the reproducing RF signal SRF is generated based on a received light result of the reflected light beam LRS1.

Then, like the reproducing signal operation circuit 54R (FIG. 12), the reproducing signal operation circuit 74R reproduces information recorded on the optical disk 100 by performing predetermined demodulation processing and decoding processing on the reproducing RF signal SRF.

[4-4. Operation and Effect]

[4-4-1. Operation]

In the above configuration, the optical pickup 77 of the optical disk apparatus 70 irradiates the optical disk 100 with the light beam L1 to separate the reflected light beam LR reflected by the optical disk 100 and consisting of S polarization by the complex hologram device 87.

Like in the third embodiment, the ½ wavelength plate 67A of the complex hologram device 87 changes the ratio of the S polarization component and P polarization component in the reflected light beam LR. Then, the polarization hologram 87B causes the S polarization component in the reflected light beam LR to transmit to create the reflected light beam LRS and causes the P polarization component in the reflected light beam LR to diffract for each of the regions 67BA to 67BE.

At this point, the polarization hologram 87B causes each of the reflected light beams LRPA and LRPB to diffract in the longitudinal direction, each of the reflected light beams LRPC and LRPD to diffract in the transverse direction, and further the reflected light beam LRPE to diffract in a slanting direction. Further, the polarization hologram 87B causes zero-order light of the reflected light beam LRP that was not diffracted to travel in a straight line unchanged as the reflected light beam LRP0.

Further, the polarization hologram 87C of the complex hologram device 87 causes the reflected light beam LRS consisting of S polarization to diffract and the reflected light beams LRP0 and LRPA to LRPE to transmit. At this point, the polarization hologram 87C causes the reflected light beam LRS1 consisting of primary light to diffract in a slanting direction almost orthogonal to the reflected light beam LRPE.

Correspondingly, the photo-detector 89 receives the reflected light beam LRP0 by the receiving regions D1A to D1D of the receiving unit D1 to generate the received light signals S1A to S1D. The photo-detector 89 also receives the reflected light beams LRPA and LRPB by the receiving regions D2A and D2B of the receiving unit D2 respectively to generate the received light signals S2A and S2B. Further, the photo-detector 89 receives the reflected light beams LRPC and LRPD by the receiving regions D13C and D13D of the receiving unit D13 respectively to generate the received light signals S3C and S3D.

Like in the third embodiment, the signal processing unit 74 calculates the focus error signal SFE1 by the focus error signal operation circuit 54F according to Formula (1A) or (1B) based on each received light signal amplified by the head amplifier 72. The signal processing unit 74 also calculates the tracking error signal STE1 by the tracking error signal operation circuit 54T according to Formula (2A) or (2B) based on each received light signal amplified by the head amplifier 72. Then, the signal processing unit 74 supplies these signals to the servo control unit 53A.

The servo control unit 53A exercises tracking control by generating the tracking drive signal STD1 by the tracking control unit 53AT based on the tracking error signal STE1 and supplying the tracking drive signal STD1 to the tracking actuator 9T.

Further, the signal processing unit 74 calculates or extracts the wobble signal SWBL1 according to Formula (5) by the wobble signal operation circuit 54W based on each received light signal amplified by the head amplifier 72. Then, the signal processing unit 74 generates preformatted information such as address information and time information from the wobble signal SWBL1 and outputs the preformatted information to the centralized control unit 52. The centralized control unit 52 can control a recording or reproduction operation based on the address information, time information or the like.

[4-4-2. Effect]

Therefore, the optical disk apparatus 70 can receive each of the reflected light beams LRPA, LRPB, LRPC, and LRPD by the receiving unit D2 or D13 of the photo-detector 89. Then, the optical disk apparatus 70 can exercise tracking control based on the tracking error signal STE1 generated by using the received light signals S2A, S2B, S3C, and S3D, which are received light results thereof.

Here, in the photo-detector 89, like in the photo-detector 69, the receiving unit D2 is arranged in the longitudinal direction when viewed from the reference point P and the receiving regions D2A and D2B are arranged by being mutually placed in the longitudinal direction so that various kinds of the stray light pattern W can be avoided.

Moreover, in the photo-detector 89, like in the photo-detector 69, the receiving unit D13 is arranged in the transverse direction when viewed from the reference point P and the receiving regions D13C and D13D are arranged by being mutually placed in the transverse direction so that various kinds of the stray light pattern W can be avoided.

That is, in the photo-detector 89, the receiving regions D2A, D2B, D13C, and D13D are arranged in such a way that various kinds of the stray light pattern W generated by a plurality of recording layers Y having different interlayer distances from the target recording layer YT in the optical disk 100 can be avoided. Thus, the optical disk apparatus 70 can extract the correct wobble signal SWBL1 with the precision of the tracking error signal STE1 nearly maintained.

The optical disk apparatus 70 can also calculate the reproducing RF signal SRF based on the received light signal S12 by the reproducing signal operation circuit 74R of the signal processing unit 74.

Thus, when compared with the optical disk apparatus 50 that calculates the reproducing RF signal SRF by adding the two received light signals S11 and S12, the optical disk apparatus 70 can further reduce the number of involving amplifier circuits (in the head amplifier 72). Thus, the amplifier noise component contained in the reproducing RF signal SRF can still be reduced.

Moreover, the optical disk apparatus 70 suppresses astigmatism of the reflected light beam LRS1 consisting of primary light by the polarization hologram 87C of the complex hologram device 87 and thus, the reflected light beam LRS1 can be converged to almost a point in the receiving region D12A of the receiving unit D12 for irradiation. Therefore, the total area of the receiving region of the receiving unit D12 can be decreased and so that frequency characteristics of the reproducing RF signal SRF can be improved by reducing electric capacity of the receiving region.

In addition, the optical disk apparatus 70 can achieve operation effects similar to those of the optical disk apparatus 50 in the third embodiment.

According to the above configuration, the optical pickup 77 of the optical disk apparatus 70 causes the reflected light beam LRP0 to travel in an almost straight line by causing the reflected light beam LR to diffract by the complex hologram device 87 and detects the reflected light beam LRP0 by the receiving unit D1 of the photo-detector 89 to generate the received light signals S1A to S1D.

The optical pickup 77 also causes the reflected light beams LRPA and LRPB to diffract in the longitudinal direction and receives the reflected light beams LRPA and LRPB by the receiving regions D2A and D2B of the receiving unit D2 to generate the received light signals S2A and S2B respectively.

Further, the optical pickup 77 causes the reflected light beams LRPC and LRPD to diffract in the transverse direction and receives the reflected light beams LRPC and LRPD by the receiving regions D13C and D13D of the receiving unit D13 to generate the received light signals S3C and S3D respectively.

Accordingly, the optical disk apparatus 70 can generate the wobble signal SWBL1 that excludes an influence of the stray light pattern W formed by each of the interlayer stray light beams LN from the plurality of recording layers Y. Thus, the optical disk apparatus 70 can correctly extract preformatted information such as address information and time information with stability.

Further, the optical disk apparatus 70 can generate the tracking error signal STE1 that excludes an influence of the stray light pattern W formed by each of the interlayer stray light beams LN from the plurality of recording layers Y so that tracking control can be exercised with precision.

5. Fifth Embodiment

[5-1. Configuration of Optical Disk Apparatus]

An optical disk apparatus 90 (FIG. 1) according to the fifth embodiment is different from the optical disk apparatus 70 according to the fourth embodiment in that, instead of the optical pickup 77, an optical pickup 91 is provided, but is otherwise configured in the same manner.

[5-2. Configuration of Optical Pickup]

Figure 27:
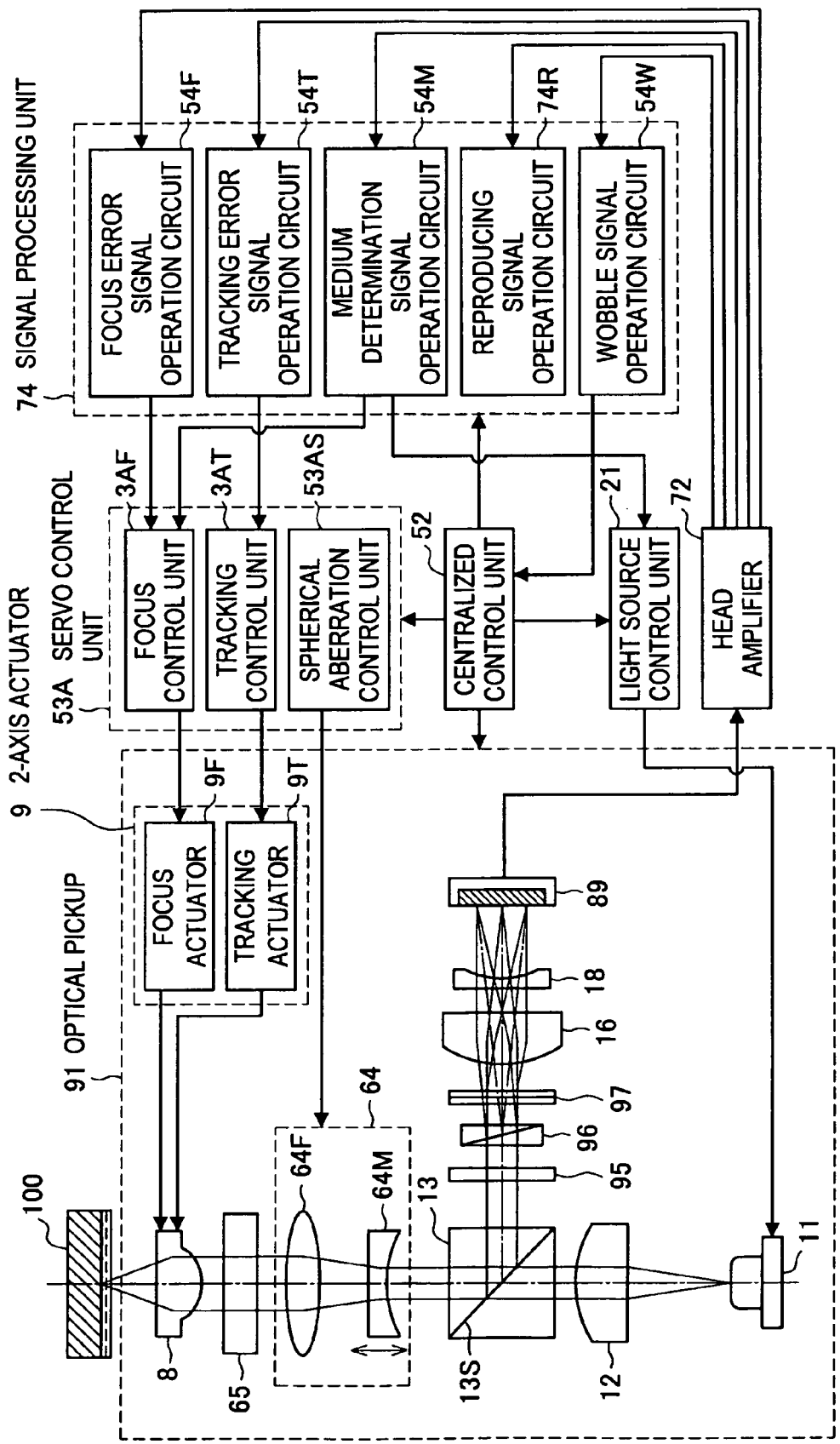
FIG. 27 is an approximate diagram showing the configuration of an optical pickup according to a fifth embodiment.

As show in FIG. 27 in which the same reference numerals are attached to corresponding components as those in FIG. 21, the optical pickup 91 is different from the optical pickup 77 in that, instead of the complex hologram device 87, a ½ wavelength plate 95, a Rochon prism 96, and a hologram device 97 are provided.

Like the ½ wavelength plate 67A of the complex hologram device 87, the ½ wavelength plate 95 reduces the S polarization component to a predetermined ratio by rotating the polarization direction of the reflected light beam LR by a predetermined angle and also causes the rest thereof to enter the Rochon prism 96 as a P polarization component.

The Rochon prism 96 is a kind of polarizer called Nicol's prism using birefringent crystals and refracts a predetermined polarization direction component of an incident light beam and also causes other polarization direction components to transmit and travel in a straight line.

The Rochon prism 96 is also made to refract a light beam in a slanting direction at an angle of about 45 degrees to both the longitudinal direction and the transverse direction, that is, in an upper left direction in FIG. 23.

Incidentally, the Rochon prism 96 changes the traveling direction of a light beam by the action of refraction and thus, when compared with the action of diffraction by a hologram device or the like, can change the traveling direction thereof markedly.

Figure 28:
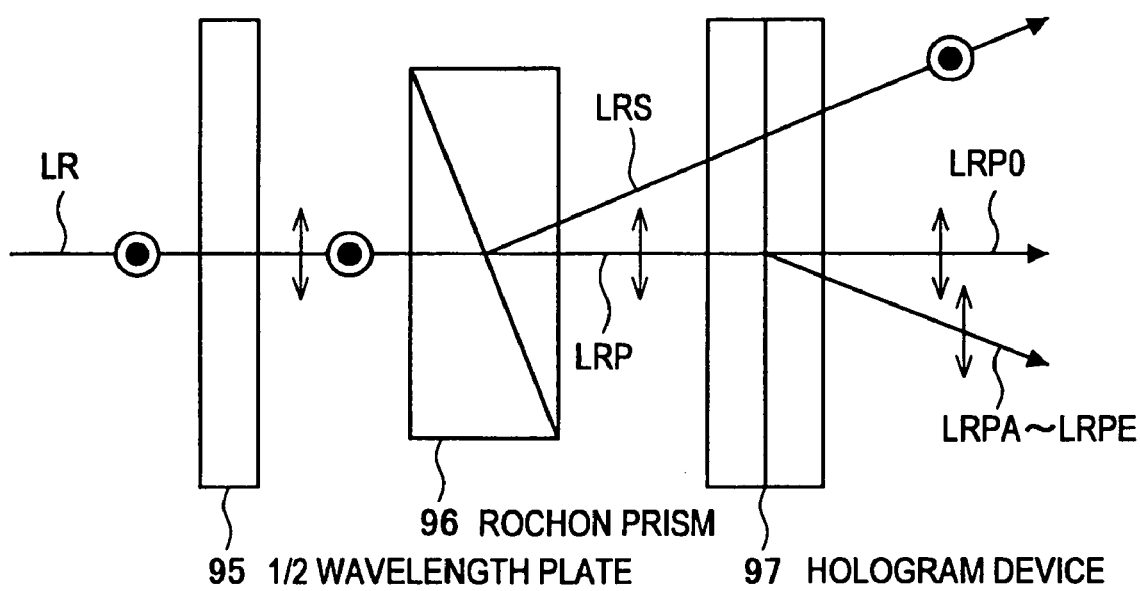
FIG. 28 is an approximate diagram serving to illustrate arrangement of optical elements in the fifth embodiment.

Actually, as shown in FIG. 28, the Rochon prism 96 refracts the S polarization component of the reflected light beam LR to create the reflected light beam LRS and also causes the P polarization component to transmit unchanged before causing the P polarization component to enter the hologram device 97 as the reflected light beam LRS.

The hologram device 97 is configured almost in the same manner as the polarization hologram 87B of the complex hologram device 87 and exhibits the action of diffraction on a light beam of P polarization component and can separate the P polarization component into zero-order light and primary light while allowing a light beam of S polarization component to transmit unchanged.

The hologram device 97 is divided, like the polarization hologram 87B, into a plurality of regions and divides the reflected light beam LRP into the reflected light beams LRPA to LRPE by the action of diffraction thereon being exhibited in each region.

At this point, each of the reflected light beams LRPA and LRPB is diffracted in the longitudinal direction, each of the reflected light beams LRPC and LRPD is diffracted in the transverse direction, and further the reflected light beam LRPE is diffracted in a slanting direction (in a lower left direction in FIG. 25).

Further, the hologram device 97 causes zero-order light of the reflected light beam LRP that was not diffracted to travel in a straight line unchanged.

Thus, in the fifth embodiment, instead of the complex hologram device 87 in the fourth embodiment, the ½ wavelength plate 95, the Rochon prism 96, and the hologram device 97 are used to separate the reflected light beam LR into a plurality of reflected light beams LRS, LRPA to LRPE, and LRP0.

Like in the fourth embodiment, the photo-detector receives the reflected light beams LRPA and LRPB by the receiving regions D2A and D2B of the receiving unit D2 respectively and the reflected light beams LRPC and LRPD by the receiving regions D13C and D13D of the receiving unit D13 respectively. The photo-detector 89 also receives the reflected light beam LRPE by the receiving regions D4A to D4D of the receiving unit D4.

Further, the photo-detector 89 receives the reflected light beam LRP0 by the receiving regions D1A to D1D of the receiving unit D1 and, instead of the reflected light beam LRS1 in the fourth embodiment, the reflected light beam LRS by the receiving unit D12.

At this point, like in the fourth embodiment, none of the stray light patterns W23P0, W23AS1, and W23PA to W23PE is overlapped, as shown in FIG. 26, with the receiving units D2 and D13 in the photo-detector 89.

Thus, in the photo-detector 89, like in the fourth embodiment, an error is hardly caused by the interlayer stray light beam LN in the received light signals S2A, S2B, S3C, and S3D generated by the receiving regions D2A, D2B, D13C, and D13D respectively.

Like the optical disk apparatus 90 in the fourth embodiment, the optical disk apparatus 90 can calculate a wobble signal by the wobble signal operation circuit 54W and exercise focus control and tracking control by the servo control unit 53A.

Further, like in the fourth embodiment, the optical disk apparatus 90 can reproduce information recorded on the optical disk 100 by generating the reproducing RF signal SRF according to Formula (8) by the signal processing unit 74 and performing predetermined demodulation processing and decoding processing.

[5-3. Operation and Effect]

[5-3-1. Operation]

In the above configuration, the optical pickup 91 of the optical disk apparatus 90 irradiates the optical disk 100 with the light beam L1. Then, the optical pickup 91 separates the reflected light beam LR reflected by the optical disk 100 and consisting of S polarization by the ½ wavelength plate 95, the Rochon prism 96, and the hologram device 97.

The ½ wavelength plate 95 changes the ratio of the S polarization component and P polarization component in the reflected light beam LR. Subsequently, the Rochon prism refracts the S polarization component to create the reflected light beam LRS and causes the reflected light beam LRS to travel in a slanting direction while allowing the P polarization component to transmit to create the reflected light beam LRP.

The hologram device 97 causes the reflected light beam LRP consisting of P polarization to diffract in each region to separate into the reflected light beams LRP0 and LRPA to LRPE while allowing the reflected light beam LRS consisting of S polarization to transmit.

Correspondingly, the photo-detector 89 receives the reflected light beam LRP0 by the receiving regions D1A to D1D of the receiving unit D1 to generate the received light signals S1A to S1D. The photo-detector 89 also receives the reflected light beams LRPA and LRPB by the receiving regions D2A and D2B of the receiving unit D2 respectively to generate the received light signals S2A and S2B. Further, the photo-detector 89 receives the reflected light beams LRPC and LRPD by the receiving regions D13C and D13D of the receiving unit D13 respectively to generate the received light signals S3C and S3D.

Like in the third embodiment, the signal processing unit 74 calculates the focus error signal SFE1 by the focus error signal operation circuit 54F according to Formula (1A) or (1B) based on each received light signal amplified by the head amplifier 72. The signal processing unit 74 also calculates the tracking error signal STE1 by the tracking error signal operation circuit 54T according to Formula (2) based on each received light signal amplified by the head amplifier 72. Then, the signal processing unit 74 supplies these signals to the servo control unit 53A.

The servo control unit 53A exercises tracking control by generating the tracking drive signal STD1 by the tracking control unit 53AT based on the tracking error signal STE1 and supplying the tracking drive signal STD1 to the tracking actuator 9T.

Further, the signal processing unit 74 calculates or extracts the wobble signal SWBL1 according to Formula (5) by the wobble signal operation circuit 54W based on each received light signal amplified by the head amplifier 72. Then, the signal processing unit 74 generates preformatted information such as address information and time information from the wobble signal SWBL1 and outputs the preformatted information to the centralized control unit 52. The centralized control unit 52 can control a recording or reproduction operation based on the address information, time information or the like.

[5-3-2. Effect]

Therefore, the optical disk apparatus 90 can receive each of the reflected light beams LRPA, LRPB, LRPC, and LRPD by the receiving unit D2 or D13 of the photo-detector 89. Then, the optical disk apparatus 90 can exercise tracking control based on the tracking error signal STE1 generated by using the received light signals S2A, S2B, S3C, and S3D, which are received light results thereof.

The optical pickup 91 of the optical disk apparatus 90 can change the traveling direction of the reflected light beam LRS by the action of refraction of the Rochon prism 96. Thus, like the optical disk apparatus 70 in the fourth embodiment, there is no need for the optical disk apparatus 90 to consider restrictions such as making the lattice pitch of the hologram in the polarization hologram 87C to increase the angle of diffraction.

In addition, the optical disk apparatus 90 can achieve operation effects similar to those of the optical disk apparatus 70 in the fourth embodiment.

According to the above configuration, the optical pickup 91 of the optical disk apparatus 90 refracts the reflected light beam LRS is a slanting direction by refracting the reflected light beam LR by the Rochon prism 96. Then, the optical pickup 91 further causes the reflected light beam LRP0 to travel in an almost straight line by the hologram device 97 and detects the reflected light beam LRP0 by the receiving unit D1 of the photo-detector 89 to generate the received light signals S1A to S1D.

The optical pickup 91 also causes the reflected light beams LRPA and LRPB to diffract in the longitudinal direction by the hologram device 97 and receives the reflected light beams LRPA and LRPB by the receiving regions D2A and D2B of the receiving unit D2 to generate the received light signals S2A and S2B respectively.

Further, the optical pickup 91 causes the reflected light beams LRPC and LRPD to diffract in the transverse direction and receives the reflected light beams LRPC and LRPD by the receiving regions D13C and D13D of the receiving unit D13 to generate the received light signals S3C and S3D respectively.

Accordingly, the optical pickup 91 can generate the wobble signal SWBL1 that excludes an influence of the stray light pattern W formed by each of the interlayer stray light beams LN from the plurality of recording layers Y. Thus, the optical disk apparatus 90 can correctly extract preformatted information such as address information and time information with stability.

Further, the optical disk apparatus 90 can generate the tracking error signal STE1 that excludes an influence of the stray light pattern W formed by each of the interlayer stray light beams LN from the plurality of recording layers Y so that tracking control can be exercised with precision.

6. Sixth Embodiment

[6-1. Configuration of Optical Disk Apparatus]

The sixth embodiment is different from each of the above embodiments in that an optical disk apparatus 110 is formed to be able to handle a plurality of types of different modes of the optical disk 100. Here, as an example of the plurality of types of the optical disk 100, the optical disk 100 of the BD mode (hereinafter, this is called an optical disk apparatus 100B), the optical disk 100 of the DVD mode (hereinafter, this is called an optical disk apparatus 100D), and the optical disk 100 of the CD mode (hereinafter, this is called an optical disk apparatus 100C) are assumed for the description that follows.

Figure 29:
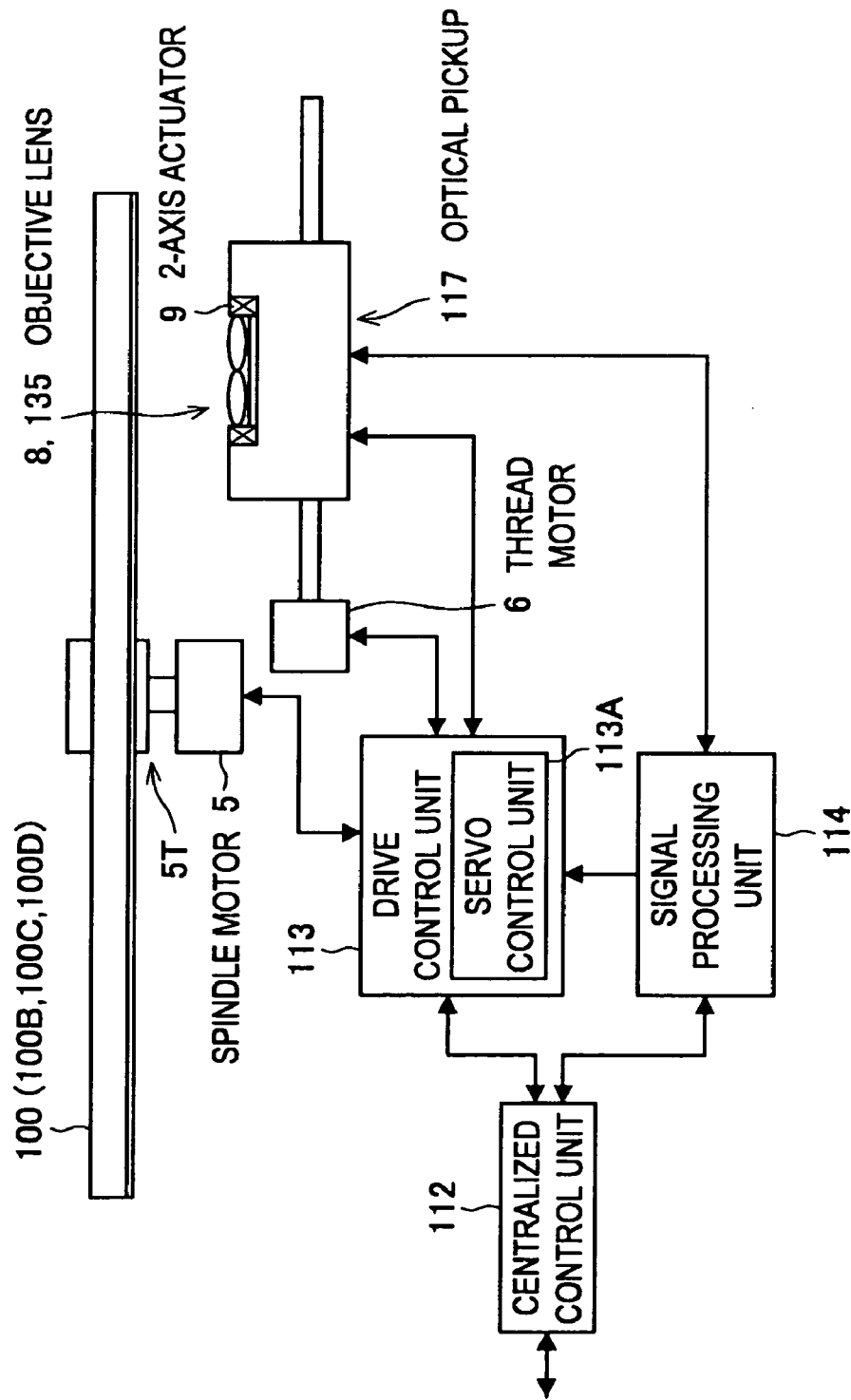
FIG. 29 is an approximate diagram showing a configuration of an optical disk apparatus according to a sixth embodiment.

As shown in FIG. 29 in which the same reference numerals are attached to corresponding components as those in FIG. 1, the optical disk apparatus 110 includes, instead of the centralized control unit 2, the drive control unit 3, the signal processing unit 4, and the optical pickup 7, a centralized control unit 112, a drive control unit 113, a signal processing unit 114, and an optical pickup 117.

The centralized control unit 112 is configured, like the centralized control unit 2, by a CPU (not shown), ROM (not shown) in which various programs are stored, and RAM (not shown) used as a work memory of the CPU and exercises centralized control of the whole optical disk apparatus 110.

More specifically, in addition to each function of the centralized control unit 2, the centralized control unit 112 determines the type of the optical disk 100 and supplies switching instructions in accordance with the type of the optical disk 100 to the drive control unit 113, the signal processing unit 114, and the optical pickup 117.

The optical pickup 117 can irradiate the optical disk 100 with a suitable light beam in accordance with the type of the optical disk 100 and receive a reflected light beam after the light beam being reflected by the optical disk 100 (details will be described later).

The signal processing unit 114 generates, like the signal processing unit 4, each of a wobble signal, focus error signal, tracking error signal and the like by performing predetermined operation processing using a supplied received light signal. Then, the signal processing unit 114 generates preformatted information such as address information from the wobble signal to supply the preformatted information to the centralized control unit 112 and also supplies the focus error signal and tracking error signal to the drive control unit 113.

The centralized control unit 112 acquires preformatted information from the signal processing unit 114 and controls the recording start position, recording/reproduction timing and the like based on the preformatted information. A servo control unit 113A of the drive control unit 113 exercises, like the servo control unit 3A in the first embodiment, focus control and tracking control of the objective lens 8 or an objective lens 135 (details will be described later).

Thus, the optical disk apparatus 110 can perform reproduction processing or recording processing of information while irradiating the optical disk 100 with a light beam from the optical pickup 117 and performing focus control or tracking control based on a reflected light beam thereof.

[6-2. Configuration of Optical Pickup]

Figure 30:
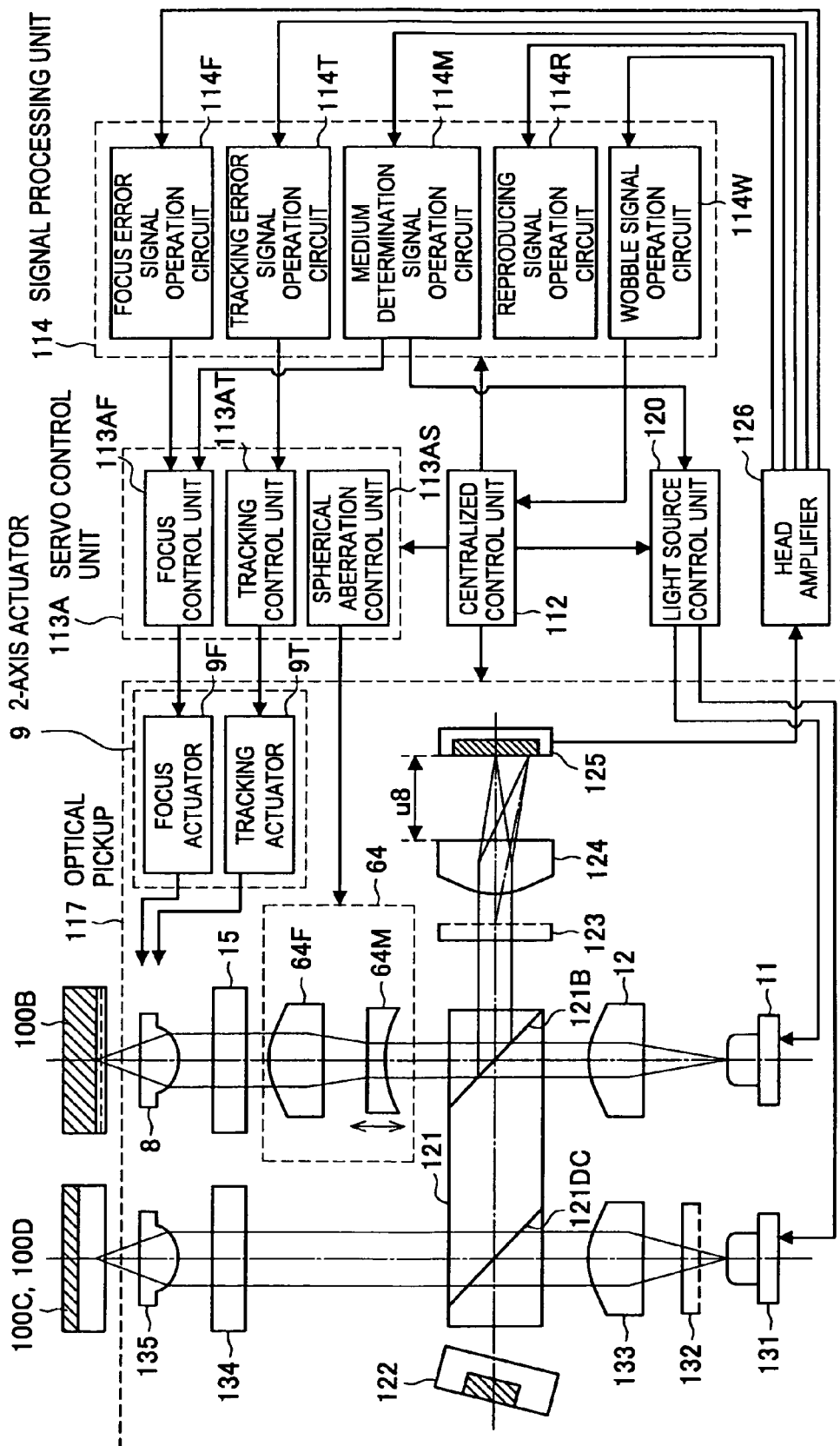
FIG. 30 is an approximate diagram showing the configuration of an optical pickup according to the sixth embodiment.

As show FIG. 30 in which the same reference numerals are attached to corresponding components as those in FIG. 2, the optical pickup 117 irradiates the optical disk apparatus 100B, the optical disk apparatus 100D, or the optical disk apparatus 100C with a light beam of the wavelength suitable thereto and also receives a respective reflected light beam. As an example of the wavelengths, the wavelength is about 405 [nm] for the optical disk apparatus 100B, about 660 [nm] for the optical disk apparatus 100D, and about 780 [nm] for the optical disk apparatus 100C.

Incidentally, the optical disk apparatus 110 can determines whether the optical disk 100 is the optical disk 100B of the BD mode, the optical disk 100D of the DVD mode, or the optical disk 100C of the CD mode by performing predetermined medium determination processing.

[6-2-1. Irradiation of the Optical Disk 100B of BD Mode with Light Beam and Light Reception]

If the optical disk 100 is the optical disk 100B of the BD mode, the centralized control unit 112 of the optical disk apparatus 110 is constructed to cause the optical pickup 117 to irradiate the optical disk 100B with a light beam of the wavelength suitable to the optical disk 100B.

More specifically, the laser diode 11 of the optical pickup 117 can emit, like in the first embodiment, a light beam LB consisting of violet laser light whose wavelength is about 405 [nm] as a diverging ray under the control of a light source control unit 120. The laser diode 11 is adjusted in its mounting angle so that the light beam LB becomes P polarization.

Actually, the centralized control unit 112 causes the laser diode 11 to emit the light beam LB by controlling the light source control unit 120 before causing the light beam LB to enter the collimator lens 12. The collimator lens converts the light beam LB from a diverging ray into a parallel light before causing the light beam LB to enter a polarizing prism 121.

The polarizing prism 121 is constructed to transmit a light beam of P polarization in the ratio of about 90% by a reflection/transmission surface 121B whose transmissivity changes depending on the polarization direction and to reflect the rest and also to reflect a light beam of S polarization in the ratio of almost 100%.

The reflection/transmission surface 121B is constructed to act on the light beam LB whose wavelength is about 405 [nm] and to allow a light beam whose wavelength is about 660 [nm] or 780 [nm] to transmit.

Actually, the polarizing prism 121 causes the light beam LB to transmit in the ratio of about 90% by the reflection/transmission surface 121B before causing the light beam LB to enter the spherical aberration correction unit 64 and also causes the rest of about 10% to reflect to create a front monitor light beam LBM before causing the front monitor light beam LBM to enter a front monitor photo-detector 122.

The front monitor photo-detector 122 receives the front monitor light beam LBM to generate a front monitor received light signal SFM in accordance with the amount of light thereof and supplies the front monitor received light signal SFM to the light source control unit 120. Correspondingly, the light source control unit 120 exercises feedback control based on the front monitor received light signal SFM so that the amount of the light beam LB emitted from the laser diode 11 becomes a desired value.

On the other hand, the spherical aberration correction unit 64 provides, like in the third embodiment, a spherical aberration having characteristics inverse to those of a spherical aberration generated when the light beam LB is condensed and reaches the target recording layer YT of the optical disk 100B to the light beam LB in advance.

The ¼ wave plate 15 converts, like in the first embodiment, the light beam LB consisting of, for example, P polarization into left circular polarization before causing the left circular polarization to enter the objective lens 8.

The objective lens 8 condenses, like in the first embodiment, the light beam LB. Here, the centralized control unit 112 makes adjustments of position in the focus direction of the objective lens 8 by the focus actuator 9F via a focus control unit 113AF. Thus, the objective lens 8 roughly aligns a focus FB of the light beam LB with the target recording layer YT of the optical disk 100B for irradiation.

At this point, the light beam LB becomes a reflected light beam LBR by being reflected by the target recording layer YT before being caused to enter the objective lens 8. The reflected light beam LBR becomes right circular polarization because the rotation direction in circular polarization is inverted when reflected.

Then, the reflected light beam LBR is converted, like the reflected light beam LR in the first embodiment, from a diverging ray into a parallel light by the objective lens 8 and from right circular polarization into S polarization (linear polarization) by the ¼ wave plate 15 before being further caused to enter the spherical aberration correction unit 64.

The spherical aberration correction unit 64 corrects a spherical aberration generated before the reflected light beam LBR passes through the objective lens 8 after being reflected by the target recording layer YT and causes the reflected light beam LBR to enter the polarizing prism 121.

The polarizing prism 121 reflects the reflected light beam LBR consisting of S polarization by the reflection/transmission surface 121B before causing the reflected light beam LBR to enter a hologram device 123.

The hologram device 123 separates the reflected light beam LBR of the wavelength of about 405 [nm] into at least zero-order light and primary light due to properties as a diffractive element before causing both to enter an anamorphic lens 124.

Figure 31A:
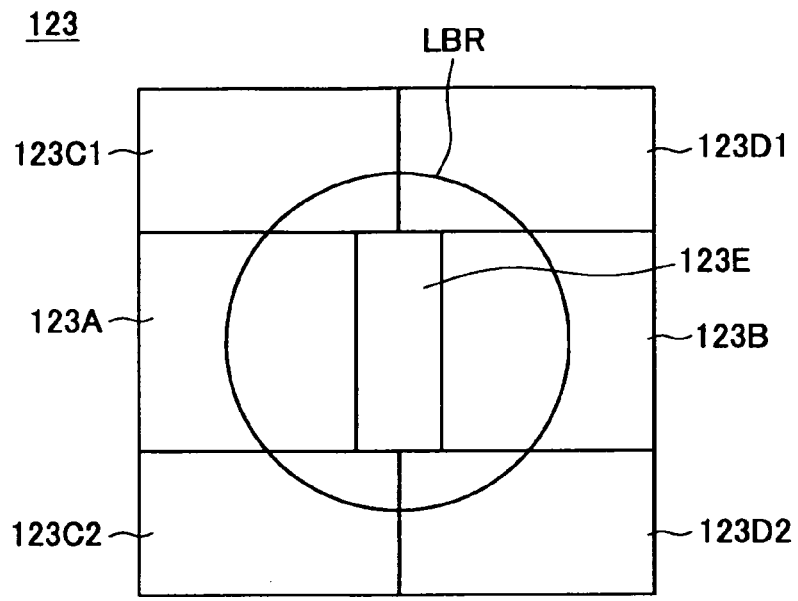
FIG. 31 is an approximate diagram showing the configuration of a hologram device according to the sixth embodiment.
Figure 31B:
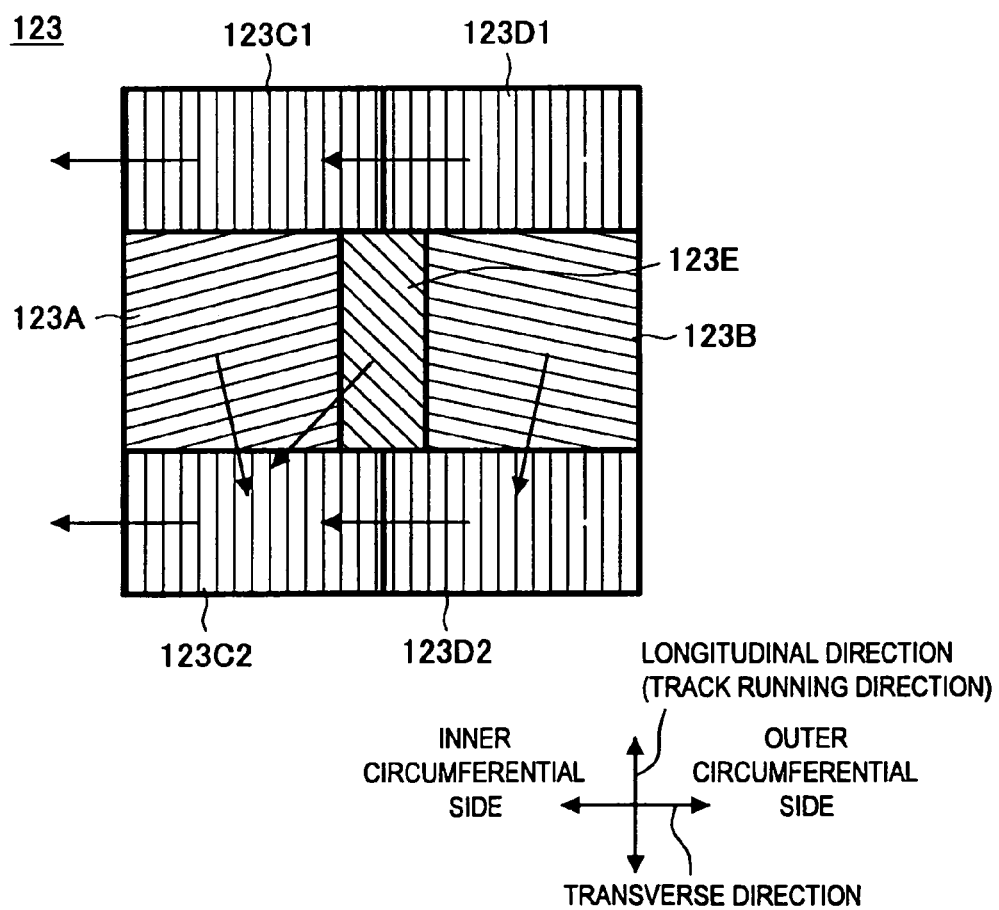

As shown in FIG. 31 corresponding to FIG. 4, the hologram device 123 is divided into a plurality of regions 123A to 123E. Then, the hologram device 123 causes the reflected light beam LBR to diffract by the angle of diffraction similar to that of the regions 17A to 17E of the hologram device 17 by each region before causing the reflected light beam LBR to travel in a direction different from that of a reflected light beam LBR0 consisting of zero-order light.

That is, the hologram device 123 causes reflected light beams LBR1A and LBR1B to diffract in the longitudinal direction by the regions 123A and 123B respectively. The hologram device 123 also causes reflected light beams LBR1C1, LBR1C2, LBR1D1, and LBR1D2 to diffract in the transverse direction by regions 123C1, 123C2, 123D1, and 123D2 respectively. Further, the hologram device 123 causes a reflected light beam LBR1E in a slanting direction by the region 123E.

The anamorphic lens 124 has functions of the condenser lens 16 and the cylindrical lens 18 in the first embodiment and provides astigmatism to the reflected light beam LBR0 consisting of zero-order light before a photo-detector 125 being irradiated with the reflected light beam LBR0.

Incidentally, the anamorphic lens 124 also provides astigmatism to the reflected light beams LBR1A to LBR1E consisting of primary light. However, an aberration that cancels out the astigmatism when diffracted by the hologram device 123 is given to the reflected light beams LBR1A to LBR1E consisting of primary light in advance.

That is, the reflected light beams LBR1A to LBR1E consisting of primary light have no astigmatism when emitted from the cylindrical lens 18.

The optical pickup 117 is designed in such a way that an interval u8 between the photo-detector 125 and the anamorphic lens 124 becomes larger than an interval u7 calculated by Formula (9) below.

[Math 13]

$$u7 = u1 \times M^2 \quad (9)$$

In Formula (9), an interval u1 denotes the maximum value of interval between the recording layers Y in the optical disk 100B, for example, the interval between the recording layers Y0 and Y3 in FIG. 3 and a lateral magnification M denotes a lateral magnification of an optical system on an optical path from the optical disk 100B to the photo-detector 125.

That is, in the optical pickup 117, no other optics is arranged within a range of the interval u7 from the photo-detector 125 on an optical path of the reflected light beam LBR or the like.

Figure 32:
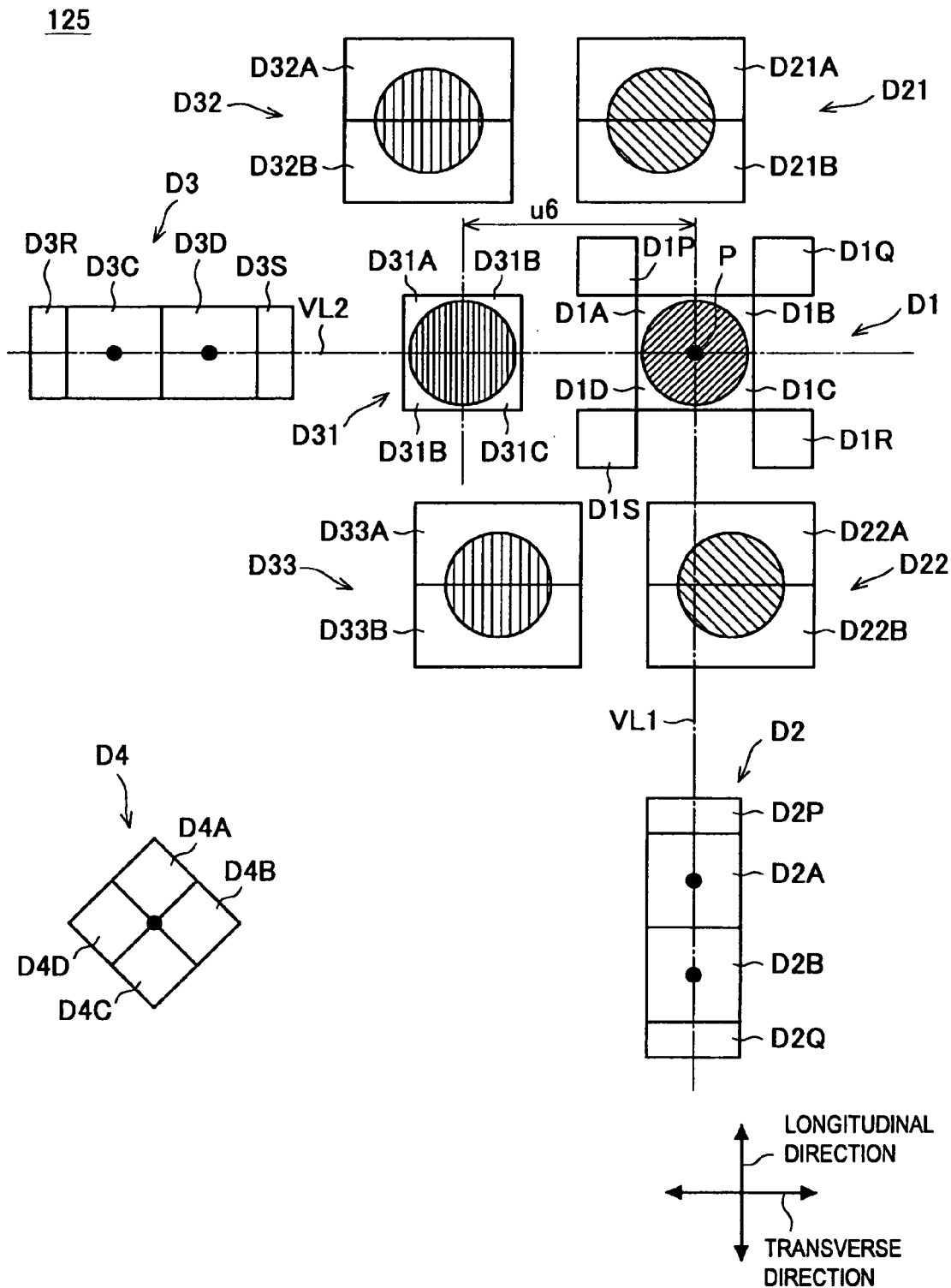
FIG. 32 is an approximate diagram showing the configuration of a photo-detector according to the sixth embodiment.

As shown in FIG. 32, the photo-detector 125 has a configuration partially similar to that of the photo-detector (FIG. 5) in the first embodiment and has the receiving units D1 to D4 similar to those of the photo-detector 19 formed therein.

That is, the photo-detector 125 receives each of the reflected light beams LBR0, LBR1A, LBR1B, LBR1C, LBR1D, and LBR1E by the receiving units D1 to D4 and generates each received light signal in accordance with received light results thereof to supply the received light signal to a head amplifier 126 (FIG. 30).

Further, the photo-detector 125 has receiving units D21 and D22 as if to sandwich the receiving unit D1 in the longitudinal direction added thereto and receiving units D31, D32, and D33 at locations separated from the receiving units D1, D21, and D22 respectively by a predetermined distance in the transverse direction provided therein.

The receiving unit D21 has receiving regions D21A and D21B divided into two in the longitudinal direction. The receiving regions D21A and D21B generates received light signals S21A and S21B in accordance with the amount of received light respectively and send these signals to the head amplifier 126.

The receiving unit D22 has, like the receiving unit D21, receiving regions D22A and D22B divided into two in the longitudinal direction. The receiving regions D22A and D22B generates received light signals S22A and S22B in accordance with the amount of received light respectively and send these signals to the head amplifier 126.

In this case, the optical disk apparatus 110 calculates, like the optical disk apparatus 1, the wobble signal SWBL1, focus error signal SFE1, and tracking error signal STE1 by the signal processing unit 114. Then, each of these signals is supplied to the corresponding centralized control unit 112, the servo control unit 113A or the like. The signal processing unit 114 also calculates the reproducing RF signal SRF and the like in the same manner.

Like the centralized control unit 12 of the optical disk apparatus 1, the centralized control unit 112 acquires preformatted information extracted from the wobble signal SWBL1 by the signal processing unit 114 and controls the recording start position, recording/reproduction timing and the like based on the preformatted information. The servo control unit 113A exercises, like the servo control unit 3A of the optical disk apparatus 1, focus control based on the focus error signal SFE1 or tracking control based on the tracking error signal STE1.

[Switching of Wobble Signal]

In the optical disk apparatus 110 according to the sixth embodiment, the wobble signal SWBL1 calculated according to the above Formula (5) and a wobble signal SWBL2 calculated according to Formula (10) below can be switched. The operation of the wobble signal according to Formula (10) corresponds to the wobble signal operation expression according to related technology shown in the above (5M).

[Math 14]

$$SWBL2 = (S1A + S1B) - (S1C + S1D) \quad (10)$$

Figure 33:
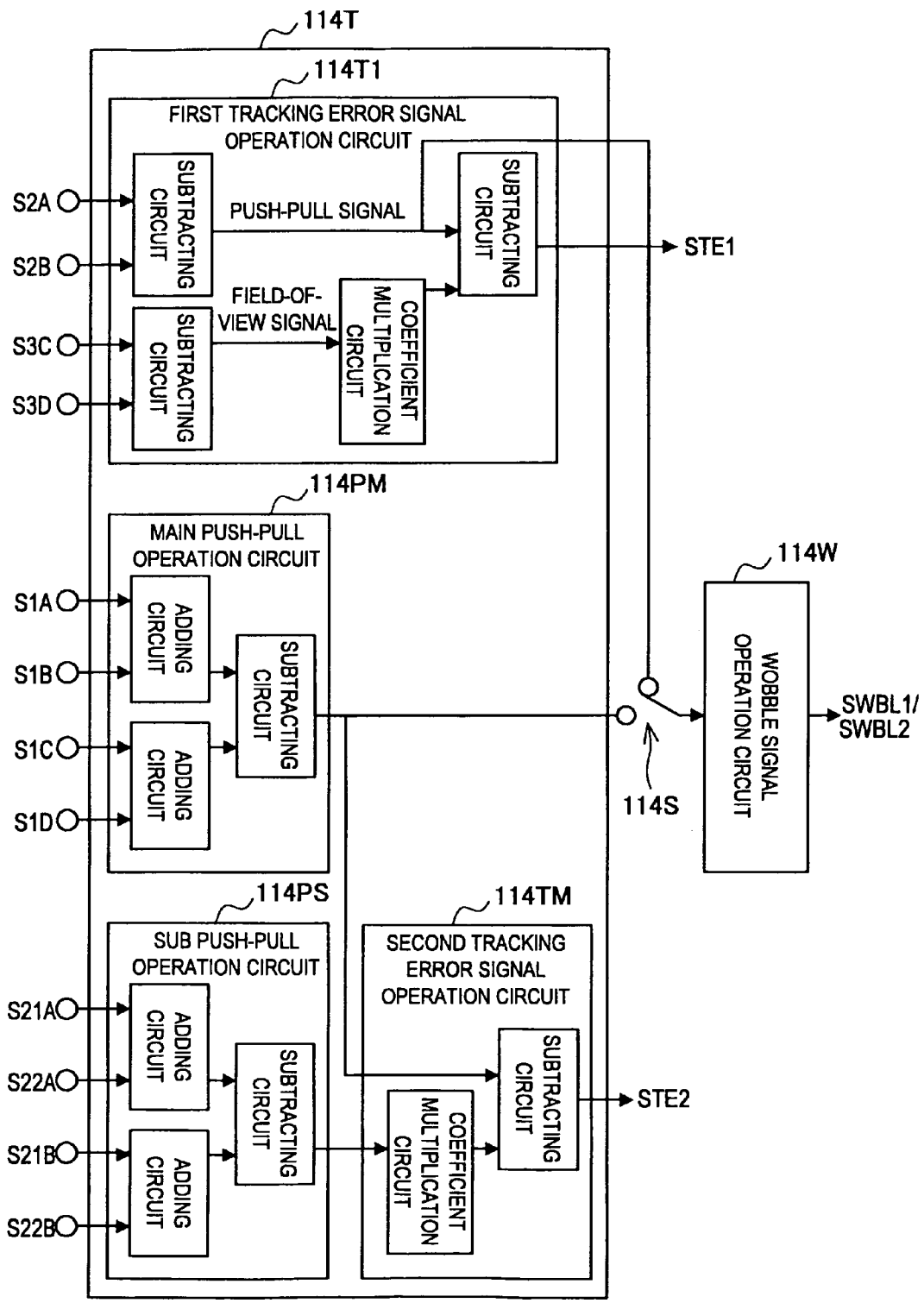
FIG. 33 is an approximate diagram showing a configuration example of the tracking error signal operation circuit and the wobble signal operation circuit according to the first embodiment.

For this switching, the signal processing unit 114 preferably has a switching circuit 114S as shown in FIG. 33. Here, switching of wobble signals will be described in detail with reference to FIG. 33.

FIG. 33 shows an example of the configuration of a tracking error signal operation circuit 114T, a wobble signal operation circuit 114W, and a switching circuit 114S of the signal processing unit 114 held by the optical disk apparatus 110.

As shown in FIG. 33, the tracking error signal operation circuit 114T has a first tracking error signal operation circuit 114T1 corresponding to the tracking error signal operation circuit 4T in the first embodiment shown in FIG. 9B. The tracking error signal operation circuit 114T further has a second tracking error signal operation circuit 114™, a main push-pull operation circuit 114PM, and a sub-push-pull operation circuit 114PS corresponding to the tracking error signal operation circuit 4T-M, the main push-pull operation circuit 4P-M, and the sub push-pull operation circuit 4P-S of related technology shown in FIG. 10B respectively.

The switching circuit 114S can switch the push-pull signal tapped by the wobble signal operation circuit 114W between a signal by the first tracking error signal operation circuit 114T1 and that by the main push-pull operation circuit 114PM. Therefore, the wobble signal operation circuit 114W selectively generates the wobble signal SWBL1 operated according to the above Formula (5) or the wobble signal SWBL2 operated according to the above Formula (10) corresponding to Formula (5M) of related technology.

The switching circuit 114S is controlled by the centralized control unit 112.

The centralized control unit 112 may control the switching circuit 114S so that the wobble signal SWBL2 is output when the optical disk 100B is a single-layer optical disk and the wobble signal SWBL1 is output when the optical disk 100B is a multi-layer optical disk.

When the optical disk 100B is a single-layer optical disk, the disk is hardly affected by stray light and signal intensity of the received light signals S1A to S1D by a non-diffracted reflected light beam is higher than that of the received light signals S2A and S2B of a reflected light beam diffracted by the hologram device 123. Therefore, in this case, the wobble signal SWBL2 with high signal intensity can be used for a single-layer optical disk so that preformatted information can be generated more reliably. For a multi-layer optical disk, on the other hand, preformatted information can be generated more reliably by using the wobble signal SWBL1 to reduce an influence of stray light.

However, as described in [1-5. Type Determination of Optical Disk], the centralized control unit 112 automatically determines the type of optical disk and so that the switching circuit 114S can also be controlled automatically.

The control of the switching circuit 114S by the centralized control unit 112 is not limited to this example and may be changed when appropriate in consideration of, for example, the type of the optical disk 100 (for example, the optical disk 100C or 100D) or properties of the optical disk apparatus 110. For example, the wobble signal used may be restricted depending on properties or design of the optical disk apparatus 110 or the wobble signal may be desired to be selected in view of convenience. According to the optical pickup 117 in the sixth embodiment, even in such cases, the wobble signal can be switched in consideration of user's convenience or properties or design of the optical disk apparatus 110.

According to the configuration of switching of the wobble signal shown in FIG. 33, not only the tracking error signal STE1 according to Formula (1A) in the first embodiment described above, but also a tracking error signal STE2 operated by Formula (11) below corresponding to the above Formula (2M) of related technology can be generated.

[Math 15]

$$STE2 = (S1A + S1B) - (S1C + S1D) - kt \times \{(S21A + S22A) - (S21B + S22B)\} \quad (11)$$

Therefore, the signal processing unit 114 can switch not only the wobble signal, but also the tracking error signal between a signal according to the first embodiment and that according to related technology. In this case, however, the diffractive optical element (not shown) described in connection with related technology will be arranged downstream from the laser diode 11.

[6-2-2. Irradiation of the Optical Disk 100C of CD Mode with Light Beam and Light Reception]

If the optical disk 100 is the optical disk 100C of the CD mode, the centralized control unit 112 of the optical disk apparatus 110 is constructed to cause the optical pickup 117 to irradiate the optical disk 100C with a light beam of the wavelength suitable to the optical disk 100C.

Incidentally, the optical disk 100C has, in view of the standard thereof, only one layer as the recording layer Y. For convenience' sake, the recording layer Y will be called the target recording layer YT in the description that follows.

Figure 34:
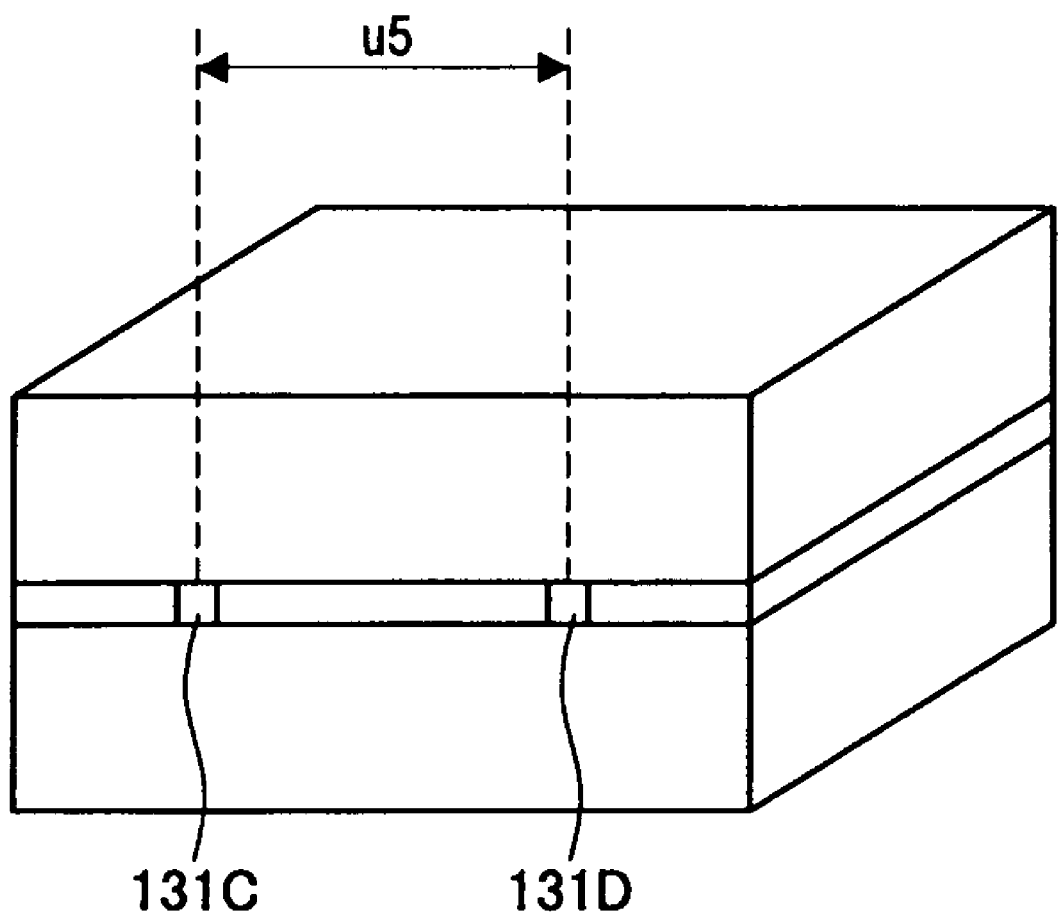
FIG. 34 is an approximate perspective view showing the configuration of a two-wavelength laser diode.

A laser diode 131 of the optical pickup 117 has, as shown in FIG. 34, a laser chip 131C emitting a light beam of the wavelength of about 780 [nm] and a laser chip 131D emitting a light beam of the wavelength of about 660 [nm] provided with a predetermined interval u5 therebetween. Moreover, the mounting angle of the laser diode 131 is adjusted so that a light beam LC becomes P polarization.

Actually, the centralized control unit 112 causes the laser chip 131C of the laser diode 131 to emit the light beam LC consisting of infrared laser light of the wavelength of about 780 [nm] as a diverging ray by controlling the light source control unit 120 before causing the light beam LC to enter a grating 132.

The grating 132 (an example of the diffractive optical element) separates the light beam LC into a light beam LCA consisting of zero-order light, a light beam LCB consisting of + primary light beam, and a light beam LCC consisting of − primary light beam by causing the light beam LC to diffract before causing these light beams to enter a collimator lens 133.

The light beams LCB and LCC travel almost in parallel with the light beam LCA while optical axes thereof are slightly apart from the optical axis of the light beam LCA before being, like the light beam LCA, converged, diverged, reflected or the like. Thus, the description below is focused on the light beam LCA and a portion of the description of the light beams LCB and LCC is omitted.

The collimator lens 133 converts the light beam LCA from a diverging ray into a parallel light before causing the light beam LCA to enter the polarizing prism 121.

The polarizing prism 121 transmits a light beam of P polarization in the ratio of about 90% by a reflection/transmission surface 121DC whose transmissivity changes depending on the polarization direction to reflect the rest and also reflects a light beam of S polarization in the ratio of almost 100%. The reflection/transmission surface 121DC acts on a light beam whose wavelength is about 660 [nm] or 780 [nm] and allows a light beam whose wavelength is about 405 [nm] to transmit.

Actually, the polarizing prism 121 causes the light beam LCA to transmit in the ratio of about 90% by the reflection/transmission surface 121DC before causing the light beam LCA to enter a ¼ wavelength plate 134 and also causes the rest of about 10% to transmit to create a front monitor light beam LCM before causing the front monitor light beam LCM to enter the front monitor photo-detector 122.

The front monitor photo-detector 122 receives, like the case of the front monitor light beam LBM, the front monitor light beam LCM to generate the front monitor received light signal SFM in accordance with the amount of light thereof and supplies the front monitor received light signal SFM to the light source control unit 120. Correspondingly, the light source control unit 120 exercises feedback control based on the front monitor received light signal SFM so that the amount of the light beam LC emitted from the laser diode 131 becomes a desired amount of light.

The ¼ wavelength plate 134 is constructed, like the ¼ wave plate 15, to be able to interconvert a light beam between linear polarization and circular polarization and converts, for example, the light beam LCA consisting of the P polarization into left circular polarization before causing the left circular polarization to enter the objective lens 135.

The objective lens 135 condenses the light beam LCA. Here, the centralized control unit 112 makes adjustments of position in the focus direction of the objective lens 135 by the focus actuator 9F via the focus control unit 113AF. Thus, the objective lens 135 roughly aligns a focus FCA of the light beam LCA with the target recording layer YT of the optical disk 100C for irradiation.

At this point, the light beam LCA becomes a reflected light beam LCAR by being reflected by the target recording layer YT before being caused to enter the objective lens 135. The reflected light beam LCAR becomes right circular polarization because the rotation direction in circular polarization is inverted when reflected.

Incidentally, the light beams LCB and LCC are each condensed by the objective lens 135 and focuses FCB and FCC thereof are formed at positions shifted by half a track from the focus FCA in the tracking direction.

That is, the light beam LCA is shone as a so-called main beam in such a way that the focus FCA thereof is aligned with a desired track. The light beams LCB and LCC are shone as so-called side beams in such a way that the respective focuses FCB and FCC are apart from desired tracks by half a track.

At this point, the light beams LCB and LCC are reflected to become light beams LCBR and LCCR respectively. The reflected light beams LCBR and LCCR travel almost in parallel with the reflected light beam LCAR while optical axes thereof are slightly apart from the optical axis of the reflected light beam LCAR. Like the light beams LCB and LCC, a portion of the description of the reflected light beams LCBR and LCCR is also omitted.

Then, like the reflected light beam LBR, the reflected light beam LCAR is converted from a diverging ray into a parallel light by the objective lens 135 and from right circular polarization into S polarization (linear polarization) by the ¼ wavelength plate 134 before being further caused to enter the polarizing prism 121.

The polarizing prism 121 reflects the reflected light beam LCAR consisting of S polarization by the reflection/transmission surface 121DC to cause the reflected light beam LCAR to pass through the reflection/transmission surface 121B before causing the reflected light beam LCAR to enter the hologram device 123.

The hologram device 123 separates the reflected light beam LCAR consisting of the wavelength of about 780 [nm] into at least zero-order light and primary light before causing both to enter the anamorphic lens 124.

Components other than the zero-order light of the reflected light beam LCAR diffracted by the hologram device 123 will not be shone on the receiving units D2, D21, and D22 involved in signal detection of the CD mode in the end and thus, the description thereof is omitted below. Similarly, the description of components other than the zero-order light of the reflected light beams LCBR and LCCR diffracted by the hologram device 123 is omitted.

The anamorphic lens 124 condenses the reflected light beam LCAR as a main reflected light beam and also provides astigmatism before irradiating the photo-detector 125 with the reflected light beam LCAR. At this point, the each of the reflected light beams LCBR and LCCR is also condensed as sub-reflected light beams.

The photo-detector 125 receives the reflected light beam LCAR by the receiving regions D1A to D1D of the receiving unit D1 and generates received light signals S1A to S1D in accordance with received light results thereof respectively to supply the received light signals to the head amplifier 126.

The photo-detector 125 also receives the reflected light beam LCBR by the receiving unit D21 and generates the received light signals S21A and S21B in accordance with received light results thereof to supply the received light signals to the head amplifier 126.

Similarly, the photo-detector 125 also receives the reflected light beam LCCR by the receiving unit D22 and generates the received light signals S22A and S22B in accordance with received light results thereof to supply the received light signals to the head amplifier 126.

The head amplifier 126 amplifies, like the head amplifier 22, each received light signal and supplies the received light signal to the signal processing unit 114.

The tracking error signal operation circuit 114T of the signal processing unit 114 calculates the tracking error signal STE2 according to the DPP (Differential Push Pull) method by performing operations according to Formula (12) below using a predetermined coefficient 8.

[Math 16]

$$STE2 = (S1A + S1B) - (S1C - S1D) - \delta \times \{(S21A - S21B) + (S22A - S22B)\} \quad (12)$$

The signal processing unit 114 supplies the tracking error signal STE2 to a tracking control unit 113AT of the servo control unit 113A.

The tracking control unit 113AT of the servo control unit 113A generates a tracking drive signal STD2 based on the tracking error signal STE2 and supplies the tracking drive signal STD2 to the tracking actuator 9T. The tracking actuator 9T drives the objective lens 135 in the tracking direction based on the tracking drive signal STD2. In this manner, the servo control unit 113A exercises tracking control by the DPP method.

The servo control unit 113A calculates, like the servo control unit 3A of the optical disk apparatus 1, the focus error signal SFE1 according to the astigmatic method to exercise focus control based thereon.

Further, a reproducing signal operation circuit 114R of the signal processing unit 114 calculates, like in the first embodiment, the reproducing RF signal SRF by adding the received light signals S1A to S1D according to the above Formula (4).

The wobble signal operation circuit 114W of the signal processing unit 114 generates the wobble signal SWBL2 by performing operations according to the above Formula (10) or tapping an operation result thereof. Then, the wobble signal operation circuit 114W generates preformatted information such as address information from the wobble signal SWBL2 and supplies the preformatted information to the centralized control unit 112. The centralized control unit 112 acquires, like the centralized control unit 12 of the optical disk apparatus 1, preformatted information extracted from the wobble signal by the signal processing unit 114 and controls the recording start position, recording/reproduction timing and the like based on the preformatted information. The operation of the wobble signal according to Formula (10)

corresponds to the wobble signal operation expression according to related technology shown in the above (5M).

Thus, the optical pickup 117 of the optical disk apparatus 110 can receive both the reflected light beam LBR0 by the optical disk 100B of the BD mode and the reflected light beam LCAR by the optical disk 100C of the CD mode by the receiving unit D1 of the photo-detector 125.

[6-2-3. Irradiation of the Optical Disk 100D of DVD Mode with Light Beam and Light Reception]

If the optical disk 100 is the optical disk 100D of the DVD mode, the centralized control unit 112 of the optical disk apparatus 110 causes the optical pickup 117 to irradiate the optical disk 100C with a light beam of the wavelength suitable to the optical disk 100C.

Actually, the centralized control unit 112 causes the laser chip 131D of the laser diode 131 to emit a light beam LD consisting of red laser light of the wavelength of about 660 [nm] as a diverging ray by controlling the light source control unit 120 before causing the light beam LD to enter the grating 132.

The light beam LD has an emission point separated from that of the light beam LC by the interval u5 and thus travels along an optical axis slightly separated from that of the light beam LC.

The grating 132 separates the light beam LD into a light beam LDA consisting of zero-order light, a light beam LDB consisting of + primary light beam, and a light beam LDC consisting of − primary light beam by causing the light beam LD to diffract before causing these light beams to enter a collimator lens 133.

The light beams LDB and LDC travel, like the light beams LCB and LCC, almost in parallel with the light beam LDA while optical axes thereof are slightly apart from the optical axis of the light beam LDA before being, like the light beam LDA, converged, diverged, reflected or the like. Thus, the description below is focused on the light beam LDA and a portion of the description of the light beams LDB and LDC is omitted.

The light beams LDA, LDB, and LDC enter, like the light beams LCA, LCB, and LCC, the objective lens 135 via the polarizing prism 121 and the ¼ wavelength plate 134 respectively before condensed by the focus being adjusted on the target recording layer YT of the optical disk 100D.

At this point, the light beams LDA, LDB, and LDC are reflected, like the light beams LCA, LCB, and LCC, by the target recording layer YT to become reflected light beams LDAR, LDBR, and LDCR respectively.

The reflected light beams LDBR and LDCR travel almost in parallel with the reflected light beam LDAR while optical axes thereof are slightly apart from the optical axis of the light beam LDAR. Like the case of the light beams LCB and LCC, a portion of the description of the reflected light beams LDBR and LDCR is also omitted.

Then, like the reflected light beam LCAR, the reflected light beam LDAR is converted from a diverging ray into a parallel light by the objective lens 135 and from right circular polarization into S polarization (linear polarization) by the ¼ wavelength plate 134 before being further caused to enter the polarizing prism 121.

The polarizing prism 121 reflects the reflected light beam LDAR consisting of S polarization by the reflection/transmission surface 121DC to cause the reflected light beam LDAR to pass through the reflection/transmission surface 121B before causing the reflected light beam LDAR to enter the hologram device 123.

The hologram device 123 separates the reflected light beam LDAR consisting of the wavelength of about 660 [nm] into at least zero-order light and primary light before causing both to enter the anamorphic lens 124.

Components other than the zero-order light of the reflected light beam LDAR diffracted by the hologram device 123 will not be shone on the receiving units D31 to D33 involved in signal detection of the DVD mode in the end and thus, the description thereof is omitted below. Similarly, the description of the reflected light beams LDBR and LDCR diffracted by the hologram device 123 is omitted.

The anamorphic lens 124 condenses the reflected light beam LDAR and also provides astigmatism before irradiating the photo-detector 125 with the reflected light beam LDAR. At this point, the each of the reflected light beams LDBR and LDCR is also condensed.

The receiving unit D1 of the photo-detector 125 is adjusted to the irradiation position of the light beam LCA whose light source is the laser chip 131C of the laser diode 131. Thus, the light beam LDA whose light source is the laser chip 131D separated from the laser chip 131C by the predetermined distance u5 is shone on a location separated from the receiving unit D1 by a predetermined distance u6, that is, onto the receiving unit D31. Incidentally, the distance u6 is a value decided based on the distance u5, optical design of the optical pickup 117 and the like.

The photo-detector 125 receives the reflected light beam LDAR by receiving regions D31A to D31D of the receiving unit D31 and generates received light signals S31A to S31D in accordance with received light results thereof respectively to supply the received light signals to the head amplifier 126.

The photo-detector 125 also receives the reflected light beam LDBR by receiving regions D32A and D32B of the receiving unit D32 and generates received light signals S32A and S32B in accordance with received light results thereof respectively to send the received light signals to the head amplifier 126.

Similarly, the photo-detector 125 receives the reflected light beam LDCR by receiving regions D33A and D33B of the receiving unit D33 and generates received light signals S33A and S33B in accordance with received light results thereof respectively to send the received light signals to the head amplifier 126. The head amplifier 126 amplifies each received light signal before supplying the received light signal to the signal processing unit 114.

The tracking error signal operation circuit 114T of the signal processing unit 114 calculates the tracking error signal STE2 according to the DPP method by performing operations according to Formula (13) corresponding to the above Formula (12). Then, the tracking error signal operation circuit 114T supplies the tracking error signal STE2 to the tracking control unit 113AT of the servo control unit 113A.

[Math 17]

$$STE2=(S31A+S31B)-(S31C-S31D)-\delta\times\{(S32A-S32B)+(S33A-S33B)\} \quad (13)$$

The signal processing unit 114 supplies the tracking error signal STE2 to the tracking control unit 113AT of the servo control unit 113A.

The tracking control unit 113AT of the servo control unit 113A generates the tracking drive signal STD2 based on the tracking error signal STE2 and supplies the tracking drive signal STD2 to the tracking actuator 9T. The tracking actuator 9T drives the objective lens 135 in the tracking direction based on the tracking drive signal STD2. In this manner, the servo control unit 113A exercises tracking control by the DPP method.

The servo control unit 113A is constructed to also calculate the focus error signal SFE1 according to the astigmatic method to exercise focus control based thereon.

Further, the reproducing signal operation circuit 114R of the signal processing unit 114 calculates the reproducing RF signal SRF by adding the received light signals S31A to S31D according to the above Formula (4).

The wobble signal operation circuit 114W of the signal processing unit 114 generates the wobble signal SWBL2 by performing operations according to the above Formula (10) or tapping an operation result thereof. Then, the wobble signal operation circuit 114W generates preformatted information such as address information from the wobble signal SWBL2 and supplies the preformatted information to the centralized control unit 112. The centralized control unit 112 acquires, like the centralized control unit 12 of the optical disk apparatus 1, preformatted information extracted from the wobble signal by the signal processing unit 114 and controls the recording start position, recording/reproduction timing and the like based on the preformatted information. The operation of the wobble signal according to Formula (14) corresponds to the wobble signal operation expression according to related technology shown in the above (5M).

[Math 18]

$$SWBL2=(S31A+S31B)-(S31C+S31D) \quad (14)$$

Thus, the optical pickup 117 of the optical disk apparatus 110 can receive the reflected light beams LDAR, LDBR, and LDCR by the optical disk 100V of the DVD mode by the receiving units D31, D32, and D33 of the photo-detector 125.

[6-3. Operation and Effect]

[6-3-1. Operation]

In the above configuration, if the optical disk 100 is the optical disk 100B of the BD mode, the optical pickup 117 of the optical disk apparatus 110 generates each received light signal by the photo-detector 125 in the same manner as the photo-detector 19 in the first embodiment.

Accordingly, like in the first embodiment, the optical disk apparatus 110 can extract address information and the like and exercise focus control and tracking control without being affected by the interlayer stray light beam LN.

If, on the other hand, the optical disk 100 is the optical disk 100C of the CD mode, the optical pickup 117 of the optical disk apparatus 110 separates the light beam LC into zero-order light and ± primary light by the grating 132. Then, the optical pickup 117 causes the target recording layer YT of the optical disk 100C to reflect each of the zero-order light and ± primary light.

Further, the optical pickup 117 receives the reflected light beams LCAR, LCBR, and LCCR by the receiving units D1, D21, and D22 of the photo-detector 125 respectively to generate each received light signal.

The signal processing unit 114 generates the wobble signal SWBL2 by the three-beam push-pull method according to related technology and extracts preformatted information from the wobble signal SWBL2 to provide the preformatted information to the centralized control unit 112. Based on the information, the centralized control unit 112 controls the recording start position, recording/reproduction timing and the like.

Further, the signal processing unit 114 calculates the tracking error signal STE2 according to the DPP method using received light signals and provides the tracking error signal STE2 to the servo control unit 113A. The servo control unit 113A exercises tracking control based on the tracking error signal STE2.

[6-3-2. Effect]

Therefore, the optical disk apparatus 110 can generate a received light signal compatible with the DPP method by adopting a configuration in which the receiving units S21 and D22 are added to the photo-detector 19 in the first embodiment for the photo-detector 125 of the optical pickup 117.

That is, the optical disk apparatus 110 can generate the wobble signal SWBL2 using the received light signals S1A to S1D by the receiving unit D1 of the photo-detector 125 regardless of whether the optical disk 100 is of the BD mode or the CD mode. Also in such a case, the optical disk apparatus 110 can further generate the focus error signal SFE1 or reproducing RF signal SRF in the same manner. Further, if the optical disk 100 is of the BD mode, the wobble signal SWBL1 can also be generated by using the received light signals S2A and S2B by the receiving unit D2 of the photo-detector 125.

The photo-detector 125 can receive both a reflected light beam LBRS0 and a reflected light beam LCRA by the receiving regions D1A to D1D of the receiving unit D1. Accordingly, when compared with a case in which both the reflected light beams are received by receiving regions independently of each other, the photo-detector 125 can be made smaller in size in the optical disk apparatus 110 so that the number of amplifier circuits in the head amplifier 126 can be reduced.

In the optical disk apparatus 110, the laser chips 131C and 131D are separated by the interval u5 in the laser diode 131. Moreover, the optical disk apparatus 110 has the photo-detector 125 in which centers of the receiving units D1, D21, and D22 and those of the receiving units D31, D32, and D33 are separated by the interval u6 respectively.

Accordingly, the optical disk apparatus 110 can receive a respective light beam of the BD mode, the DVD mode, and the CD mode by one unit of the photo-detector 125, leading to reduction in number of parts and miniaturization of the apparatus configuration.

Particularly, fluctuations in interval between the laser chips 131d and 131C can be eliminated almost completely by the manufacturing process thereof. Accordingly, the photo-detector 125 can be designed by setting the interval u6 as a constant value.

The hologram device 131 can cause the reflected light beam LBR consisting of the wavelength of about 405 [nm] to diffract by having wavelength selectivity. In addition, the hologram device 131 can cause the reflected light beams LDAR, LDBR, and LDCR consisting of the wavelength of about 660 [nm] and the reflected light beams LCAR, LCBR, and LCCR consisting of the wavelength of about 780 [nm] to transmit without being caused to diffract.

That is, the hologram device 123 does not unnecessarily cause the reflected light beams LDAR, LDBR, and LDCR and the reflected light beams LCAR, LCBR, and LCCR to diffract and thus, the photo-detector 125 can be saved from being caused to shine unnecessary stray light.

Further, in the optical disk apparatus 110, the hologram device 123 is provided on the front side of the anamorphic lens 124 instead of being provided between the anamorphic lens 124 and the photo-detector 125.

When the reflected light beam LBR is condensed by the anamorphic lens 124 or the like, generally the interlayer stray light beam LN or the like is also condensed. The focus of the interlayer stray light beam LN will be formed on the front side or rear side of the reflected light beam LBR.

When the configuration of an optical pickup should be miniaturized in consideration of the focal length of a condenser lens or the like, a configuration in which, like the first embodiment, the hologram device 17 is provided between the condenser lens 16 and the photo-detector 19 can be considered.

However, in such a configuration, the interlayer stray light beam LN may form a focus near the surface of involving optics such as the hologram device 17 or near the interface of different materials depending on the interval between layers.

If a microscopic foreign substance adheres to the surface of the hologram device 17 or the surface is damaged and further, bubbles are intermixed, the interlayer stray light beam LN is mostly blocked because the interlayer stray light beam LN is condensed in a small way. If a lens shift occurs in this state, the interlayer stray light beam LN is also moved together, changing the transmission/blocking state of the interlayer stray light beam LN significantly. As a result, brightness of the stray light pattern W is fluctuated considerably so that various received light signals may be affected.

In the optical disk apparatus 110, by contrast, such an issue can be prevented because neither surface of optics nor interface is provided in positions between the anamorphic lens 124 and the photo-detector 125 where the focus of the interlayer stray light beam LN could be formed.

Moreover, in the optical disk apparatus 110, the hologram device 123 needs only to exhibit the action of diffraction on the reflected light beam LBR or the like consisting of a parallel light. Thus, when compared with a case in which hologram device 123 exhibits the action of diffraction on the reflected light beam LBR or the like consisting of a converging ray, the degree of design difficulty or the degree of manufacturing difficulty of the hologram device 123 can be alleviated. Further, in the optical disk apparatus 110, the polarizing prism 121 or other optics similarly needs only to exhibit a predetermined action on a light beam consisting of a parallel light and thus, when compared with a case in which such optics is provided in a converging ray, the degree of design difficulty or the degree of manufacturing difficulty thereof can be alleviated.

Further, in the optical disk apparatus 110, like in the third embodiment, a spherical aberration generated in the light beam LB or the reflected light beam LBR is corrected by the spherical aberration correction unit 64 and therefore, the amount of the light beam LB emitted from the objective lens 8 can be stabilized without fluctuations.

According to the above configuration, the optical disk apparatus 110 according to the sixth embodiment can, like in the first embodiment concerning the optical disk 100B of the BD mode, correctly extract preformatted information such as address information and time information with stability. In this case, an influence of an interlayer stray light beam is hardly exerted. Further, the optical disk apparatus 110 according to the sixth embodiment can, like in the first embodiment concerning the optical disk 100B of the BD mode, exercise focus control and tracking control. Also in this case, an influence of an interlayer stray light beam is hardly exerted. In addition, regarding the optical disk 100D of the DVD mode and the optical disk 100C of the CD mode, the optical disk apparatus 110 can generate a wobble signal based on received light results by the receiving units D1, D21, and D22 or the receiving units D31, D32, and D33 of the photo-detector 125. Similarly, the optical disk apparatus 110 can exercise tracking control by the DPP method.

It should be understood by those skilled in the art that various modifications, combinations, sub-combinations and alterations may occur depending on design requirements and other factors insofar as they are within the scope of the appended claims or the equivalents thereof.

7. Other Embodiments

In the first embodiment described above, for example, a case in which the reflected light beams LR1A and LR1B are caused to diffract in the longitudinal direction, that is, in a direction substantially in parallel with the running direction in an image of track grooves formed on the optical disk 100 is described.

However, the present invention is not limited to this and each of the reflected light beams LR1A and LR1B may be caused to diffract in other directions. In such a case, it is desirable to cause the reflected light beams LR1A and LR1B to diffract at least in directions other than those of the reflected light beams LR1C and LR1D and it is necessary to only provide the receiving unit D2 of the photo-detector 19 in the other directions correspondingly. This also applies to the second to sixth embodiments.

Also in the first embodiment described above, a case in which the reflected light beams LR1C and LR1D are caused to diffract in the transverse direction, that is, in a direction substantially orthogonal to the running direction in an image of track grooves formed on the optical disk 100 is described.

However, the present invention is not limited to this and each of the reflected light beams LR1C and LR1D may be caused to diffract in other directions. In such a case, it is desirable to cause the reflected light beams LR1C and LR1D to diffract at least in directions other than those of the reflected light beams LR1A and LR1B and it is necessary to only provide the receiving unit D3 of the photo-detector 19 in the other directions correspondingly. This also applies to the second to sixth embodiments.

Further in the first embodiment described above, a case in which the receiving regions D2A and D2B are arranged by being mutually placed in the longitudinal direction in the receiving unit D2 of the photo-detector 19.

However, the present invention is not limited to this and if, for example, the receiving regions D2A and D2B are arrangeable outside the formation range of the stray light patterns W1A and W1B (FIG. 7B), the receiving regions D2A and D2B may be arranged by being mutually placed in the transverse direction or other directions. This also applies to the second to sixth embodiments. In this case, the angle of diffraction in the regions 17A and 17B of the hologram device 17 may appropriately be set.

Further in the first embodiment described above, a case in which the receiving regions D3C and D3D are arranged by being mutually placed in the transverse direction in the receiving unit D3 of the photo-detector 19.

However, the present invention is not limited to this and if, for example, the receiving regions D3C and D3D are arrangeable outside the formation range of the stray light patterns W1C1 and W1C2 (FIG. 7B) and also outside the formation range of the stray light patterns W1D1 and W1D2, the receiving regions D3C and D3D may be arranged by being mutually placed in the longitudinal direction or other directions. In this case, the angle of diffraction in the regions 17C1 and 17C2 and the regions 17D1 and 17D2 of the hologram device 17 may appropriately be set.

Further in the first embodiment described above, a case in which the reflected light beams LR1A and LR1B are caused to diffract in the downward direction in FIG. 5, FIG. 6 and the like and the receiving unit D2 is provided below the reference point P is described.

However, the present invention is not limited to this and, for example, the reflected light beams LR1A and LR1B may be caused to diffract in the upward direction in FIG. 5, FIG. 6 and the like and the receiving unit D2 may be provided above the reference point P. Alternatively, the reflected light beam LR1A may be caused to diffract in the upward direction and the reflected light beam LR1B in the downward direction and the receiving region D2A may be provided above the reference point P and the receiving region D2B below the reference point P. This also applies to the second to sixth embodiments.

Further in the first embodiment described above, a case in which the reflected light beams LR1C1, LR1C2, LR1D1, and LR1D2 are caused to diffract in the left direction in FIG. 5, FIG. 6 and the like and the receiving unit D3 is provided on the left of the reference point P is described.

However, the present invention is not limited to this and, for example, the reflected light beams LR1C1, LR1C2, LR1D1, and LR1D2 may be caused to diffract in the right direction in FIG. 5, FIG. 6 and the like and the receiving unit D3 may be provided on the right of the reference point P. Alternatively, the reflected light beams LR1C1 and LR1C2 may be caused to diffract in the left direction and the reflected light beams LR1D1 and LR1D2 in the right direction and the receiving region D3C may be provided on the left of the reference point P and the receiving region D3D on the right of the reference point P. This also applies to the second to sixth embodiments.

Further in the first embodiment described above, a case in which the receiving units D2 and D3 of the photo-detector 19 are arranged outside the irradiation range of the zero-order light beam when the interlayer stray light beam LN by the recording layer Y farthest from the target recording layer YT is diffracted by the hologram device 17 is described. That is, a case in which the receiving units D2 and D3 of the photo-detector 19 are arranged outside the formation range of the stray light pattern W30 (FIG. 7A) is described.

However, the present invention is not limited to this and if, for example an influence of the stray light pattern W30 can be ignored, the receiving units D2 and D3 may be arranged inside the formation range of the stray light pattern W30 in the photo-detector 19. This also applies to the second to sixth embodiments. Particularly in the third and fourth embodiments, this applies to the receiving units D11 and D12.

Further in the first embodiment described above, the receiving regions D4A, D4B, D4C, and D4D of the receiving unit D4 in the photo-detector 19 have a shape created by rotating the shape of the receiving regions D1A to D1D of the receiving unit D1 by 45 degrees.

However, the present invention is not limited to this and the receiving unit D4 and each of the receiving regions D4A to D4D may have various shapes or further be divided into receiving regions of any number. In such a case, it is necessary only that a received light signal that enables calculation of the mounting angle of the photo-detector 19 can be generated by various kinds of operation processing.

Further in the first embodiment described above, a case in which the reflected light beam LR1E is detected by the receiving unit D4 and the mounting angle of the photo-detector is adjusted based on a detection result thereof is described.

However, the present invention is not limited to this and if adjustments of the mounting angle are not necessary due to design precision or the mounting angle can be adjusted by another method, the use of received light signals by the receiving unit D4 may be relinquished or the receiving unit D4 may be omitted.

Further in the first embodiment described above, a case in which a so-called binary hologram is formed in each of the regions 17A to 17E is described.

However, the present invention is not limited to this and a blazed hologram may be formed in each of the regions 17A to 17E. Accordingly, utilization efficiency of primary diffracted light can be enhanced. This also applies to the second to sixth embodiments.

Further in the first embodiment described above, a case in which a light beam is shone in such a way that each of the reflected light beams LR1A to LR1E comes into a focus on the photo-detector 19 is described.

However, the present invention is not limited to this and the reflected light beams LR1A to LR1E need not come into a focus on the photo-detector 19. In such a case, it is only necessary for the receiving regions D2A, D2B, D3C, D3D and the like to receive each reflected light beam without leakage. This also applies to the second to sixth embodiments.

Further in the first embodiment described above, as shown in FIG. 5, four stray light receiving regions D1P to D1S, each of which in a substantially square shape, are provided at locations corresponding to extension lines of diagonal lines when the receiving regions D1A to D1D in the receiving unit D1 are viewed as a substantial square.

However, the present invention is not limited to this and each of the stray light receiving regions D1P to D1S may be arranged at any location around the receiving regions D1A to D1D or each of the stray light receiving regions D1P to D1S may have various shapes or sizes and further, any number of stray light receiving regions may be provided. In such a case, the coefficient k and the like in Formula (1B) may be set appropriately in accordance with the positions, shapes, areas, and the like of the stray light receiving regions.

If an influence of stray light can be ignored in the tracking error signal STE1, the stray light receiving regions D2P and D2Q in the receiving unit D2 of the photo-detector 19 and the stray light receiving regions D3R and D3S in the receiving unit D3 may be omitted. In such a case, as shown in Formula (2A), the second half of Formula (2B) can be omitted.

Further, if an influence of stray light can be ignored in the focus error signal SFE1, the stray light receiving regions D1P to D1S in the receiving unit D1 of the photo-detector 19 may be omitted. In such a case, as shown in Formula (1A), the second half of Formula (1B) can be omitted.

Further in the first embodiment described above, a case in which whether the optical disk 100 has one layer of the recording layer Y is determined based on the stray light receiving signals S1P to S1S generated by the stray light receiving regions D1P to D1S is described.

However, the present invention is not limited to this and a stray light receiving region may be added to a location where presence/absence of the stray light pattern W changes depending on the distance from the target recording layer YT to the recording layer Y when the interlayer stray light beam LN forming the stray light pattern W is reflected by the optical disk 100. In such a case, for example, a location overlapped with the stray light pattern W30 (FIG. 7A), but not with the stray light pattern W10 (FIG. 7B) can be considered.

Accordingly, the optical disk apparatus 1 can determine the number of the recording layers Y by the medium determination signal operation circuit 4M of the signal processing unit 4 based on a received light signal generated by the added stray light receiving region.

Further in the first embodiment described above, a case in which the cylindrical lens 18 is arranged by being separated from the photo-detector 19 is described. Then, optical characteristics inverse to those of astigmatism given by the cylindrical lens 18 when the reflected light beam LR is diffracted are provided in advance.

Figure 35:
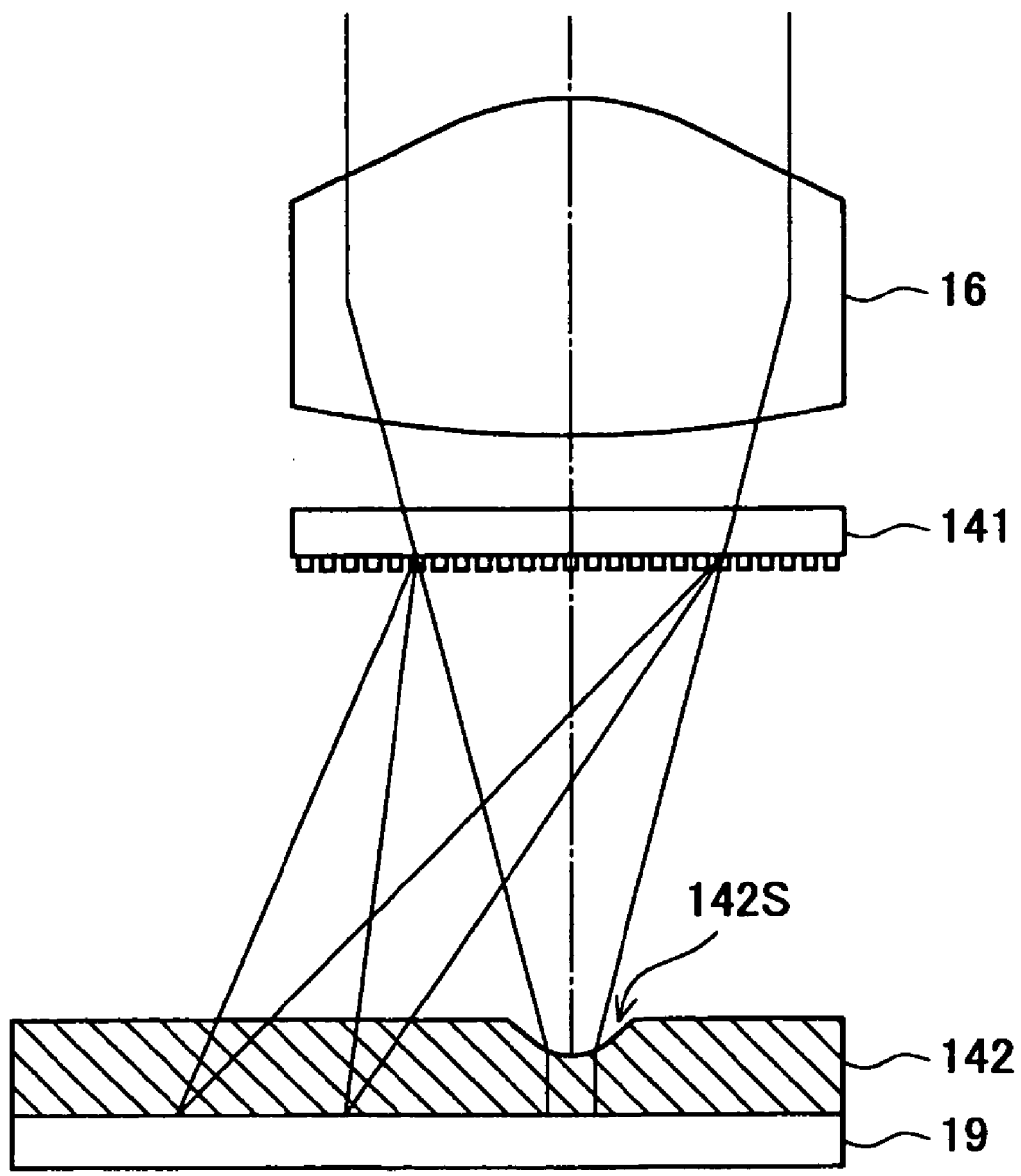
FIG. 35 is an approximate diagram showing the configuration (1) of a cylindrical lens according to another embodiment.
Figure 36:
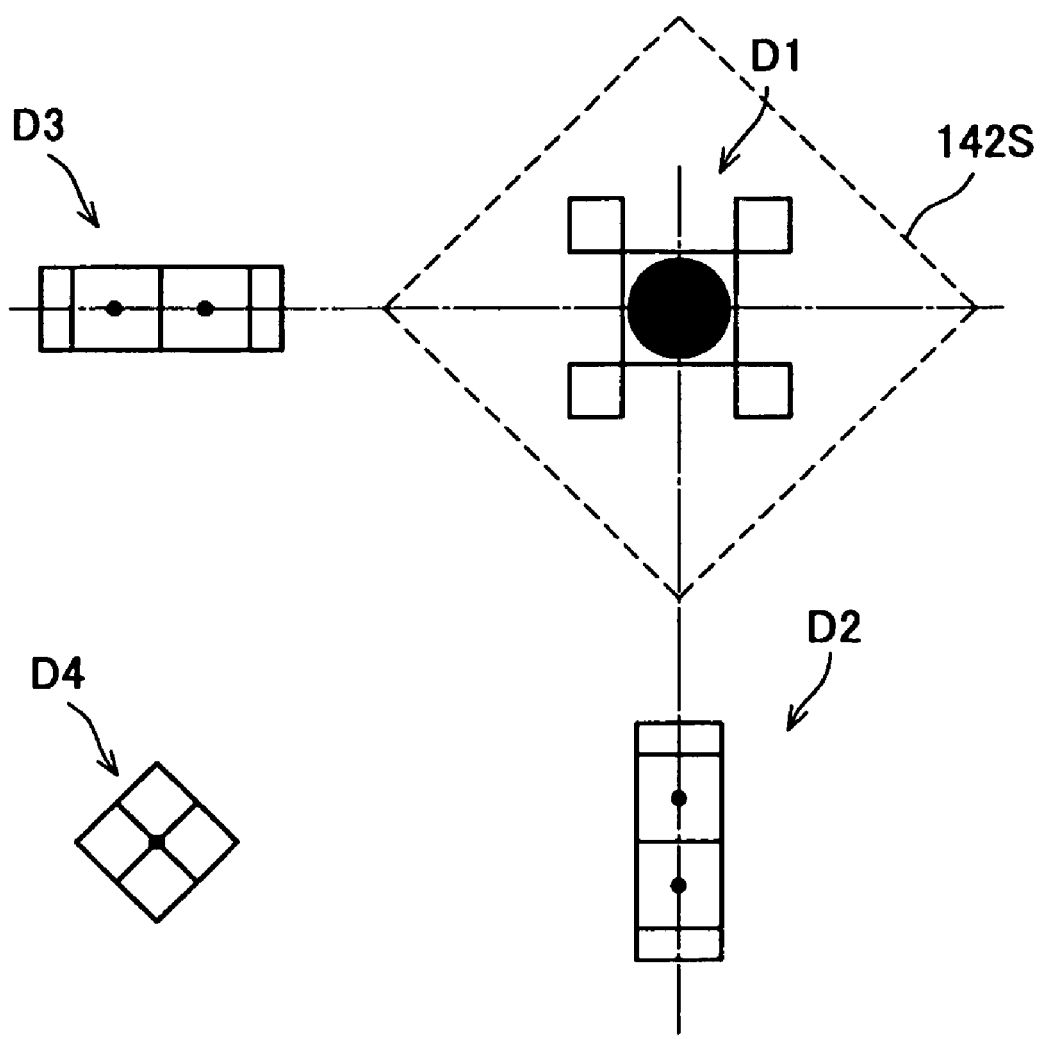
FIG. 36 is an approximate diagram showing the configuration (2) of a cylindrical lens according to another embodiment.

However, the present invention is not limited to this and, as shown, for example, in FIGS. 35 and 36, an optical element 142 in place of the cylindrical lens 18 may be provided close to the photo-detector 19. The optical element 142 has a lens surface 142S having an effect similar to that of the cylindrical lens 18 only in a passing portion of the reflected light beam LR0 consisting of zero-order light.

Accordingly, the optical element 142 does not provide unnecessary astigmatism to the reflected light beam LR1A consisting of primary light or the like. In this case, moreover, there is no need for a hologram device 141 to, like the hologram device 17, provide optical characteristics inverse to those of astigmatism when the reflected light beam LR is diffracted in advance and thus, restrictions on design are alleviated. This also applies to the second to fifth embodiments.

Further in the sixth embodiment described above, a case in which the optical disk apparatus 110 supports the optical disk 100B of the BD mode, the optical disk 100D of the DVD mode, or the optical disk 100C of the CD mode is supported is described.

Figure 37:
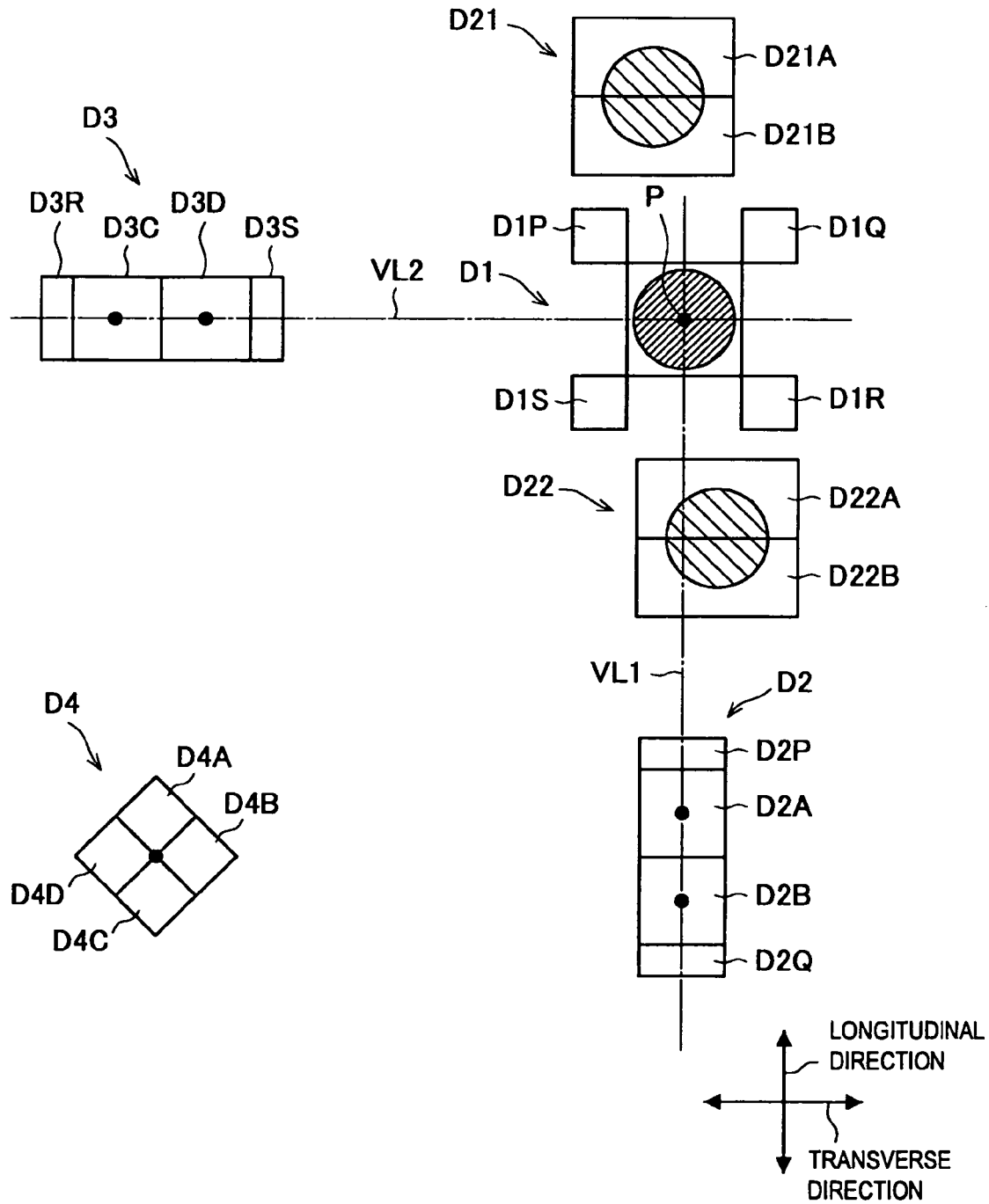
FIG. 37 is an approximate diagram showing the configuration of the photo-detector according to another embodiment.

However, the present invention is not limited to this and, for example, the optical disk 100D of the DVD mode may not be supported. In this case, the laser chip 131D can be omitted from the laser diode 131 of the optical pickup 117. Moreover, as shown in FIG. 37, the receiving units D31, D32, and D33 may be omitted from the photo-detector 125.

Further in the sixth embodiment described above, a case in which the grating 132 and the collimator lenses 12 and 133 are provided individually is described.

Figure 38:
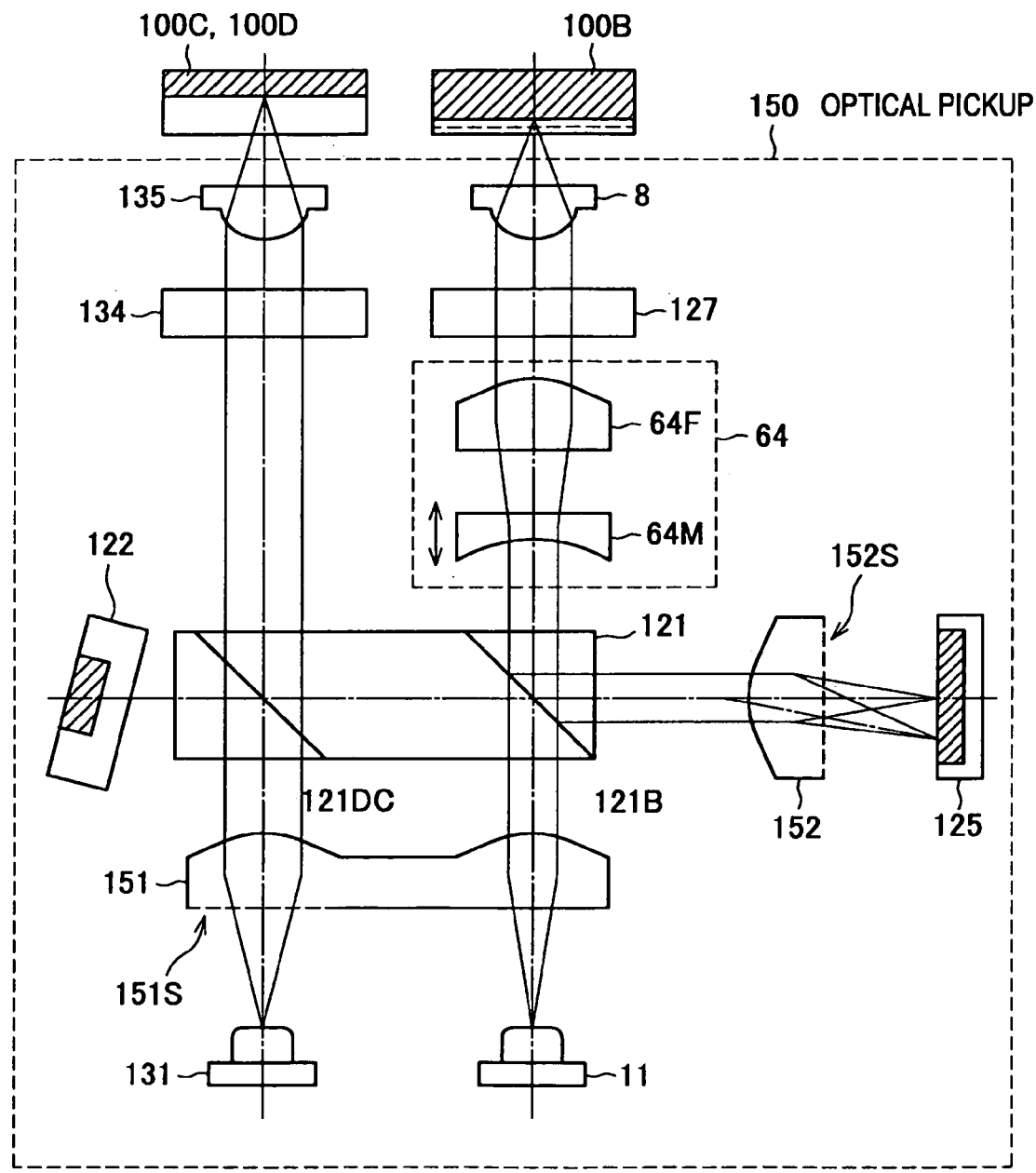
FIG. 38 is an approximate diagram showing the configuration of the optical pickup according to another embodiment.

However, the present invention is not limited to this and, as shown, for example, in FIG. 38 partially corresponding to FIG. 30, an integrated collimator lens 151 in which functions of the grating 132 and the collimator lenses 12 and 133 are integrated may be used in an optical pickup 150.

In this case, the integrated collimator lens 151 can separate each of the light beam LD and the light beam LC by a diffraction grating 151S having a function equivalent to that of the grating 132 in portions through which the light beam LD and the light beam LC pass.

In addition to providing the hologram device 123 and the anamorphic lens 124 (FIG. 30) individually, as shown in FIG. 38, a hologram integrated anamorphic lens 152 in which functions of the hologram device 123 and the anamorphic lens 124 are integrated may be used.

In this case, a reflected light beam can be caused to diffract in each region by a hologram 152S having a function similar to that of the hologram device 123 on the emission surface of the reflected light beam.

Accordingly, when compared with the optical pickup 117, the optical pickup 150 can reduce the number of parts and also reduction of the number of manufacturing processes and that of adjustment processes can be attempted.

Further in the first embodiment described above, a case in which the hologram device 17 is provided between the condenser lens 16 and the photo-detector 19 is described.

However, the present invention is not limited to this and, like in the sixth embodiment, the hologram device 17 may be provided between the polarized beam splitter 13 and the condenser lens 16 or between the polarized beam splitter 13 and the ¼ wave plate 15. In the latter case, the hologram device 17 may be used as a polarization hologram device to act on only the reflected light beam LR.

Alternatively, like the hologram integrated anamorphic lens 152 of the optical pickup 150, a hologram having a function similar to that of the hologram device 17 may be formed on the emission surface of the condenser lens 16.

Further in the sixth embodiment described above, a case in which the anamorphic lens 124, the photo-detector 125 and the like are arranged without specific sealing is described.

However, the present invention is not limited to this and, for example, at least a space of the interval u7 calculated by Formula (9) from the photo-detector 125 such as between the anamorphic lens 124 and the photo-detector 125 may be sealed. Accordingly, the partial blocking of the interlayer stray light beam LN by a foreign substance can be prevented.

Further in the sixth embodiment described above, a case in which the hologram device 123 causes the light beam LC whose wavelength is 780 [nm] to diffract is described. However, in the present embodiment, the reflected light beams LCAR to LCCR and LDAR to LDCR may be caused to transmit unchanged by causing the hologram device 123 to have wavelength selectivity.

Further in the first embodiment described above, a case in which, as shown in FIG. 4, a boundary line between the region 17A and the region 17E and that between the region 17B and the region 17E are each a straight line is described.

Figure 39A:
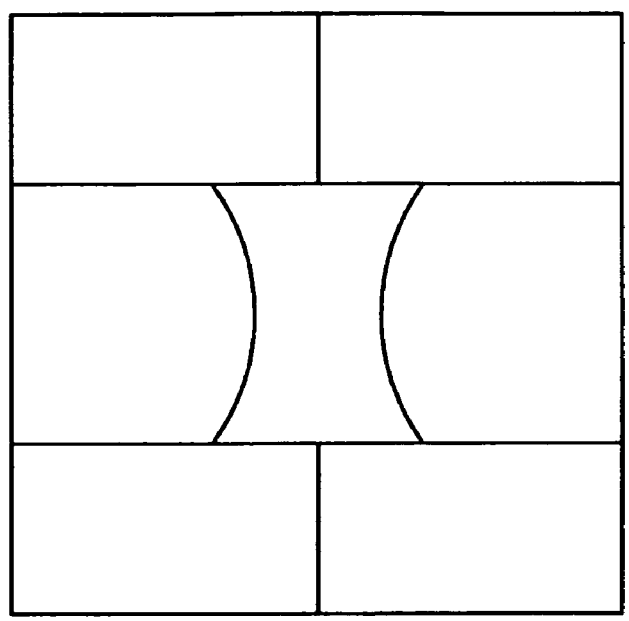
FIG. 39 is an approximate diagram showing the configuration of the hologram device according to another embodiment.
Figure 39B:
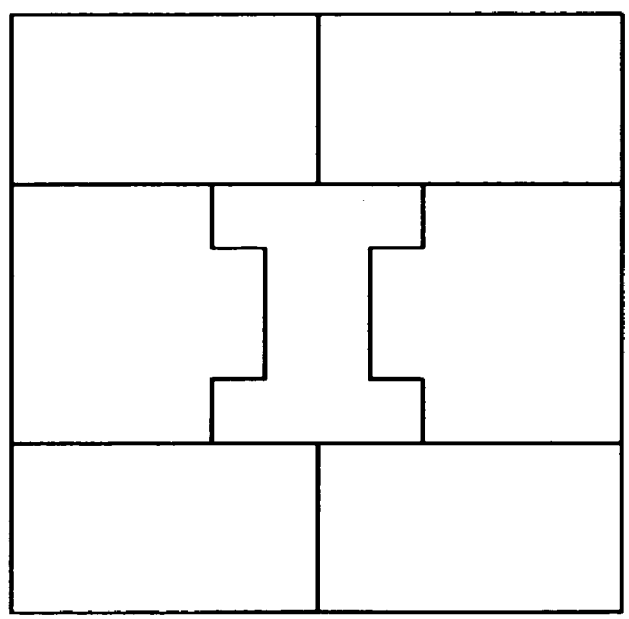

However, the present invention is not limited to this and, as shown, for example, in FIGS. 39A and 39B corresponding to FIG. 4, a hologram device 161 whose boundary line is curved may be used. Further, hologram devices whose boundary line has various shapes such as a hologram device 162 whose boundary line is a broken line may also be used. This also applies to the second to fifth embodiments.

Further in the third to sixth embodiments described above, a case in which the spherical aberration correction unit 64 is configured as a so-called Galileo-type beam expander by the fixed lens 64F, which is a convex lens, and the moving lens 64M, which is a concave lens, is described (FIGS. 14, 21, and 30).

Figure 40:
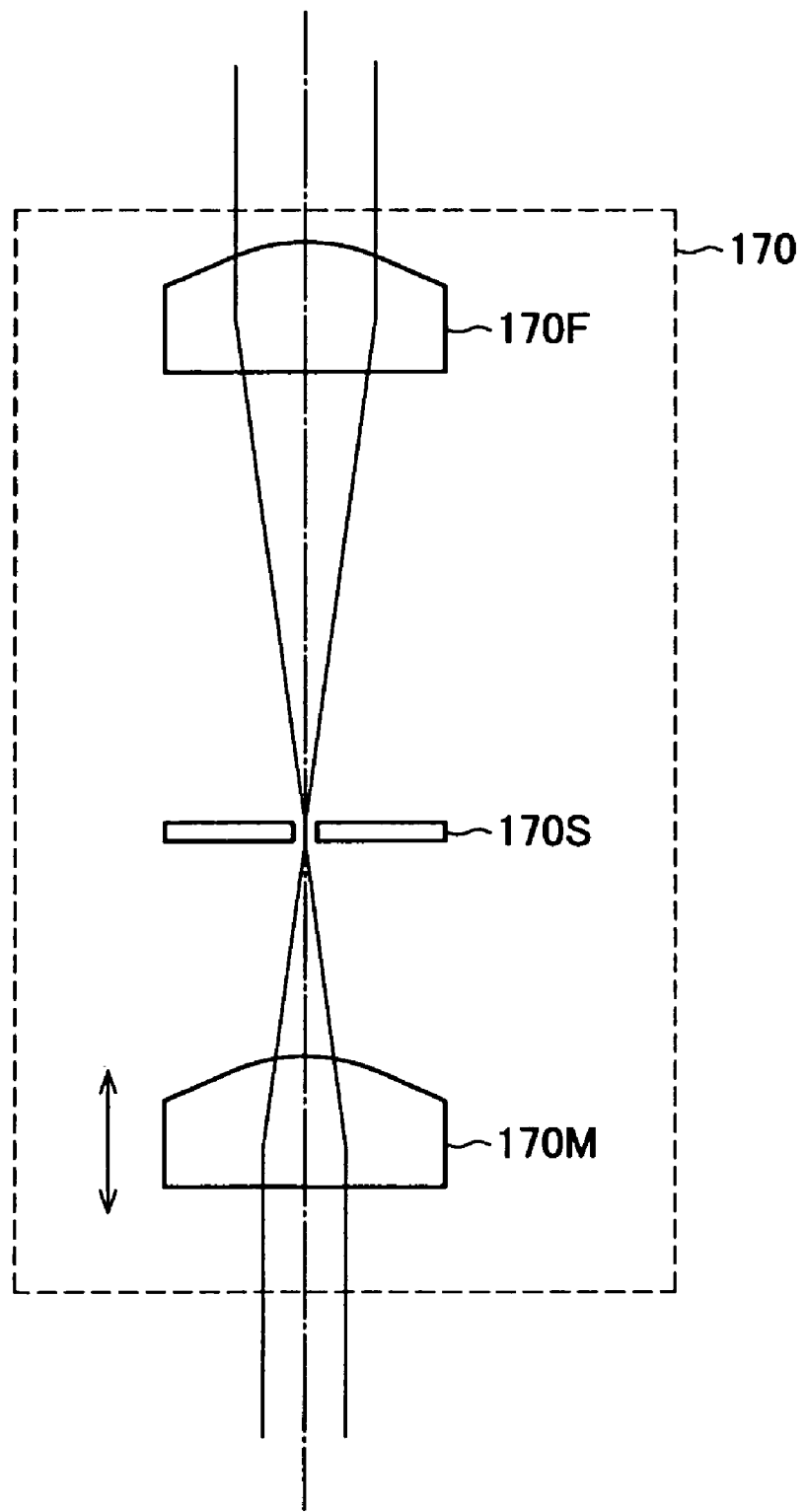
FIG. 40 is an approximate diagram showing the configuration of a spherical aberration correction unit according to another embodiment.

However, the present invention is not limited to this. As shown, for example, in FIG. 40, a so-called Kepler-type beam expander may be configured by a fixed lens 170F and a moving lens 170M, both of which are convex lenses, as a spherical aberration correction unit 170 in place of the spherical aberration correction unit 64.

In this case, a large proportion of interlayer stray light beams can effectively be blocked so that the stray light pattern W formed on the photo-detector 125 can be reduced.

Accordingly, for example, the photo-detector 125 can be made smaller in size by narrowing the interval between the receiving unit D1 and the receiving units D2, D3, and D4 in the photo-detector 125. For the hologram device 123, the angle of diffraction of the reflected light beam LBR can be made smaller so that the lattice pitch can be made relatively large, alleviating restrictions on design.

Further in the first embodiment described above, a case in which the reproducing RF signal SRF is calculated by performing additions according to Formula (4) after each of the received light signals S1A to S1D being amplified by a plurality of amplifier circuits in the head amplifier 22 is described.

However, the present invention is not limited to this and, for example, the reproducing RF signal SRF may be generated by amplifying each of the received light signals S1A to S1D by a plurality of amplifier circuits in the head amplifier 22 after additions being performed according to Formula (4). In this case, the number of amplifier circuits to be used can be reduced so that amplifier noise that could be superimposed by the amplifier circuits can be reduced.

Moreover, addition operations such as (S1A+S1C) and (S1B+S1D) in Formula (1A) and Formula (1B) may be performed before amplification by the amplifier circuits. This also applies to other operations and the second to sixth embodiments.

Further in the first embodiment described above, a case in which the optical disk apparatus 1 is enabled to perform both recording processing and reproduction processing of information on the optical disk 100 is described.

However, the present invention is not limited to this and, for example, the present invention may be applied to an optical disk apparatus capable of performing only reproduction processing of the optical disk 100. This also applies to the second to sixth embodiments. Further in the sixth embodiment, for example, both recording processing and reproduction processing may be enabled for the optical disk 100D of the DVD mode and the optical disk 100C of the CD mode while only reproduction processing is performed on the optical disk 100B of the BD mode.

Further in the above embodiments, a case in which the optical pickup 7 is configured as an optical pickup by the laser diode 11 as a light source, the objective lens 8 as an objective lens, the 2-axis actuator 9 as a lens moving unit, the condenser lens 16 as a condenser lens, the hologram device as a hologram device, and the photo-detector 19 as a photo-detector is described.

However, the present invention is not limited to this and the optical pickup may be configured by a light source, objective lens, lens moving unit, condenser lens, hologram device, and photo-detector consisting of other various circuit configurations.

Further in the above embodiments, a case in which the optical disk apparatus 1 is configured as an optical disk apparatus by the laser diode 11 as a light source, the objective lens 8 as an objective lens, the 2-axis actuator 9 as a lens moving unit, the condenser lens 16 as a condenser lens, the hologram device 17 as a hologram device, the photo-detector 19 as a photo-detector, the signal processing unit 4 as a signal processing unit, and the servo control unit 3A as a servo control unit.

However, the present invention is not limited to this and the optical disk apparatus may be configured by a light source, objective lens, lens moving unit, condenser lens, hologram device, photo-detector, signal processing unit, and servo control unit consisting of other various circuit configurations.

While dedicated hardware (such as an arithmetic circuit) may be caused to perform processing in the centralized control unit 2 or the like, the signal processing unit 4 or the like, the servo control unit 3A or the like, and the light source control unit 21 or the like described in each of the above embodiments, software may also be caused to perform the processing. When a sequence of processing should be performed by software, the sequence of processing can be performed by causing a general-purpose or dedicated computer 900 shown in FIG. 41 to execute programs.

Figure 41:
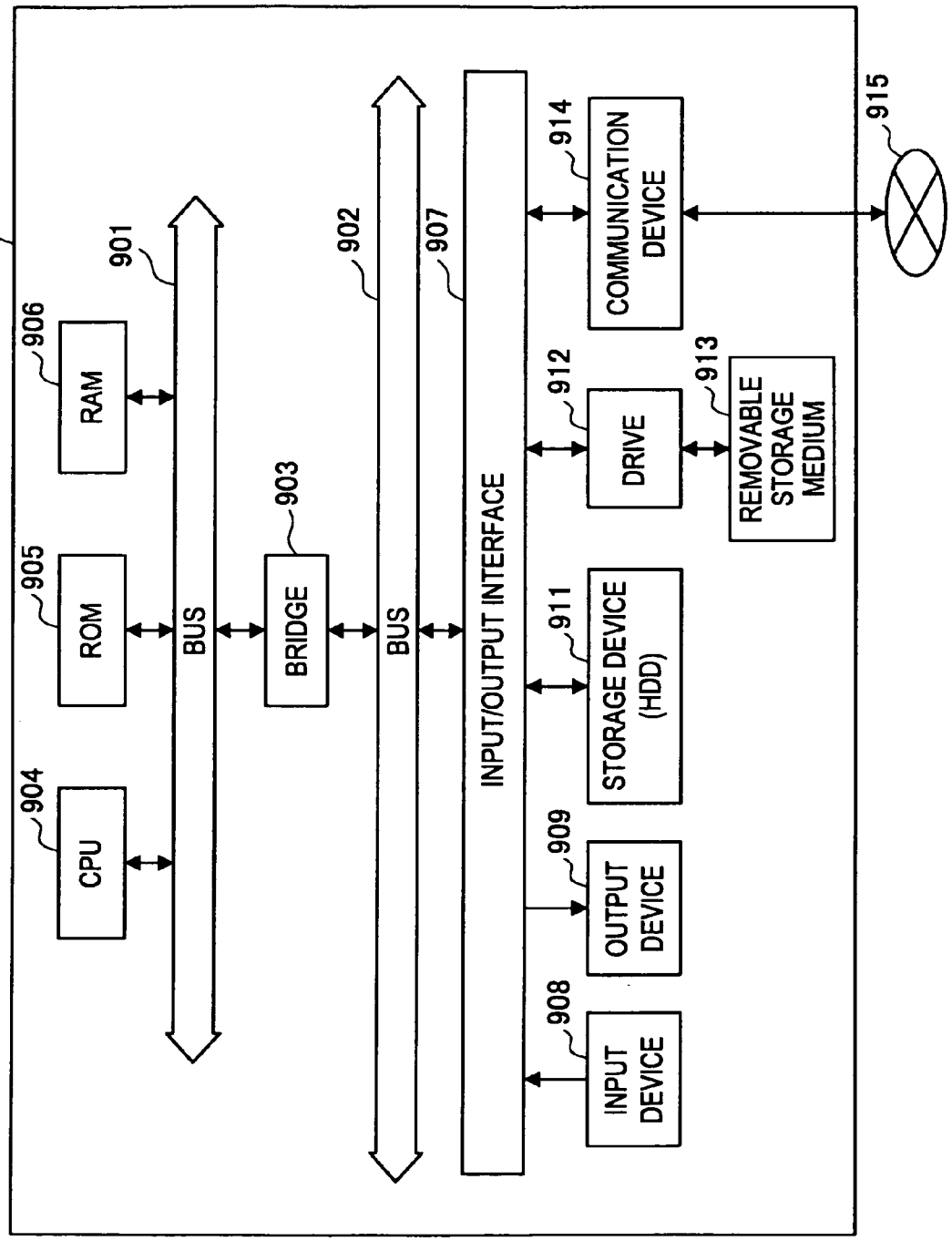
FIG. 41 is an explanatory view illustrating a configuration example of a computer realizing a sequence of processing by executing a program.

FIG. 41 is an explanatory view illustrating a configuration example of the computer 900 that realizes a sequence of processing by executing programs. Execution of programs to perform a sequence of processing by the computer 900 will be described below.

As shown in FIG. 41, the computer 900 has, for example, a bus 901, a bus 902, a bridge 903, a CPU (Central Processing Unit) 904, a recording device, an input/output interface 907, an input device 908, an output device 909, a drive 912, and a communication device 914. These components are connected via the bus 901 and the bus 902 connected by the bridge 903 and the input/output interface 907 in such a way that information can mutually be communicated.

A program can be recorded in a storage device 911 such as an HDD (Hard Disk Drive) and SSD (Solid State Drive), which are examples of recording device, a ROM (Read Only Memory) 905, a RAM (Random Access Memory) 906 or the like.

A program can also be recorded in, for example, a magnetic disk such as a flexible disk, optical disk such as various kinds of CD (Compact Disc), MO (Magneto Optical) disk, and DVD (Digital Versatile Disc), or a removable storage medium 913 such as a semiconductor memory temporarily or permanently. The removable storage medium 913 can be provided as the so-called package software. Programs recorded in the removable storage medium 913 may be recorded in the recording apparatus via the input/output interface 907 or the buses 901 and 902 after being read by the drive 912.

Further, programs can also be recorded on another computer or another recording apparatus (not shown). In such a case, a program is transferred via a network 915 such as such as a LAN (Local Area Network) or the Internet and the program is received by the communication apparatus 914. The program received by the communication apparatus 914 may be recorded in the above recording apparatus via the input/output interface 907 or the buses 901 and 902.

The sequence of processing is realized by various kinds of processing being performed by the CPU 904 according to programs recorded in the recording apparatus. At this point, for example, the CPU 904 may execute a program by reading directly from the recording apparatus or after loading the program into the RAM 905. Further, for example, when a program is received via the communication apparatus 914 or the drive 912, the CPU 904 may execute the received program directly without recording the program in the recording apparatus.

Further, the CPU 904 may perform various kinds of processing based on a signal or information input from the input apparatus 908 such as a mouse, keyboard, and microphone (not shown) when necessary.

Then, the CPU 904 may output results of performing the sequence of processing from a display apparatus such as a monitor or a sound output apparatus such as a speaker or headphone. Further, the CPU 904 may transmit the processing results from the communication apparatus 914 when necessary or cause the recording apparatus or the removable storage medium 913 to record the processing results.

The present invention can also be used by an optical disk apparatus that records information such as video, audio, and various kinds of data on an optical disk and reproduces the information from the optical disk.

What is claimed is:

1. An optical disk apparatus, comprising:
a light source that emits a light beam;
an objective lens that condenses the light beam to a target recording layer to be a target of one or two or more recording layers provided on an optical disk;
a condenser lens that condenses a reflected light beam after the light beam being reflected by the optical disk;
a hologram device that, when the reflected light beam is caused to travel in a straight line or diffract to separate into a reflected zero-order light beam and a reflected primary light beam, causes a portion of the reflected primary light beam to diffract in a predetermined first direction by a first region to create a first beam and causes a portion of the reflected primary light beam to diffract in the first direction by a second region to create a second beam;

a photo-detector that generates a received light signal by receiving the first beam and the second beam by a first receiving region and a second receiving region, respectively, provided at an irradiation position of the reflected zero-order light beam on a side of the first direction; and a signal processing unit that generates a preformatted signal representing preformatted information recorded in track grooves of the optical disk in advance based on the received light signal generated by each of the first receiving region and the second receiving region, wherein the photo-detector includes a zero-order light receiving unit provided at the irradiation position of the reflected zero-order light beam and divided into a plurality of receiving regions, and wherein the signal processing unit includes a switching circuit capable of selecting one of the received light signal generated by each of the plurality of receiving regions of the zero-order light receiving unit and the received light signal generated by each of the first receiving region and the second receiving region as the received light signal used for generating the preformatted signal; and, if the switching circuit selects the received light signal generated by each of the plurality of receiving regions of the zero-order light receiving unit, can generate the preformatted signal based on the received light signal.

2. The optical disk apparatus according to claim 1, wherein the first region corresponds to a portion containing + primary light diffracted by the track grooves of the reflected primary light beam and the second region corresponds to a portion containing − primary light diffracted by the track grooves of the reflected primary light beam.

3. The optical disk apparatus according to claim 1, wherein the photo-detector has the first receiving region and the second receiving region arranged outside an irradiation range of a zero-order light beam generated by an interlayer stray light beam after a portion of the light beam being reflected by the other recording layer farthest apart from the target recording layer on the optical disk being passed through the hologram device in a straight line.

4. The optical disk apparatus according to claim 1, wherein the signal processing unit generates a reproducing RF signal representing information recorded in the track grooves of the optical disk based on the received light signal generated from each of the plurality of receiving regions of the zero-order light receiving unit.

5. The optical disk apparatus according to claim 4, wherein the hologram device causes almost all of the reflected light beam to diffract in the first region and the second region as the first beam and the second beam respectively and the photo-detector receives the reflected zero-order light beam that contains no portion corresponding to the first region or the second region by the zero-order light receiving unit.

6. The optical disk apparatus according to claim 1, wherein the hologram device causes the first beam and the second beam to travel by setting a direction substantially in parallel with a running direction in an image of the track grooves as the first direction.

7. The optical disk apparatus according to claim 1, wherein the hologram device causes each of the first beam and the second beam to travel in the first direction by mutually different angles of diffraction in the first beam and the second beam.

8. The optical disk apparatus according to claim 7, wherein the photo-detector has a stray light receiving region that receives interlayer stray light after a portion of the light beam being reflected by the other recording layer other than the target recording layer on the optical disk provided near the first receiving region and the second receiving region.

9. The optical disk apparatus according to claim 1, wherein the hologram device causes a portion of the reflected light beam that does not contain + primary light and − primary light diffracted by the track grooves to diffract in a second direction that is different from the first direction by a third region corresponding to a portion equivalent to an inner circumferential side of the optical disk to create a third beam and causes a portion of the reflected light beam that does not contain the + primary light and the − primary light diffracted by the track grooves to diffract in the second direction by a fourth region corresponding to a portion equivalent to an outer circumferential side of the optical disk to create a fourth beam, the photo-detector generates a received light signal by receiving the third beam and the fourth beam by a third receiving region and a fourth receiving region, each provided on the side of the second direction at the irradiation position of the reflected zero-order light beam, respectively, the signal processing unit has a tracking error signal representing an amount of shift between a focus of the light beam concerning the tracking direction and a center line of the track grooves generated based on the received light signal generated by each of the first receiving region, the second receiving region, the third receiving region, and the fourth receiving region, and the optical disk apparatus, including:

a lens moving unit that moves the objective lens in a tracking direction almost orthogonal to the track grooves formed in a spiral or concentric shape in the target recording layer; and a servo control unit that moves the objective lens in the tracking direction via the lens moving unit based on the tracking error signal.

10. The optical disk apparatus according to claim 9, further comprising:

a second light source that emits a second light beam having a wavelength different from the wavelength of the light beam;

a separator that separates the second light beam into a main light beam and two sub-light beams; and a second objective lens that causes the sub-light beams to form a focus each on an inner circumferential side and an outer circumferential side separated from the focus of the main light beam by a predetermined interval in a direction orthogonal to second track grooves by condensing the main light beam and the two sub-light beams to a second optical disk on which the second track grooves that are different from the track grooves are formed in the recording layers, wherein the lens moving unit moves the objective lens and the second objective lens together and the photo-detector receives a main reflected light beam after the main light beam being reflected by the optical disk by the zero-order light receiving unit and also receives sub reflected light beams after the sub-light beams being reflected by the optical disk each by a fifth receiving region and a sixth receiving region provided at opposite positions by sandwiching the irradiation position of the reflected zero-order light beam.

11. An optical pickup, comprising:

a light source that emits a light beam;

an objective lens that condenses the light beam to a target recording layer to be a target among a plurality of recording layers provided on an optical disk;

a condenser lens that condenses a reflected light beam after the light beam being reflected by the optical disk;

a hologram device that, when the reflected light beam is caused to travel in a straight line or diffract to separate into a reflected zero-order light beam and a reflected primary light beam, causes a portion of the reflected primary light beam to diffract in a predetermined first direction by a first region to create a first beam and causes a portion of the reflected primary light beam to diffract in the first direction by a second region to create a second beam; and a photo-detector that generates a received light signal by receiving the first beam and the second beam by a first receiving region and a second receiving region, respectively, provided at an irradiation position of the reflected zero-order light beam on a side of the first direction, wherein a preformatted signal representing preformatted information recorded in track grooves of the optical disk in advance is generated by a predetermined signal processing unit based on the received light signal generated by each of the first receiving region and the second receiving region, wherein the photo-detector includes a zero-order light receiving unit provided at the irradiation position of the reflected zero-order light beam and divided into a plurality of receiving regions, and wherein the signal processing unit includes a switching circuit capable of selecting one of the received light signal generated by each of the plurality of receiving regions of the zero-order light receiving unit and the received light signal generated by each of the first receiving region and the second receiving region as the received light signal used for generating the preformatted signal; and, if the switching circuit selects the received light signal generated by each of the plurality of receiving regions of the zero-order light receiving unit, can generate the preformatted signal based on the received light signal.

12. A preformatted signal generation method, comprising the steps of:

emitting a light beam by a light source;

condensing the light beam to a target recording layer to be a target among a plurality of recording layers provided on an optical disk by an objective lens;

condensing a reflected light beam after the light beam being reflected by the optical disk by a condenser lens;

when the reflected light beam is caused to travel in a straight line or diffract to separate into a reflected zero-order light beam and a reflected primary light beam, causing a portion of the reflected primary light beam to diffract in a predetermined first direction by a first region to create a first beam and causes a portion of the reflected primary light beam to diffract in the first direction by a second region to create a second beam by a hologram device;

generating, by use of a photo-detector, a received light signal by receiving the first beam and the second beam by a first receiving region and a second receiving region, respectively, provided at an irradiation position of the reflected zero-order light beam of a photo-detector on a side of the first direction; and generating, by use of a signal processing unit, a preformatted signal representing preformatted information recorded in track grooves of the optical disk in advance based on the received light signal generated by each of the first receiving region and the second receiving region by a signal processing unit, wherein the photo-detector includes a zero-order light receiving unit provided at the irradiation position of the reflected zero-order light beam and divided into a plurality of receiving regions, and wherein the signal processing unit includes a switching circuit capable of selecting one of the received light signal generated by each of the plurality of receiving regions of the zero-order light receiving unit and the received light signal generated by each of the first receiving region and the second receiving region as the received light signal used for generating the preformatted signal; and, if the switching circuit selects the received light signal generated by each of the plurality of receiving regions of the zero-order light receiving unit, can generate the preformatted signal based on the received light signal.

* * * * *